US009972942B1

(12) United States Patent
Bordelon et al.

(10) Patent No.: US 9,972,942 B1
(45) Date of Patent: May 15, 2018

(54) APPARATUS AND METHODS FOR INSULATING AN ELECTRICALLY-GROUNDABLE SUPPORT SURFACE

(71) Applicant: NEWPARK MATS & INTEGRATED SERVICES LLC, The Woodlands, TX (US)

(72) Inventors: Randy Paul Bordelon, Opelousas, LA (US); Mathew Stephen James Lanigan, The Woodlands, TX (US); Kenneth Edward Durio, Arnaudville, LA (US); James Kerwin McDowell, Lafayette, LA (US)

(73) Assignee: Newpark Mats & Integrated Services LLC, The Woodlands, TX (US)

( * ) Notice: Subject to any disclaimer, the term of this patent is extended or adjusted under 35 U.S.C. 154(b) by 0 days. days.

(21) Appl. No.: 15/730,631

(22) Filed: Oct. 11, 2017

Related U.S. Application Data

(63) Continuation-in-part of application No. 15/673,676, filed on Aug. 10, 2017, which is a continuation of
(Continued)

(51) Int. Cl.
*H01R 13/648* (2006.01)
*H01R 43/26* (2006.01)
(Continued)

(52) U.S. Cl.
CPC ............ *H01R 13/648* (2013.01); *E01C 5/005* (2013.01); *E01C 5/22* (2013.01); *E01C 9/08* (2013.01);
(Continued)

(58) Field of Classification Search
CPC ........ H01R 13/648; H01R 43/26; H01R 4/64; H01R 13/65802; E01C 9/086; E01C 9/083; E01C 5/00; E01C 9/00; E01C 5/005
See application file for complete search history.

(56) References Cited

U.S. PATENT DOCUMENTS 2,121,179 A 6/1938 Sweetland
4,967,057 A 10/1990 Bayless
(Continued)

FOREIGN PATENT DOCUMENTS

CH 688966 A5 6/1998
CN 8721262 U 7/1988
(Continued)

OTHER PUBLICATIONS

Hastings Grounding and Jumper Equipment, Grounding Mat, Jan. 2011, 1 pp.
(Continued)

*Primary Examiner* — Gary Paumen
(74) *Attorney, Agent, or Firm* — E. Randall Smith; E. Randall Smith, P.C.

(57) ABSTRACT

An insulated, electrically groundable, support surface includes at least one heat shield configured to be disposed between a ground cover and an electrically-conductive cover(s) of the support surface to insulate the ground cover from heat generated by electric current flowing through the electrically-conductive cover(s).

50 Claims, 30 Drawing Sheets

Related U.S. Application Data application No. 15/178,254, filed on Jun. 9, 2016, now Pat. No. 9,735,510, which is a continuation-in-part of application No. 14/838,064, filed on Aug. 27, 2015, now Pat. No. 9,368,918, which is a continuation of application No. 14/496,105, filed on Sep. 25, 2014, now Pat. No. 9,337,586.

(60) Provisional application No. 61/888,580, filed on Oct. 9, 2013.

(51) Int. Cl.

| | | |
|---|---|---|
| *E04H 3/12* | (2006.01) | |
| *E04B 5/02* | (2006.01) | |
| *E21B 41/00* | (2006.01) | |
| *E01C 5/22* | (2006.01) | |
| *E01C 5/00* | (2006.01) | |
| *H05F 3/02* | (2006.01) | |
| *E01C 9/08* | (2006.01) | |
| *H02B 13/025* | (2006.01) | |
| *E01C 11/24* | (2006.01) | |

(52) U.S. Cl.
CPC ............... *E01C 11/24* (2013.01); *E04B 5/02* (2013.01); *E04H 3/126* (2013.01); *E21B 41/0021* (2013.01); *H02B 13/025* (2013.01); *H05F 3/025* (2013.01); *E01C 2201/12* (2013.01); *Y10T 29/49117* (2015.01)

(56) References Cited

U.S. PATENT DOCUMENTS

| | | | |
|---|---|---|---|
| 6,477,027 B1 | 11/2002 | McKelvy | |
| 6,511,257 B1 | 1/2003 | Seaux et al. | |
| 6,888,081 B2 | 5/2005 | Friedrich et al. | |
| 7,404,690 B2 | 7/2008 | Lukasik | |
| 7,427,172 B2 | 9/2008 | Lukasik | |
| 7,645,962 B2 * | 1/2010 | Krossa ............... H01R 13/5845 | |
| | | | 219/541 |
| 8,061,929 B2 | 11/2011 | Dagesse | |
| 8,382,393 B1 | 2/2013 | Phillips | |
| 8,414,217 B2 | 4/2013 | Rosan | |
| 8,511,257 B2 | 8/2013 | Thibault | |
| 8,545,127 B2 | 10/2013 | Bleile | |
| 8,616,804 B2 | 12/2013 | Corser | |
| 8,902,559 B2 * | 12/2014 | Xu ............................. H02G 1/00 | |
| | | | 361/220 |
| 8,936,073 B1 | 1/2015 | Phillips | |
| 8,951,055 B2 | 2/2015 | Eusterholz et al. | |
| 9,337,586 B2 * | 5/2016 | McDowell ................ E01C 9/08 | |
| 9,368,918 B2 * | 6/2016 | McDowell ................ E01C 9/08 | |
| 9,458,578 B2 | 10/2016 | Klein | |
| 9,735,510 B2 * | 8/2017 | McDowell ........... H02B 13/025 | |
| 2004/0253861 A1 | 12/2004 | Schubert | |
| 2005/0239320 A1 | 10/2005 | Folkema | |
| 2005/0270175 A1 | 12/2005 | Peddie et al. | |
| 2007/0237581 A1 | 10/2007 | Lukasik et al. | |
| 2007/0258767 A1 | 11/2007 | Tapp | |
| 2008/0075533 A1 | 3/2008 | Fournier | |
| 2009/0301004 A1 * | 12/2009 | Dagesse .................. E01C 9/086 | |
| | | | 52/177 |
| 2013/0051911 A1 | 2/2013 | Corser | |
| 2013/0309008 A1 | 11/2013 | Fournier | |
| 2014/0193196 A1 | 7/2014 | Fournier | |
| 2017/0114505 A1 | 4/2017 | Klein | |

FOREIGN PATENT DOCUMENTS

| | | |
|---|---|---|
| EP | 1128713 A1 | 8/2001 |
| WO | 2002072974 A1 | 9/2002 |

OTHER PUBLICATIONS

The World's Latest Trackway, Copyright Liontrackhire 2015, http://www.liontrackhire.com/trackway/, 8 pp.

Standard (Orange) Equi-Mat Personal Protective Ground Grid, Hubbell Power Systems, Inc., http://www.hubbellpowersystems.com/lineman/grounding/ground-grids/ground-grid.asp, 2 pp.

Grounding for Lineworker Protection, How to Safely Install and Remove Personal Protective Grounds, Fourth Edition, First Printing Jun. 2011, Copyright Alexander Publications 2009, 106 pp.

* cited by examiner

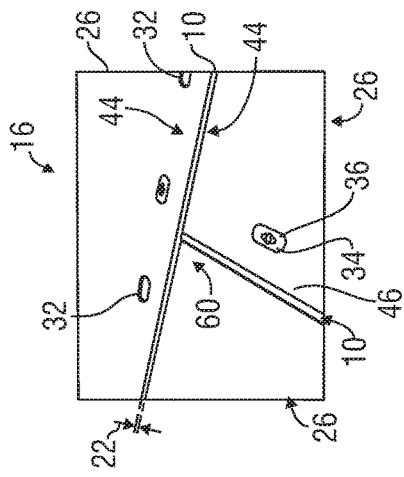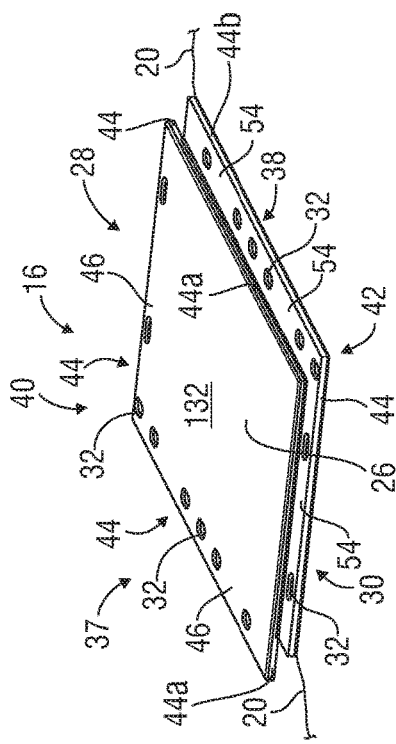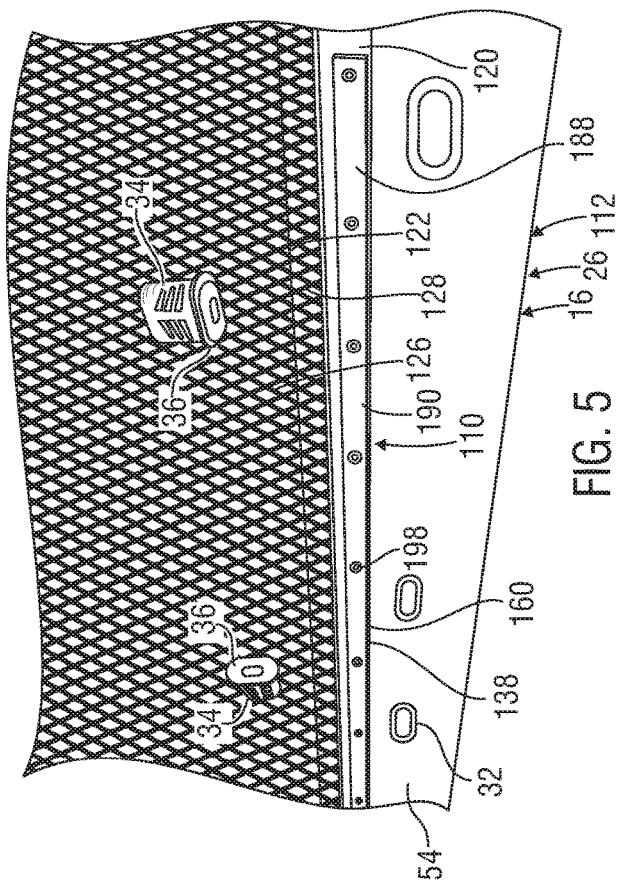

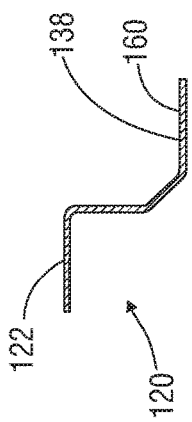
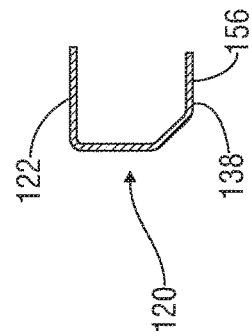
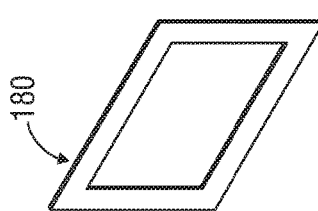
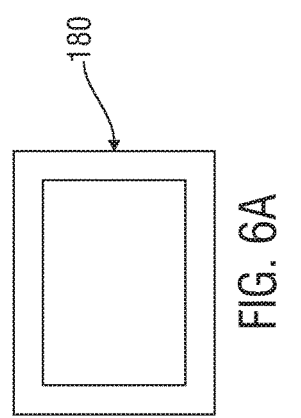
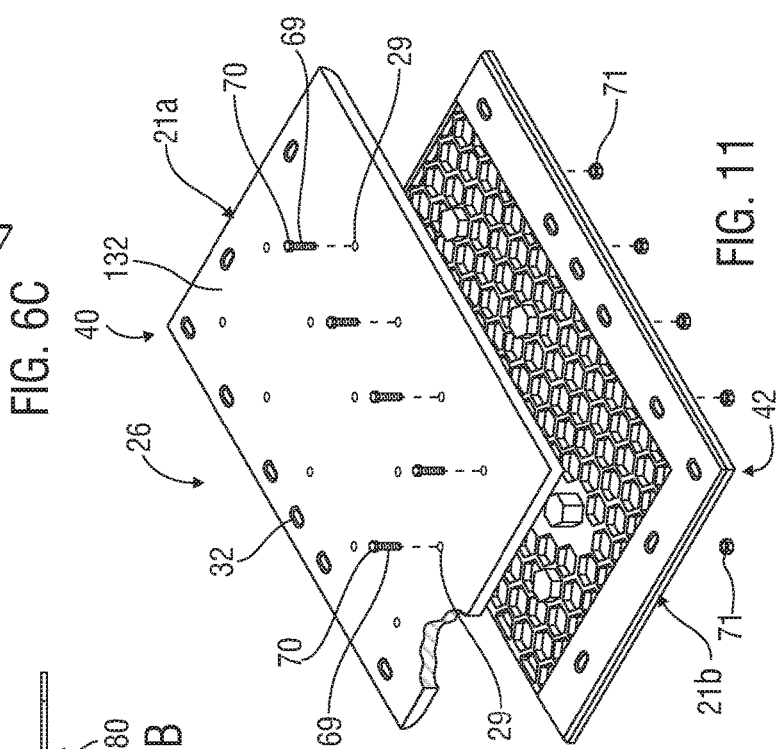

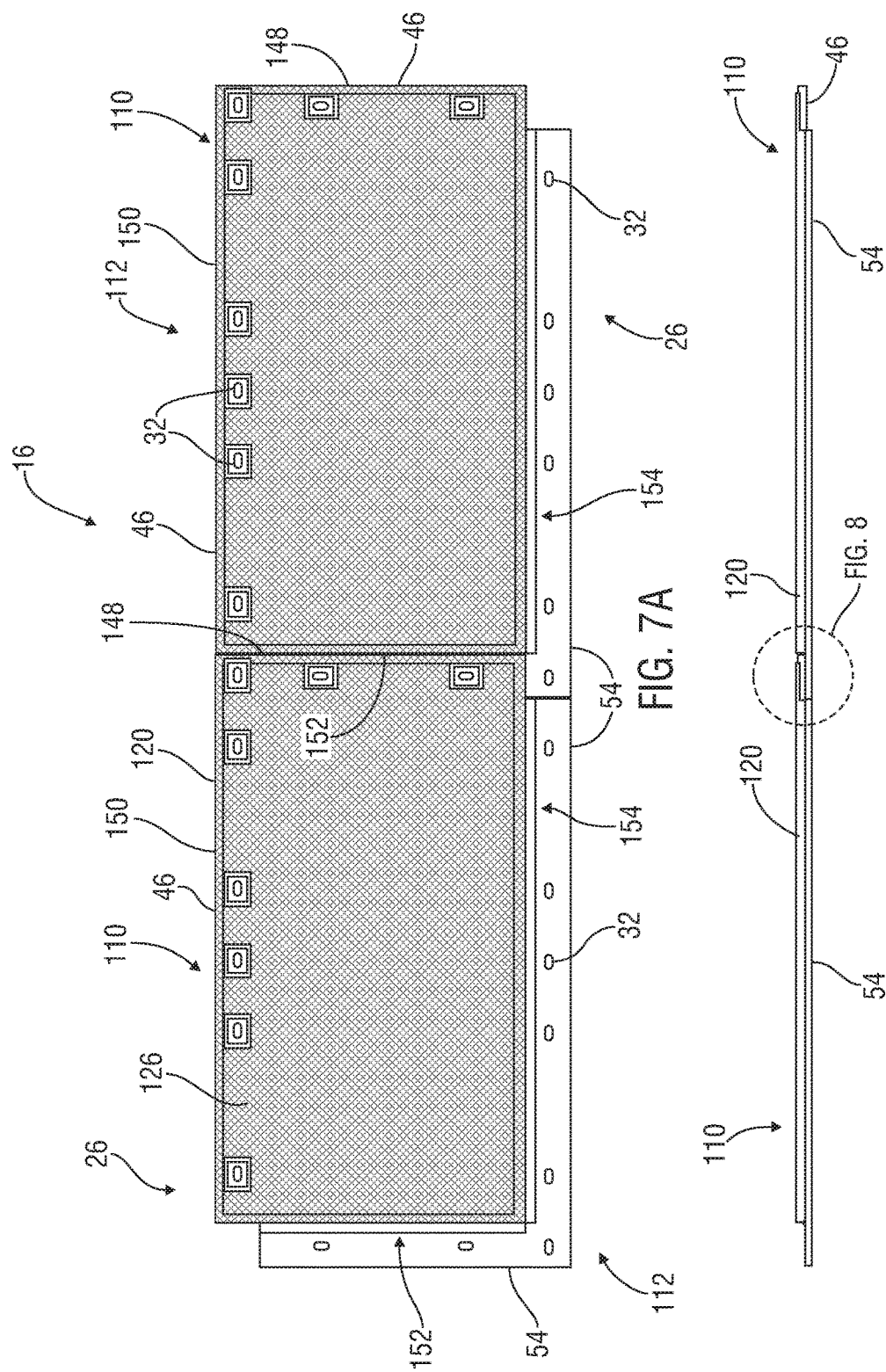

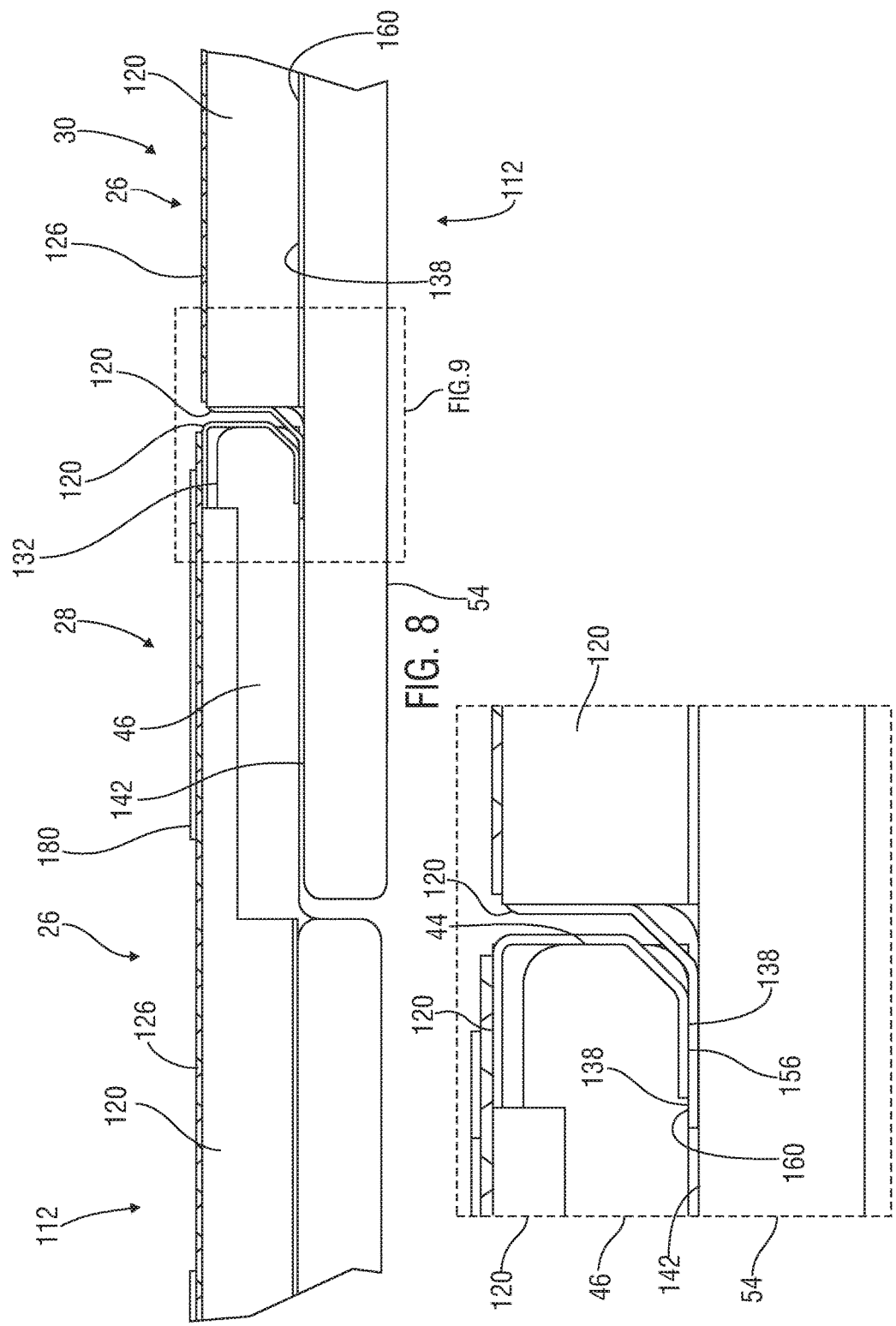

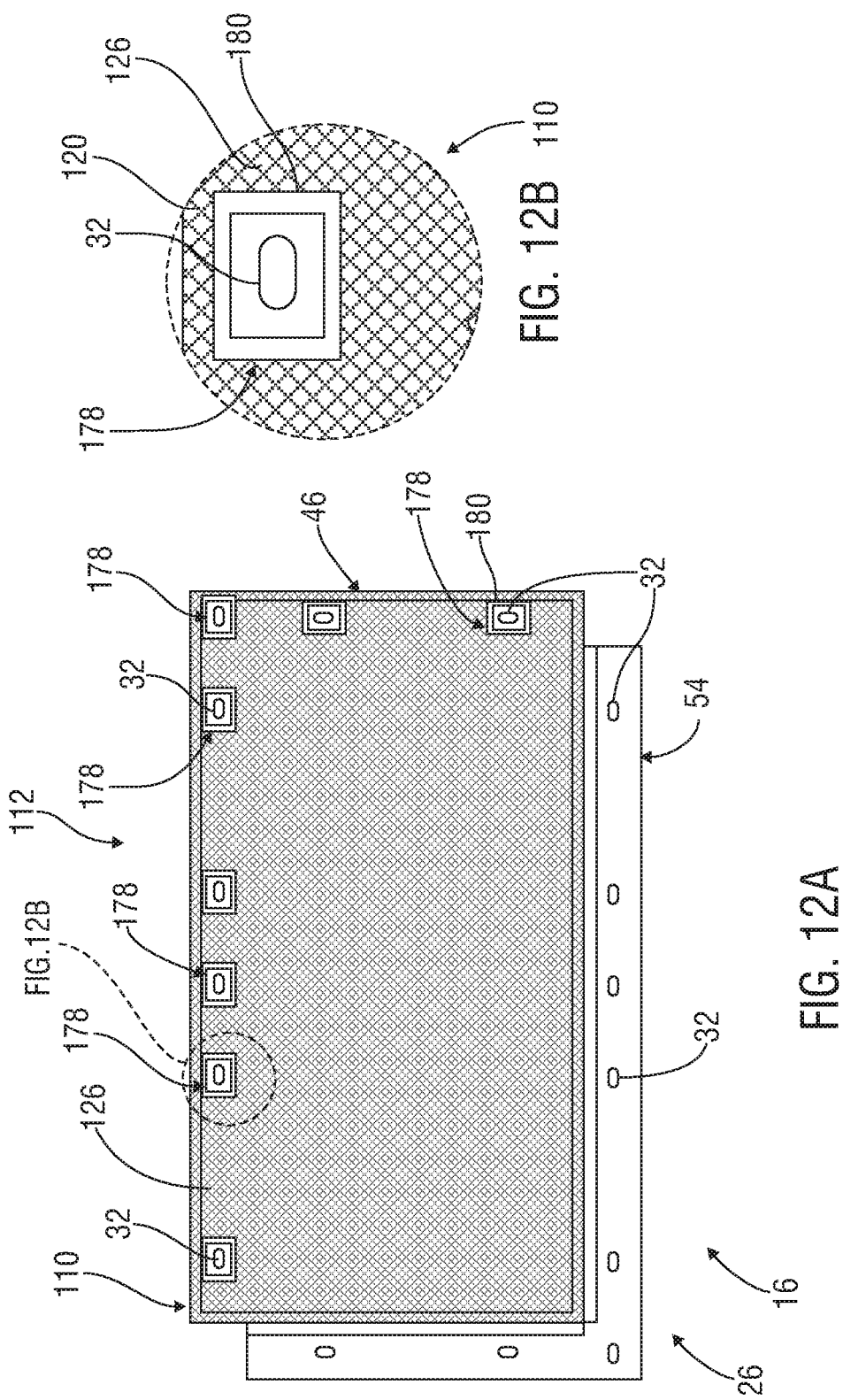

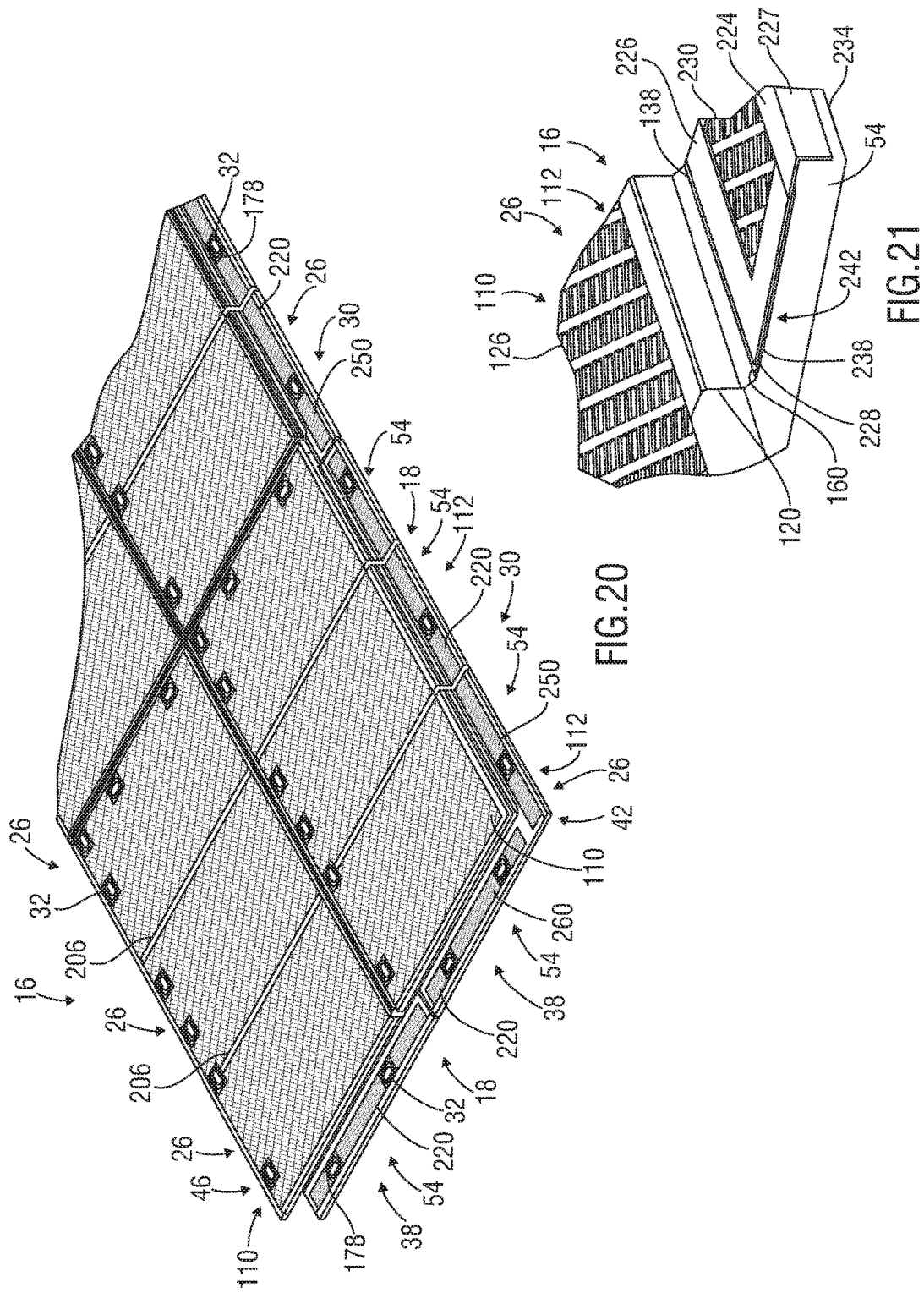

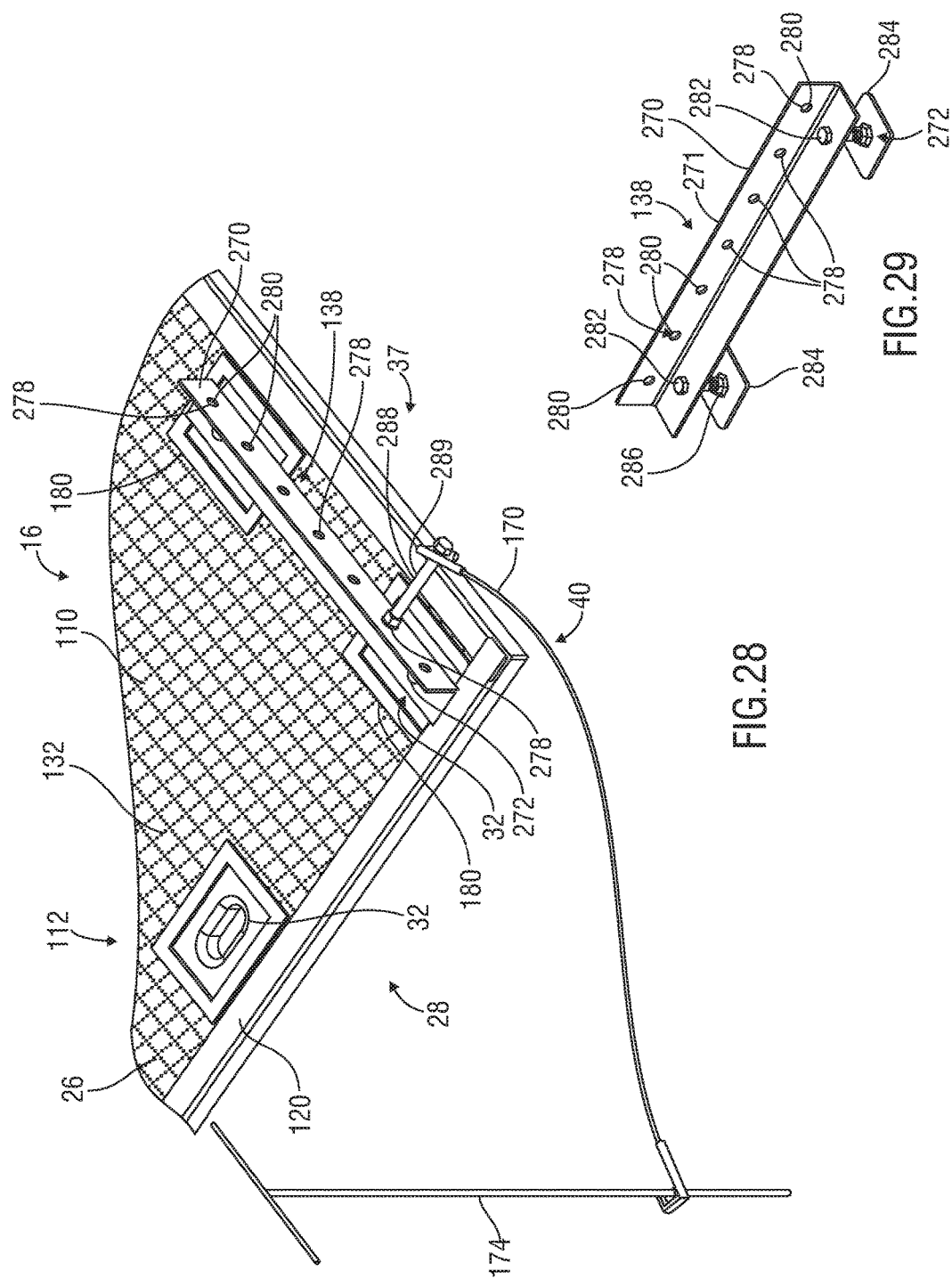

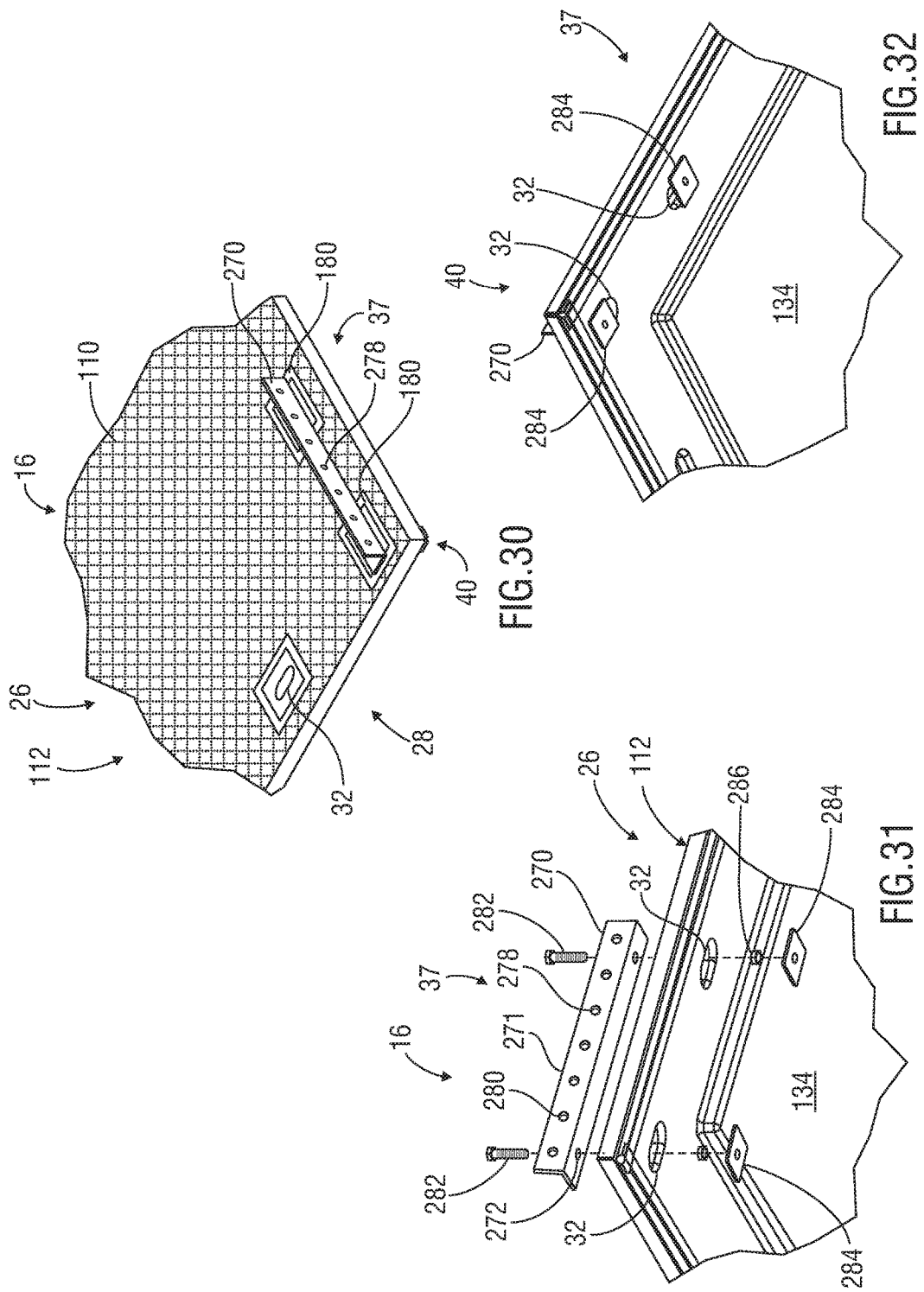

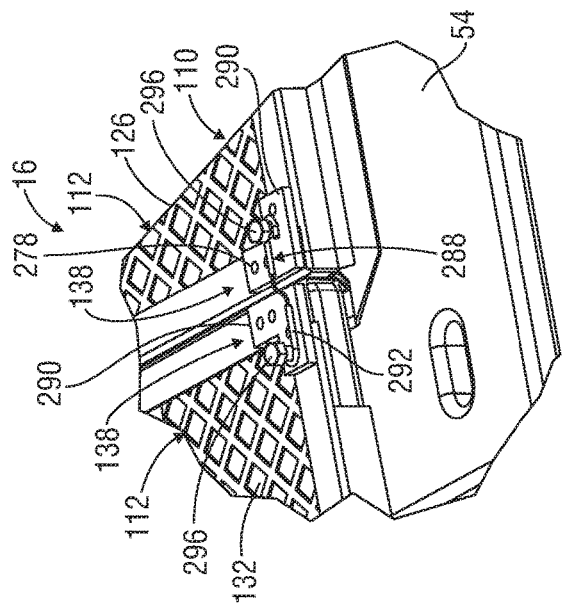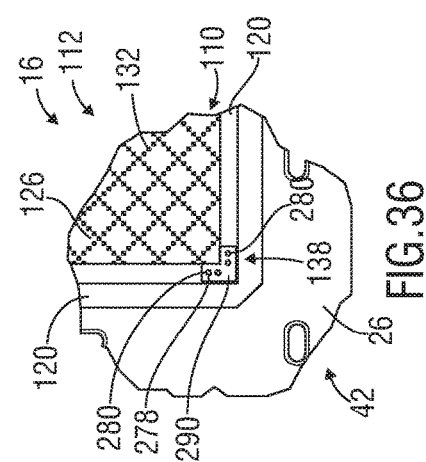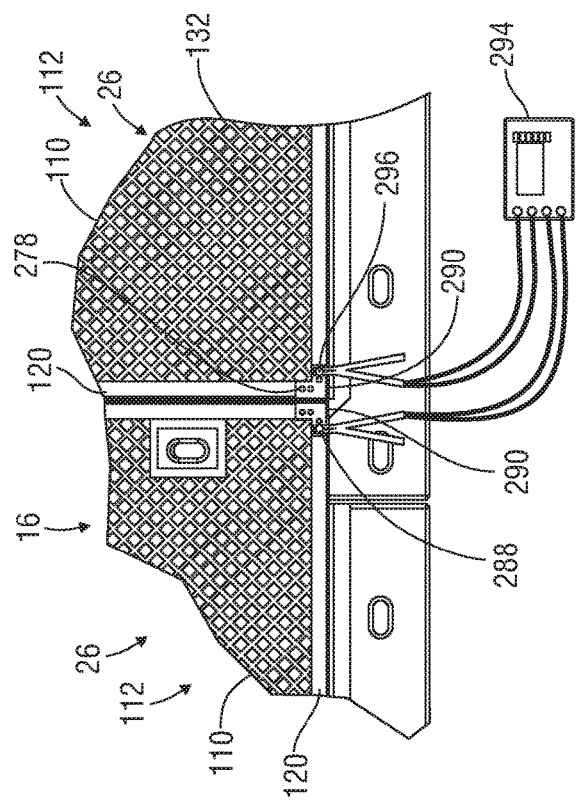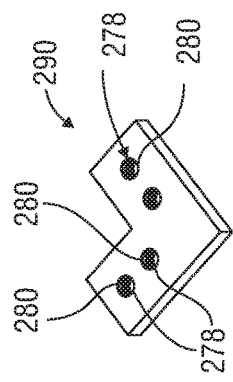

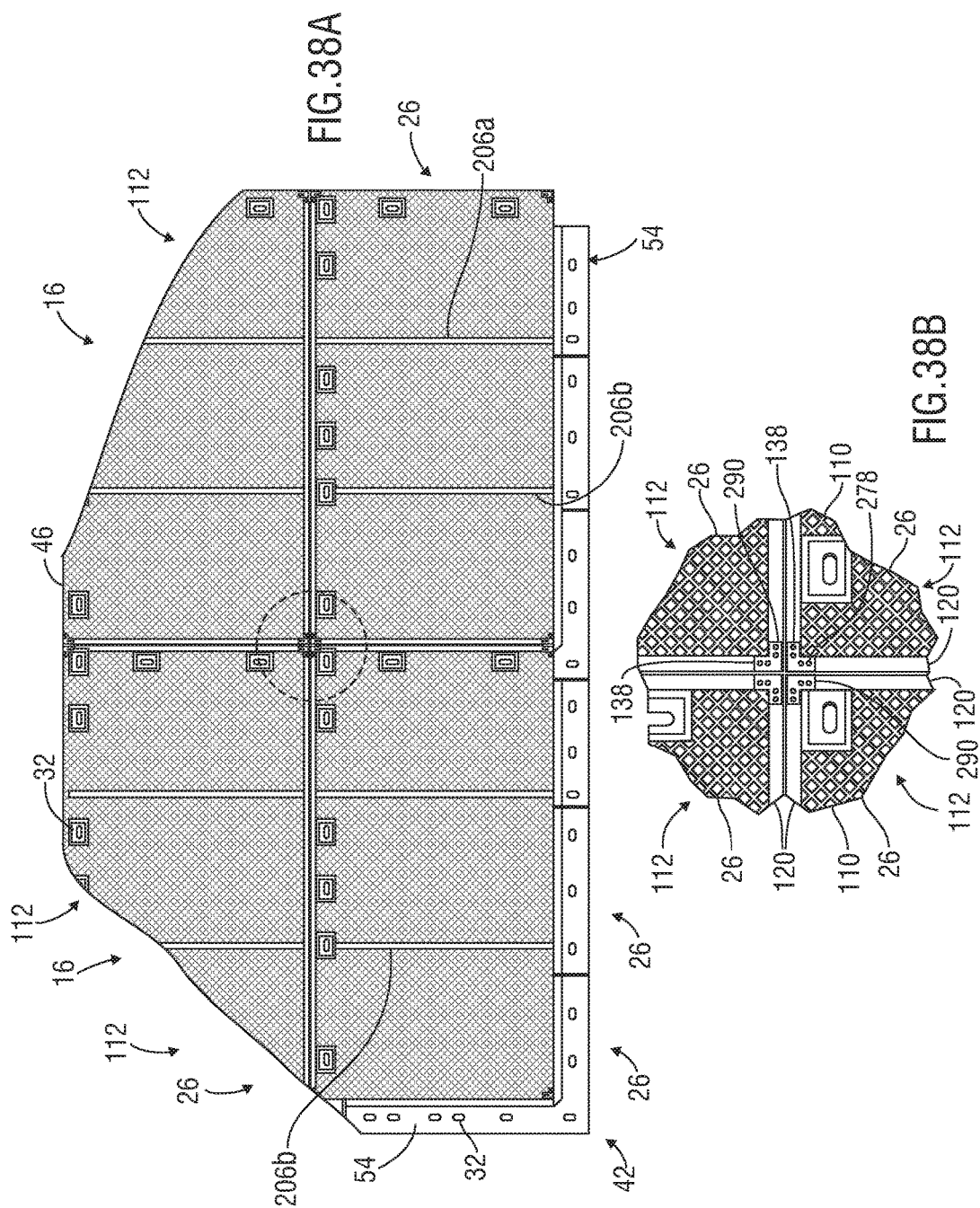

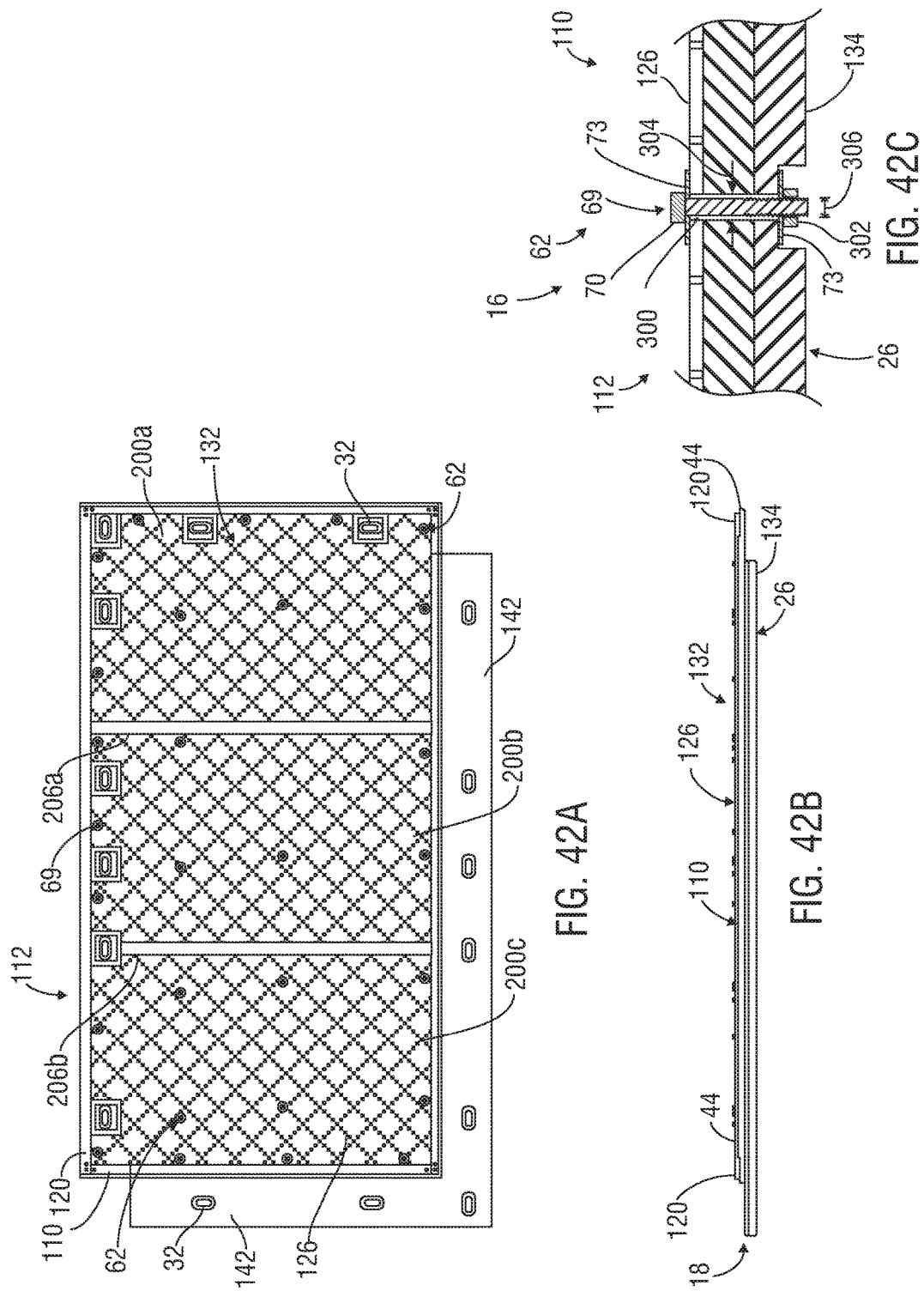

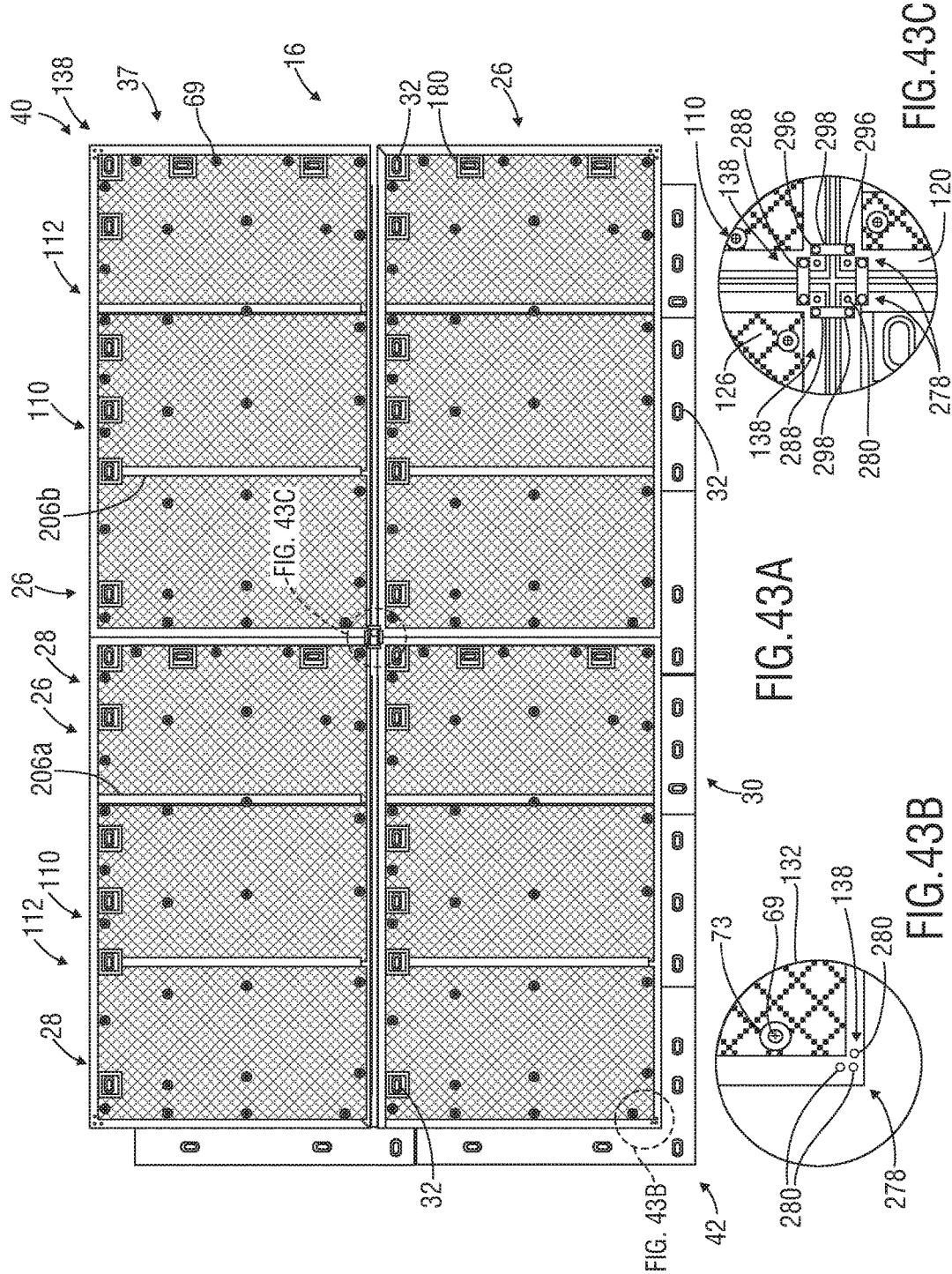

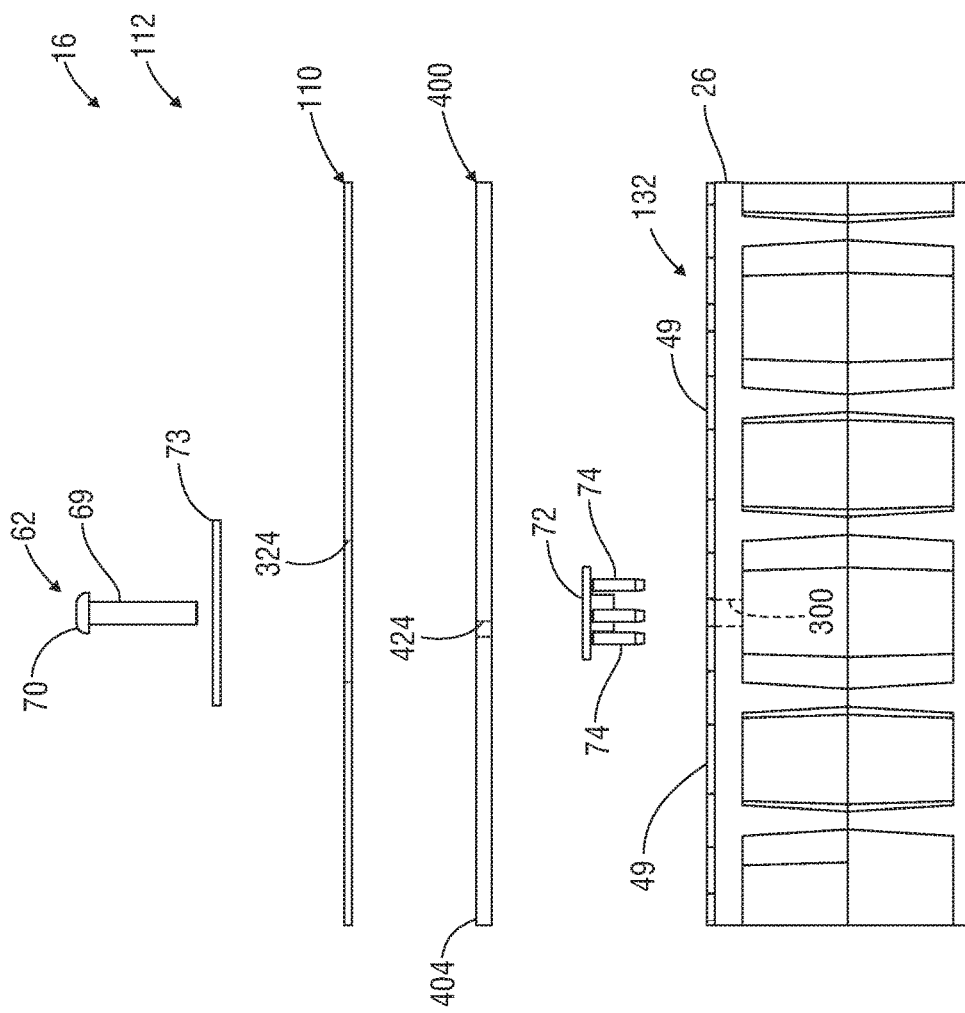

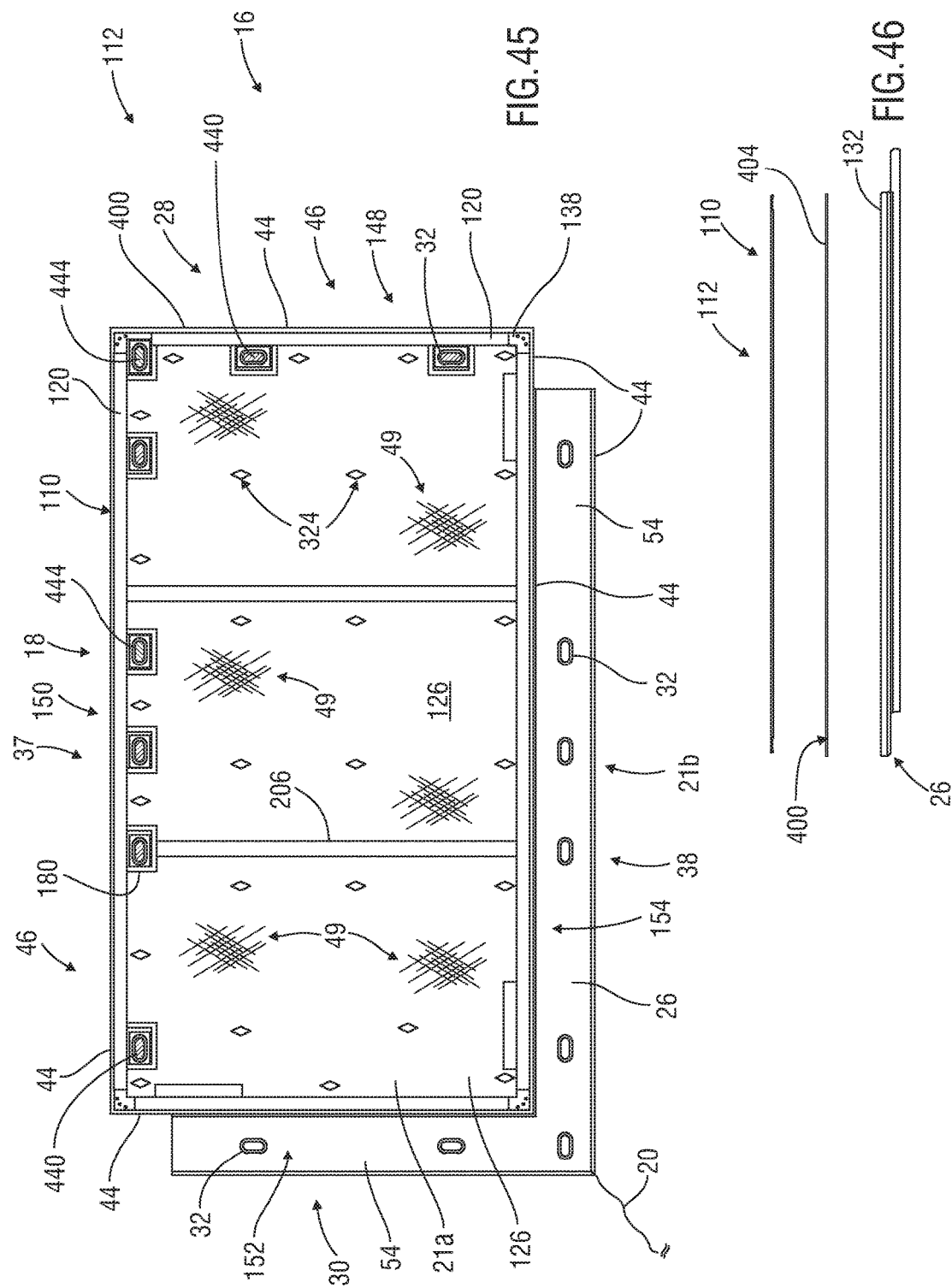

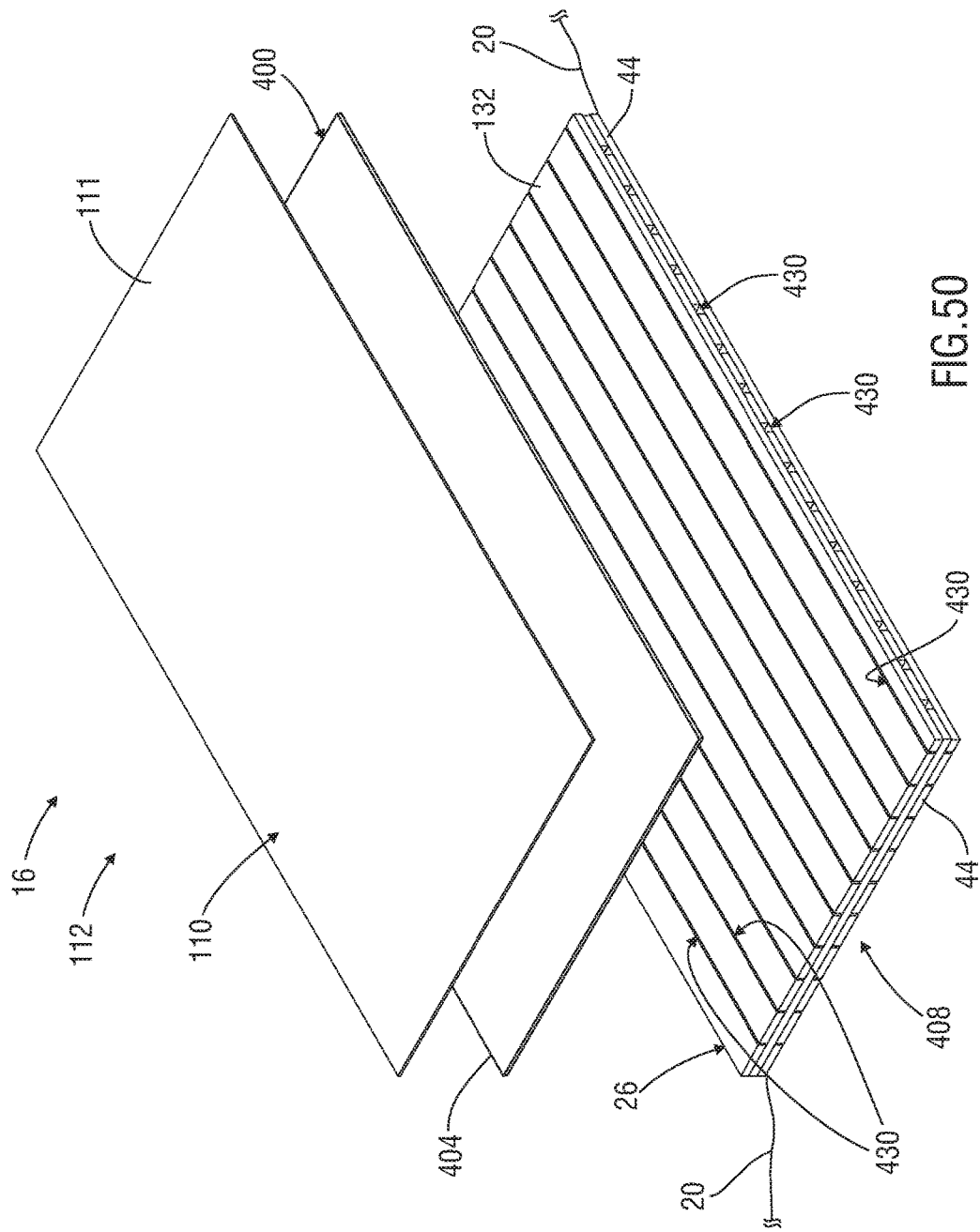

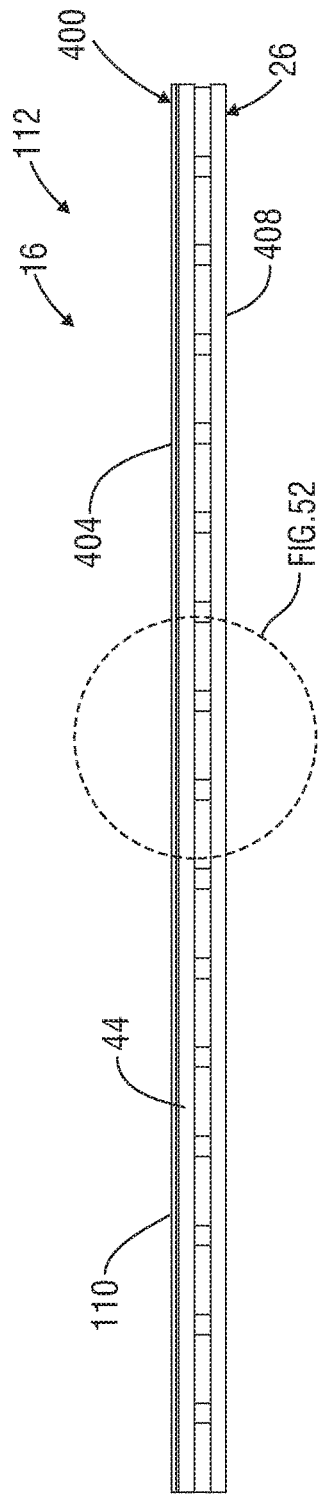
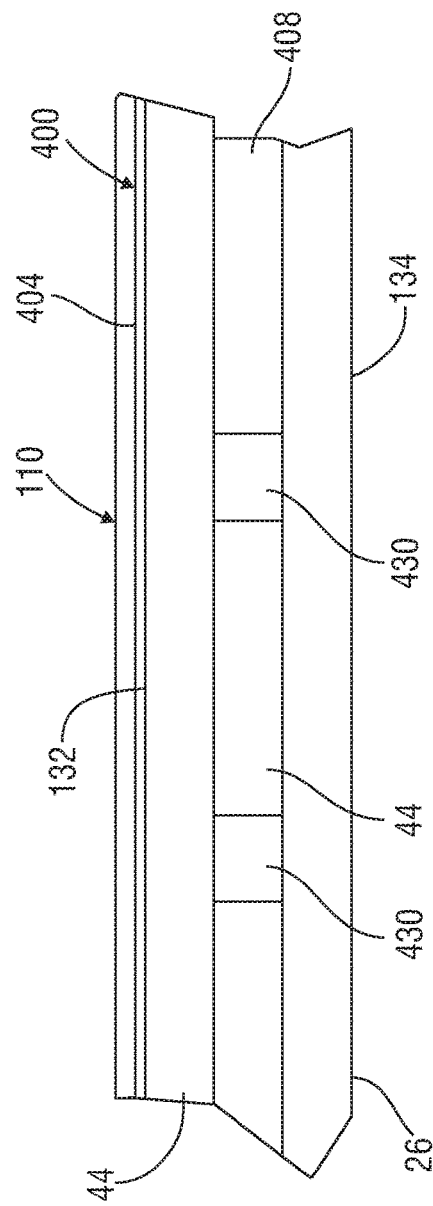

US 9,972,942 B1

APPARATUS AND METHODS FOR INSULATING AN ELECTRICALLY-GROUNDABLE SUPPORT SURFACE

This application is a continuation-in-part application of and claims priority U.S. patent application Ser. No. 15/673,676, filed on Aug. 10, 2017 and entitled "Apparatus for Electrically Grounding at Least One Mat", which is a continuation application of and claims priority to U.S. patent application Ser. No. 15/178,254, filed on Jun. 9, 2016, entitled "Apparatus and Methods for Electrically Grounding at Least One Mat in a Load-Supporting Surface" and which issued as U.S. Pat. No. 9,735,510 on Aug. 15, 2017, which is a continuation-in-part application of and claims priority to U.S. patent application Ser. No. 14/838,064, filed on Aug. 27, 2015, entitled "Apparatus and Methods for Electrically Grounding a Load-Supporting Surface" and which issued as U.S. Pat. No. 9,368,918 on Jun. 14, 2016, which is a continuation application of and claims priority to U.S. patent application Ser. No. 14/496,105, filed on Sep. 25, 2014, entitled "Apparatus and Methods for Electrically Grounding a Load-Supporting Surface" and which issued as U.S. Pat. No. 9,337,586 on May 10, 2016, which claims priority to U.S. Provisional Patent Application Ser. No. 61/888,580 filed on Oct. 9, 2013 and entitled "Apparatus and Methods for Electrically Grounding a Load-Supporting Surface", all of which are hereby incorporated by reference herein in their entireties.

FIELD OF THE DISCLOSURE

The present disclosure relates to support surface technology and, more particularly, to apparatus and methods for insulating a support mat having an electrically-conductive cover associated therewith.

BACKGROUND

Support surfaces are commonly used for roadways, remote jobsites, industrial staging areas, spill containment areas and/or other purposes in an ever-increasing myriad of industries, such as construction, military, energy (e.g. pipeline, oilfield, etc.), mining, chemical, transportation, disaster response, utilities and entertainment. The support surfaces are often formed with one or more ground covers, or support mats.

In some instances, it is necessary or desirable to provide apparatus and methods for electrically grounding at least a portion of the support surface. For example, an electrically-grounded support surface may be used in an "equipotential zone" (EPZ) or other high voltage area. The EPZ is an arrangement typically designed so that dangerous electric potential differences do not appear across the body of a person working on or near ground-based machinery. An EPZ is often used during projects that involve working in close proximity to an energized power line. For example, in performing overhead power line (OHL) projects, the EPZ may prevent the installation crew from being subject to an electric shock caused by, for example, a circuit flash from the energized line to the conductors being worked on. In the EPZ, the equipment and personnel are typically on a support surface that is electrically conductive and grounded to provide one or more designated paths for large electrical voltages to flow.

When an electrically-conductive support surface is used (whether in an EPZ or any other area or site), the electrical current flowing through the electrically-conductive support surface can become significant and generate significant heat. In some situations, there may be sufficient heat to damage the surface or structure underneath the electrically-conductive portion(s) of the support surface and/or cause other undesirable problems or consequences. Many presently know systems and techniques for electrically grounding a support surface do not include an effective mechanism for protecting the underlying surface(s) or structure(s) (e.g. ground covers or mats) from excessive heat generated by electric current flowing through the electrically-conductive portion(s).

It should be understood that the above-described features, capabilities and disadvantages are provided for illustrative purposes only and are not intended to limit the scope or subject matter of the appended claims or those of any related patent application or patent. Thus, none of the appended claims or claims of any related application or patent should be limited by the above discussion or construed to address, include or exclude each or any of the above-cited features, capabilities or disadvantages merely because of the mention thereof herein.

Accordingly, there exists a need for improved systems, articles and methods useful in connection with thermally insulating a support mat having an electrically-conductive cover associated therewith.

BRIEF SUMMARY OF THE DISCLOSURE

In some embodiments, the present disclosure involves an insulated, electrically groundable, support surface for use in an Equi-Potential Zone proximate to the earth's surface. The support surface includes a mat constructed of non-conductive material and having top and bottom faces. The mat is configured to be deployed on or near the earth's surface in the Equi-Potential Zone. At least one electrically-conductive cover is associated with the mat and configured to extend at least partially across the top face of the mat. Each electrically-conductive cover is constructed at least partially of electrically-conductive material and configured to capture electrical current in the Equi-Potential Zone and ground it to the earth. At least one heat shield is configured to be disposed between the mat and the electrically-conductive cover(s). The heat shield is configured to insulate the mat from heat generated by electric current flowing through the electrically-conductive cover(s) sufficient to prevent the mat from combusting and/or melting due to such heat.

In various embodiments, the present disclosure includes apparatus for insulating an electrically-groundable ground cover. The ground cover includes top and bottom faces and is configured to be deployed on or near the earth's surface. The apparatus includes at least one electrically-conductive cover configured to be associated with the ground cover and extend at least partially across the top face of the ground cover. Each electrically-conductive cover is constructed at least partially of electrically-conductive material and configured to capture electrical current and ground at least some of the captured electrical current to the earth. At least one heat shield is configured to be disposed at least partially between the ground cover and the at least one electrically-conductive cover and is configured to insulate the ground cover from heat generated by electric current flowing through the electrically-conductive cover(s) sufficient to at least prevent the ground cover from combusting and/or melting due to such heat.

In many embodiments, apparatus for electrically grounding and insulating a ground cover that is electrically connectable to at least one other electrically-conductive component includes an upper layer constructed at least partially of electrically-conductive material and configured to be coupled to the ground cover, extend at least partially across the top of the ground cover, capture electrical current and be electrically grounded to the earth. At least one intermediate layer is configured to be disposed at least partially between the ground cover and the upper layer, the at least one intermediate layer is configured to at least partially insulate the ground cover from heat generated by electric current flowing through the upper layer. At least one electrically-conductive interface is configured to facilitate electrical connection of the upper layer to another electric ally-conductive component.

In some embodiments, the present disclosure involves apparatus for insulating an electrically-groundable support surface configured to support the weight of personnel, vehicles and equipment thereon at or near the surface of the earth. The support surface includes a ground cover having a top and a bottom and at least one electrically-conductive cover constructed at least partially of electrically-conductive material, extending at least partially across the top the ground cover and being electrically groundable to the earth. At least one heat shield includes at least one layer of thermal insulating material and is positioned between the electrically-conductive cover(s) and the ground cover The one or more heat shield is configured to insulate the ground cover from heat generated by electric current flowing through the electrically-conductive cover(s) sufficient to prevent the ground cover from combusting and/or melting due to such heat and withstand loads and forces placed upon the ground cover and the electrically-conductive cover(s) and the movement, deformation, expansion and contraction of the ground cover and electrically-conductive cover(s) during use thereof.

The present disclosure includes embodiments of an insulated, electrically-groundable support surface for use on or near the earth's surface. The support surface includes a mat having top and bottom surfaces and is configured to be deployed on or near the surface of the earth. An electrically-conductive cover constructed at least partially of electrically-conductive material is associated with the mat and includes at least one inner panel configured to extend at least partially across the top surface of the mat and be electrically grounded to the earth. At least one heat shield is configured to be disposed at least partially between the mat and the electrically-conductive cover to insulate the ground cover from heat generated by electric current flowing through the electrically-conductive cover sufficient to at least prevent the mat from combusting and/or melting due to such heat.

In many embodiments, a method of electrically insulating an electrically-conductive support surface having a ground cover configured to be deployed on or near the surface of the earth includes positioning an electrically-conductive cover at least partially across a top surface of the ground cover and positioning at least one heat shield at least partially between the electrically-conductive cover and the ground cover. The electrically-conductive cover captures electrical current and the at least one heat shield insulates the ground cover from heat generated by electric current flowing through the electrically-conductive cover.

The present disclosure also includes embodiments of a method of assembling and grounding an insulated support surface configured to be deployed on or near the surface of the earth. The method includes positioning at least one heat shield at least partially across the top of the support surface and attaching at least one electrically-conductive cover to the support surface over the at least one heat shield. The one or more electrically-conductive cover is configured to capture electrical in the vicinity of the support surface and the one or more heat shield is configured to insulate the support surface from heat generated by electric current flowing through the at least one electrically-conductive cover sufficient to at least partially prevent the ground cover from combusting and/or melting due to such heat. The at least one electrically-conductive cover is grounded to the earth.

In some embodiments, a method of insulating and electrically connecting at least two mats arranged in a reusable load-supporting surface deployed on or near the earth's surface includes positioning at least one among a plurality of electrically-conductive covers at least partially across the top surface of each mat. Each electrically-conductive cover is configured to capture electrical current in the vicinity of the mat associated therewith. At least one heat shield is positioned at least partially between each mat and the mat's associated electrically-conductive cover(s). The at least one heat shield is configured to insulate its associated mat from heat generated by electric current flowing through the associated electrically-conductive cover(s) sufficient to prevent the mat from combusting and/or melting due to such heat. At least one conductive interface associated with at least one electrically-conductive cover of each mat is electrically coupled to at least one conductive interface associated with at least one electrically-conductive cover of another mat to electrically couple the mats together.

In many embodiments, an apparatus for electrically grounding a portable mat and electrically connecting the mat to at least one other electrically-conductive component is provided. The mat includes a top and a bottom and is configured to be deployed on or near the surface of the earth. The apparatus includes a cover constructed at least partially of electrically-conductive material. The cover is attached to the mat sufficient to prevent the cover from separating from the mat during use thereof. The cover includes metallic grating configured to extend at least partially across the top of the mat and be electrically grounded to the earth. At least one electrically-conductive interface is configured to facilitate electrical connection of the cover to at least one other electrically-conductive component.

There are embodiments involving an electrically groundable support surface for use on or near the earth's surface and being electrically connectable to at least one other support surface. A lower portion has a top and a bottom and is configured to be deployed on or near the surface of the earth. A cover portion is constructed at least partially of electrically-conductive material. The cover portion is associated with the lower portion and configured to extend at least partially across the top of the lower portion and be electrically grounded to the earth. At least one electrically-conductive interface is configured to electrically couple the support surface to another support surface.

In many embodiments, an electrically groundable, reusable, load-supporting surface adapted to be deployed on or near the surface of the earth includes a plurality of lower portions, each having respective top and bottom faces. A plurality of electrically-conductive covers portions is included, at least one of which is associated with each respective lower portion. Each cover portion includes metallic grating constructed at least partially of electrically-conductive material and configured to extend at least partially across the top face of the corresponding associated lower portion. The respective electrically-conductive cover portions of different respective lower portions in the load-supporting surface are configured to be electrically interconnected and grounded to the earth to electrically ground the load-supporting surface.

In various embodiments, a support surface for use on or near the earth's surface and being electrically groundable includes a reusable lower portion having top and bottom surfaces. The reusable lower portion is configured to be deployed on or near the surface of the earth and support the weight of personnel, vehicles and equipment thereupon. At least one electrically-conductive cover portion is constructed at least partially of electrically-conductive material and configured to support the weight and movement of vehicles and equipment directly thereupon. The cover portion is associated with the reusable lower portion and configured to extend at least partially across the top surface of the lower portion and be electrically grounded to the earth. At least one electrically-conductive interface is configured to serve as an electrical coupling point to the support surface.

There are embodiments involving a method of electrically connecting and grounding at least two mats arranged in a reusable support surface deployed on or near the surface of the earth. The method includes positioning at least one among a plurality of electrically-conductive covers at least partially across the top surface of each mat. Each cover is coupled to its associated mat. At least one conductive interface associated with at least one cover on each mat is electrically coupled to at least one electrically conductive interface associated with another cover to electrically couple the respective covers together. At least one cover is grounded to the earth.

In some embodiments, an electrically groundable support surface for use on or near the earth's surface and being electrically connectable to at least one other electrically-conductive component is provided. The support surface includes a lower portion having top and bottom surfaces and being configured to be deployed on or near the surface of the earth. The support surface also includes an electrically-conductive cover portion constructed at least partially of electrically-conductive material. The electrically-conductive cover portion is associated with the lower portion and includes at least one panel configured to extend at least partially across the top surface of the lower portion and be electrically grounded to the earth. At least one electrically-conductive interface is configured to facilitate electrical connection of the support surface to another electrically-conductive component of an adjacent support surface.

In various embodiments, a method of assembling and electrically grounding a planar, load-supporting surface deployed on or near the surface of the earth is provided. The load-supporting surface is configured to support the weight of personnel, vehicles and equipment thereupon. The method includes attaching an electrically-conductive cover portion at least partially across the top surface of a lower portion so that the cover portion attaches at or proximate to the perimeter of the top surface of the lower portion. The cover portion includes an electrically-conductive panel extending at least partially across the top surface of the lower portion. The load-supporting surface is grounded to the earth.

In many embodiments, a method of electrically connecting and grounding at least two reusable support surfaces deployed on or near the surface of the earth is provided. The method includes positioning a first support surface comprising a lower portion having top and bottom surfaces, a cover portion spreading at least partially across the top surface of the lower portion and a conductive interface, and positioning a second support surface comprising a lower portion having top and bottom surfaces, a cover portion spreading at least partially across the top surface of the lower portion and a conductive interface. The conductive interface of the first support surface is electrically coupled with the conductive interface of the second support surface. At least one support surface is grounded to the earth.

In various embodiments, the present disclose involves a system for electrically grounding a reusable load-supporting surface deployed on or near the surface of the earth. The system includes at least two mats at least partially forming the load-supporting surface. Each mat has substantially planar respective top and bottom faces, multiple sides and at least one edge extending around each side. The mats are configured to support the weight and movement of personnel, vehicles and equipment thereupon. A plurality of substantially planar, removable, electrically-conductive covers are constructed at least partially of electrically-conductive material and constructed and arranged to support the weight and movement of personnel, vehicles and equipment thereupon. Each cover extends at least partially across the top face of one of the mats without extending over any of the edges thereof and is flexibly coupled to the mat to allow the mat to flex, expand and contract relative to the cover due to one or more environmental factors and the movement of personnel, vehicles and/or equipment across the load-supporting surface during normal, typical or expected use conditions without decoupling the cover from the mat or undesirably damaging or deforming the cover or mat, while allowing the cover and mat to support the weight and movement of personnel, vehicles and equipment thereupon. Each cover includes at least one conductive interface configured to electrically couple the cover to another cover in the load-supporting surface. At least one of the covers is configured to be electrically coupled to the earth.

In many embodiments, the present disclosure involves apparatus for electrically grounding at least two mats of a load-supporting surface deployed on or near the surface of the earth. Each mat includes substantially planar respective top and bottom faces, multiple sides and at least one edge extending around each side thereof. The mats are constructed and arranged to support the weight and movement of personnel, vehicles and equipment thereupon. The apparatus includes a plurality of substantially planar, removable, electrically-conductive covers constructed at least partially of electrically-conductive material and constructed and arranged to support the weight and movement of personnel, vehicles and equipment thereupon. Each cover extends at least partially across the top face of one of the mats without extending over any of the edges thereof. Each cover includes at least one conductive interface configured to electrically couple the cover to another cover in the load-supporting surface. At least one of the covers is configured to be electrically coupled to the earth. A plurality of adjustable, releasable couplers is configured to releasably couple each cover to its associated mat. A least some of the couplers are loosely engaged between, and not rigidly coupled to, the cover and the mat to allow acceptable relative movement therebetween so that each cover and its associated mat may flex, expand and contract relative to the other during normal, typical or expected use conditions of the load-supporting surface without decoupling the cover from its associated mat or undesirably damaging or deforming the cover or the mat.

The present disclosure involves embodiments of methods of electrically grounding a reusable load-supporting surface deployed on or near the surface of the earth. The load-supporting surface includes at least two mats, each mat having substantially planar respective top and bottom faces, multiple sides and at least one edge extending around each side. The mats are configured to support the weight and movement of personnel, vehicles and equipment thereupon. The method includes positioning one among a plurality of substantially planar, removable, electrically-conductive covers at least partially across the top surface of each mat without extending over any of the edges thereof. Each cover is constructed at least partially of electrically-conductive material and configured to support the weight and movement of personnel, vehicles and equipment thereupon. A plurality of selectively adjustable, releasable, couplers is loosely, releasably engaged a between each cover and its associated mat so that each cover stays positioned at least partially across the top face of its associated mat during use of the load-supporting surface and to allow the cover and mat to be moveable relative to one another due to one or more environmental factors during normal, typical or expected use conditions of the load-supporting surface without decoupling the cover from its associated mat and without undesirably damaging or deforming the cover or mat while allowing the cover and mat to support the weight and movement of personnel, vehicles and equipment thereupon. At least one conductive interface of each cover is electrically coupled to at least one conductive interface of at least one other mat in the load-supporting surface. At least one of the mats is grounded.

Accordingly, the present disclosure includes features and advantages which are believed to enable it to advance support surface technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 3 is a perspective view of an exemplary mat useful in a load-supporting surface in accordance with the present disclosure;

FIG. 4 is a top view of a portion of an exemplary load-supporting surface useful in accordance with an embodiment of the present disclosure;

FIG. 5 is a top view of an exemplary mat equipped with an embodiment of an electrically-conductive cover in accordance with the present disclosure;

FIG. 6A is a top view of an exemplary cut-out frame useful as part of an electrically-conductive cover in accordance with an embodiment of the present disclosure;

FIG. 6B is a side view of the exemplary cut-out frame of FIG. 6A;

FIG. 6C is a perspective view of the exemplary cut-out frame of FIG. 6A;

FIG. 7A is a top view of an exemplary load-supporting surface having two mats equipped with electrically-conductive covers in accordance with an embodiment of the present disclosure;

FIG. 7B is a side view of the load-supporting surface of FIG. 7A;

FIG. 8 is an exploded view of a portion of the load-supporting surface of FIGS. 7A and B;

FIG. 9 is an exploded view of a portion of the load-supporting surface of FIG. 8;

FIG. 10A is a cross-sectional view of a portion of an embodiment of an outer frame useful as part of an electrically-conductive cover in accordance with an embodiment of the present disclosure;

FIG. 10B is a cross-sectional view of another a portion of an embodiment of an outer frame useful as part of an electrically-conductive cover in accordance with an embodiment of the present disclosure;

FIG. 11 is an assembly view of an exemplary bolted mat with which an electrically-conductive cover may be used in accordance with an embodiment of the present disclosure;

FIG. 12A is a top view of an exemplary load-supporting surfacing having a single mat equipped with an embodiment of an electrically-conductive cover in accordance with the present disclosure;

FIG. 12B is an exploded view of a portion of the load-supporting surface of FIG. 12A;

FIG. 20 is a perspective view of an exemplary load-supporting surface with exemplary EPZ mats having exemplary lip covers in accordance with an embodiment of the present disclosure;

FIG. 21 is an exploded perspective view of part of the exemplary load-supporting surface of FIG. 20;

FIG. 28 is a perspective view of an exemplary electrical connection bar shown used with an exemplary EPZ mat in accordance with an embodiment of the present disclosure;

FIG. 29 is a perspective view of the exemplary electrical connection bar of FIG. 28;

FIG. 30 is a perspective view from above of the exemplary electrical connection bar of FIG. 29 shown used at a first location on an embodiment of an EPZ mat in accordance with the present disclosure;

FIG. 31 is an exploded assembly view of the exemplary electrical connection bar and EPZ mat of FIG. 30;

FIG. 32 is a perspective view from below of the exemplary electrical connection bar and EPZ mat of FIG. 30;

FIG. 36 is a top view of an exemplary electrically-conductive corner plate shown used with an embodiment of an EPZ mat in accordance with the present disclosure;

FIG. 37 is an exploded perspective view of two of the exemplary electrically-conductive corner plates of FIG. 36 shown mounted on adjacent exemplary EPZ mats and used to electrically connect them in accordance with an embodiment of the present disclosure;

FIG. 38A is a top view of an exemplary load-supporting surface with multiple exemplary EPZ mats each having the exemplary electrically-conductive corner plate of FIG. 36 mounted at each corner thereof in accordance with an embodiment of the present disclosure;

FIG. 38B is an exploded view of part of the exemplary load-supporting surface of FIG. 38A showing four adjacent exemplary electrically-conductive corner plates;

FIG. 39 is a top view two of the exemplary electrically-conductive corner plates of FIG. 36 shown mounted on adjacent exemplary EPZ mats and used to electrically connect them to an exemplary testing unit in accordance with an embodiment of the present disclosure;

FIG. 40 is a perspective view of the exemplary electrically-conductive corner plate of FIG. 36;

FIG. 42A is a top view of the exemplary EPZ mat of FIG. 41;

FIG. 42B is a side view of the exemplary EPZ mat of FIG. 41;

FIG. 42C is a cross-sectional view of one of the exemplary EPZ mats of FIG. 42A showing an exemplary coupler;

FIG. 43A is a top view of an exemplary load-supporting surface with multiple of the exemplary EPZ mats of FIG. 41 in accordance with an embodiment of the present disclosure;

FIG. 43B is an exploded view of part of one of the exemplary EPZ mats of FIG. 43A showing exemplary connection ports formed therein;

FIG. 43C is an exploded view of part of the load-supporting surface of FIG. 43A showing four of the exemplary EPZ mats electrically interconnected;

FIG. 44A is an assembly view of an embodiment of an insulated EPZ mat having an exemplary electrically-conductive cover coupled to an exemplary mat with at least one top-side fastener;

FIG. 45 is a top view of an embodiment of an insulated EPZ mat in accordance with the present disclosure;

FIG. 46 is a side assembly view of the exemplary insulated EPZ mat of FIG. 45;

FIG. 50 is an assembly view of another embodiment of insulated EPZ mat in accordance with the present disclosure;

FIG. 51 is a side view of the exemplary insulated EPZ mat of FIG. 50 once assembled; and FIG. 52 is an exploded side view of part of the exemplary insulated EPZ mat of FIG. 51.

DETAILED DESCRIPTION OF PREFERRED EMBODIMENTS

Figure 1:
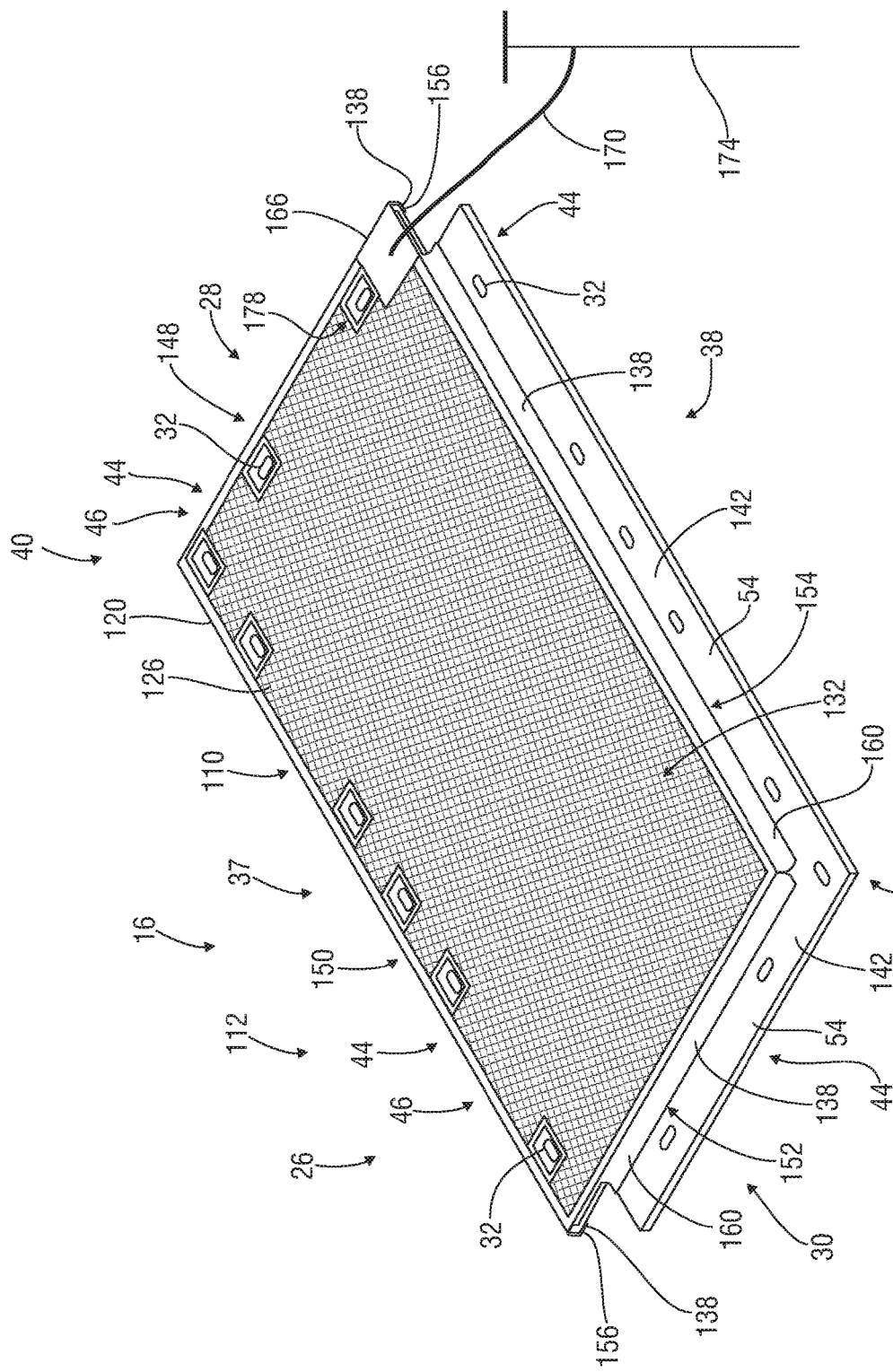
FIG. 1 is a perspective view of an exemplary load-supporting surfacing having a single exemplary mat equipped with an exemplary electrically-conductive cover to form an exemplary EPZ mat in accordance with an embodiment of the present disclosure.

Characteristics and advantages of the present disclosure and additional features and benefits will be readily apparent to those skilled in the art upon consideration of the following detailed description of exemplary embodiments and/or referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of this disclosure or any appended claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent (including the claims), the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims mean either an indirect or direct connection or engagement, except and only to the extent as may be expressly recited and explicitly required in a particular claim hereof and only for such claim(s) and any claim(s) depending therefrom. Thus, if a first device couples to a second device, that connection may be through a direct connection, or through an indirect connection via other devices and connections, except and only to the extent as may be expressly recited and explicitly required in a particular claim hereof and only for such claim(s) and any claim(s) depending therefrom. The terms "rigidly coupled to" and variations thereof as used herein and in the appended claims mean the referenced components are coupled in a manner that prevents at least substantial, and in some cases any, movement of the components relative to one another during normal or expected operations. As used herein and in the appended claims, the terms "substantially", "generally" and variations thereof mean and includes (i) completely, or 100%, of the referenced parameter, variable or value, and (ii) a range of values less than 100% based upon the typical, normal or expected degree of variation or error for the referenced parameter, variable or value in the context of the particular embodiment or use thereof, such as, for example, 90-100%, 95-100% or 98-100%.

Certain terms are used herein and in the appended claims to refer to particular components. As one skilled in the art will appreciate, different persons may refer to a component by different names. The use of a particular or known term of art as the name of a component herein is not intended to limit that component to only the known or defined meaning of such term (e.g. bar, connector, rod, cover, panel, bolt). Further, this document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, an exemplary support mat 26 is shown associated with at least one electrically-conductive cover 110 useful for allowing the mat 26 to be electrically grounded as part of an EPZ zone or any other desired location. As used herein and in the appended claims and understood by persons of ordinary skill in the art, the term "mat" is the name for and refers to one or more sections of material useful to at least partially cover an area (on the ground or other surface), constructed of any desired material and capable of supporting any desired load. Some examples of mats are ground covers, sheets, panels and the like, which may be construed of any desired material or combination of materials. As used herein and in the appended claims, the terms "ground" and variations thereof mean the earth's surface, and/or one or more other surfaces, structures or areas proximate to or associated with the earth's surface.

Figure 2:
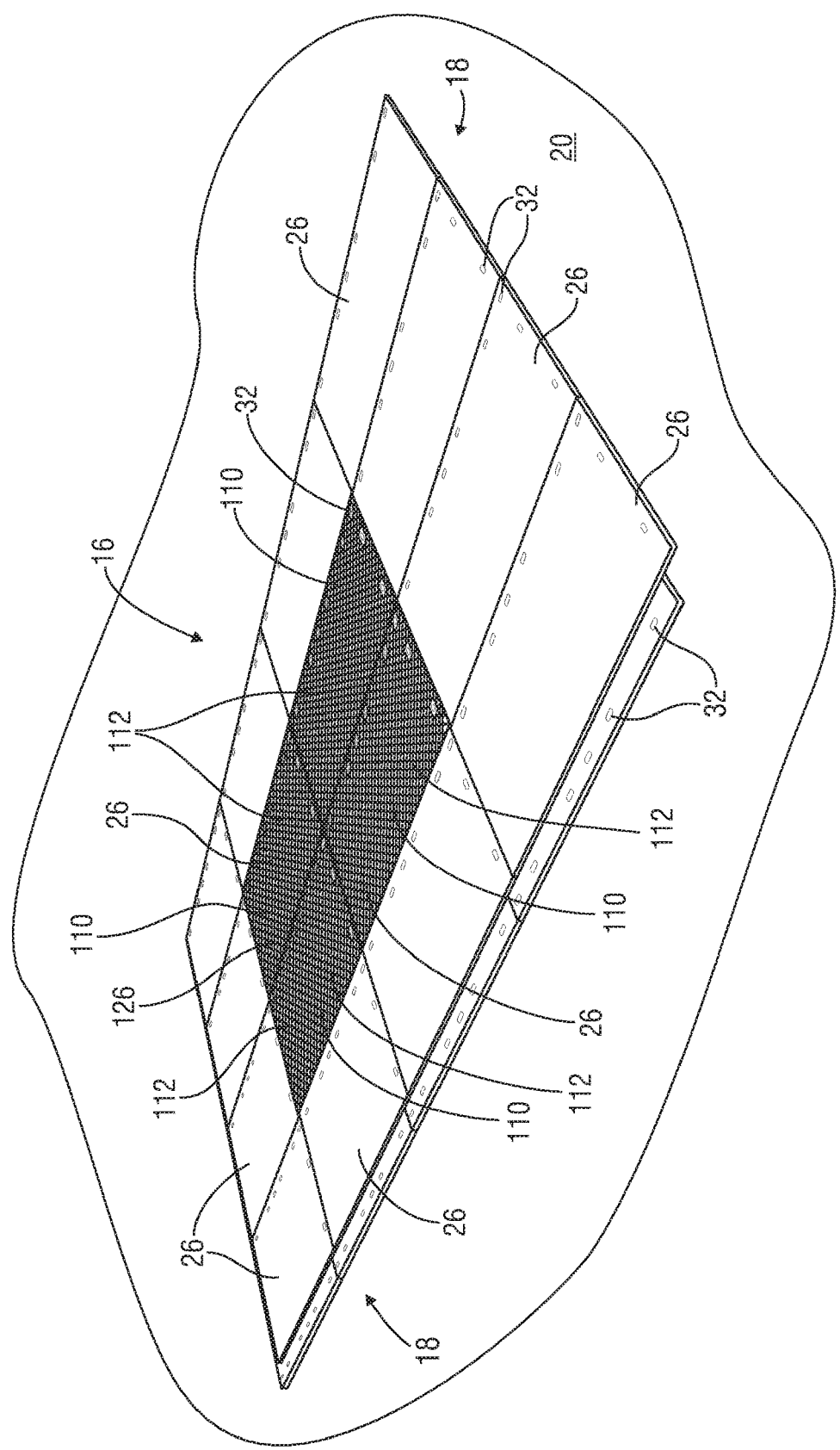
FIG. 2 is a perspective view of an exemplary load-supporting surfacing having multiple mechanically interconnected mats, some of which are equipped with an embodiment of an electrically-conductive cover and electrically coupled together in accordance with the present disclosure.

In this illustration, the mat 26 serves as a load-supporting surface 16 deployed on the ground or other surface. In other embodiments, such as shown in FIG. 2, a larger load-supporting surface 16 that includes multiple interconnected mats 26 is shown. In that example, the load-supporting surface 16 includes some mats 26 having electrically-conductive covers 110 associated therewith and other mats 26 not having any electrically-conductive covers 110. As used herein, the terms "EPZ mat" 112 and variations thereof refer to a mat 26 having at least one electrically-conductive cover 110 associated therewith. Thus, in this embodiment, when multiple interconnected EPZ mats 112 are used, each electrically-conducive cover 110 is useful for allowing the load-supporting surface 16 to be electrically grounded.

Still referring to FIG. 1, the load-supporting surface 16 and mats 26 may have any suitable form, construction, components, configuration and operation. In the illustrated embodiment, the load-supporting surface 16 includes at least two reusable, interconnectable, adjacent mats 26. However, the load-supporting surface 16 may include mats 26 which are not reusable or interconnectable.

If desired, each exemplary load-supporting surface 16 and mat 26 may be capable of supporting the weight of personnel, vehicles, equipment and/or other structures thereupon and moving thereacross. In some embodiments, the mats 26 may be heavy-duty, durable, all-weather and capable of supporting and withstanding substantial weight and forces placed thereupon in harsh outdoor environments and circumstances (e.g. supporting heavy structures, equipment, wheeled and/or tracked vehicles and equipment typically used at remote oilfield or hydrocarbon production, storage, and/or transportation sites, pipeline locations, construction, military, transportation, disaster response, utilities or entertainment sites, etc.). In various embodiments, the mat 26 may weight approximately 1,000 lbs., be designed to withstand up to, or in some cases more than, 600 psi in pure crush pressure placed thereupon, reduce point-to-point ground pressure on the ground 20 that may be caused by wheeled and/or tracked vehicles on or moving across the mat 26, or a combination thereof. For example, the mats 26 may be 14'×8' DURA-BASE® mats currently sold by the Assignee of this patent. A mat 26 having any of the features or capabilities mentioned in this paragraph may be sometimes referred to as a "heavy load supporting" mat.

Some examples of mats 26 which may be used in various embodiments of the present disclosure are shown and described in U.S. Pat. No. 5,653,551 to Seaux, entitled "System for Construction of Roadways and Support Surfaces" and issued on Aug. 5, 1997, and U.S. Pat. No. 6,511,257 to Seaux et al., entitled "Interlocking Mat System for Construction of Load Supporting Surfaces" and issued on Jan. 28, 2003, both of which have a common Assignee as the present patent and the contents of which are hereby incorporated by reference herein in their entireties. However, the mats 26 may not have the above capabilities, specifications or features, or as provided in the above-referenced patents. For example, the mats 26 (and load-supporting surfaces 16) may not be heavy-duty, durable, all-weather, capable of supporting the weight of personnel, vehicles, equipment and/or other structures thereupon or a combination thereof, and may be used in indoor locations. Thus, the type of mat 26 and load-supporting surface 16 is not limiting upon the present disclosure and appended claims, except and only to the extent as may be expressly recited and explicitly required in a particular claim hereof and only for such claim(s) and any claim(s) depending therefrom.

Still referring to FIG. 1, if desired, the mats 26 may be used in connection with any of the components and features described and shown in U.S. Pat. No. 9,132,996 issued on Sep. 15, 2015 to Robertson and entitled "Crane-Mounted Grab Head", U.S. Pat. No. 7,370,452 issued on May 13, 2008 to Rogers and entitled "Mat Assembly for Heavy Equipment Transit and Support", U.S. Pat. No. 9,039,325 issued on May 26, 2015 to McDowell and entitled "Liquid Containment System for Use with Load Supporting Surfaces", U.S. Pat. No. 9,430,943 issued on Aug. 30, 2016 and entitled "Apparatus and Methods for Providing Illuminated Signals from a Support Surface", U.S. Pat. No. 9,337,586 issued on May 10, 2016 and entitled "Apparatus & Methods for Electrically Grounding a Load-Supporting Support Surface", U.S. Pat. No. 9,368,918 issued on Jun. 14, 2016 and entitled "Apparatus and Methods for Electrically Grounding a Load-Supporting Support Surface", U.S. Pat. No. 9,735,510 issued on Aug. 15, 2017 and entitled "Apparatus and Methods for Electrically Grounding at Least one Mat in a Load-Supporting Surface", U.S. Pat. No. 9,297,124 issued on Mar. 29, 2016 and entitled "Methods of Moving at Least One Mat With a Crane-Mounted Grab Head", U.S. patent application Ser. No. 15/132,410, filed on Apr. 19, 2016 and entitled "Apparatus & Methods for Supporting One or More Upright Items from a Support Surface", U.S. patent application Ser. No. 15/484,857 filed on Apr. 11, 2017 and entitled "Apparatus, System and Methods for Providing Accessories on a Support Surface", as well as all related patents issuing from each of the applications mentioned above, each of which has a common Assignee as the present patent and the contents of which are hereby incorporated by reference herein in their entireties.

Referring now to FIG. 3, in the illustrated embodiment, each mat 26 is substantially flat, or planar, and constructed of impermeable material, such as thermoplastic. Other example mats 26 may be constructed entirely or partially of wood (e.g. 3-ply wood mat 408 of FIGS. 50-52), timber mat, plank mat), steel, steel-framed wood, aluminum, rubber, plastic, fiberglass, fiber reinforced plastic, recycled rubber or materials or any other desired material(s) or a combination thereof and/or may not be substantially planar.

The exemplary mat 26 has a rectangular shape with an opposing pair of short sides 28, 30, an opposing pair of long sides 37, 38, and at least one edge 44 extending along each side 28, 30, 37 and 38. In this particular example, the first short side 28 and first long side 37 each have an upper lip 46 extending horizontally outwardly therefrom, forming edges 44 therearound and which will be spaced above the earth's surface, or ground, 20 or other surface. The second short side 30 and second long side 38 each have a lower lip 54 extending horizontally outwardly therefrom, forming edges 44 therearound and which will rest on or near the earth's surface, or ground, 20 or other surface. The illustrated ground cover 26 thus has a first, upper, set of aligned edges 44a and a second, lower, set of aligned edges 44b. In this embodiment, a first corner 40 of the mat 26 is formed by the adjacent upper lips 46 and a second corner 42 is formed by the adjacent lower lips 54.

Still referring to FIG. 3, the upper and lower lips 46, 54 may have any suitable size, shape, configuration and length. It should be understood, however, that the present disclosure is not limited to use with the above-described embodiments of mats 26 having upper and/or lower lips 46, 54. For example, mats 26 not having upper and/or lower lips 46, 54, having a square, triangular, hexagonal or any other desired shape may be used. In fact, different mats 26 in the same load-supporting surface 16 may have different shapes and configurations.

The exemplary mat 26 is also reversible. In other words, the top (e.g. having top face 132) and bottom (e.g. having bottom face 134) of the illustrated mat 26 are mirror images of one another, so either the top or bottom can be facing up or down. In other embodiments, the ground covers 26 may not be reversible. If desired, the upper and/or lower faces 132, 134 may include raised traction promoting elements, such as the treads, 49 (e.g. FIGS. 44A, 44b) formed in or extending from the mat 26. Some exemplary raised traction promoting elements that may be used on the ground covers 26 in some embodiments are shown and described in U.S. Pat. No. 6,511,257. However, treads 49 are not required.

Still referring to the embodiment of FIG. 3, the respective upper and lower lips 46, 54 of different mats 26 are interconnectable with locking pins 34 (e.g. FIGS. 4 & 5) releasably securable through corresponding locking pin holes 32 formed therein. The locking pin holes 32 and locking pins 34 may have any suitable form, construction and configuration. In this embodiment, the illustrated mats 26 include a plurality of locking pin holes 32, each configured to accept a releasable locking pin 34 (e.g. FIG. 4) therethrough. Each illustrated mat 26 may include a total of sixteen locking pin holes 32, eight formed in each of the upper and lower lips 46, 54. However, the exemplary mat 26 may have any other desired number and configuration of locking pin holes 32. In other embodiments, the mats 26 may not be interconnectable and/or may not include locking pin holes 32 (e.g. FIGS. 50-52).

Some examples of locking pins 34 which may be used in various embodiments of the present disclosure are shown and described in U.S. Pat. No. 6,722,831 to Rogers et al., entitled "Fastening Device" and issued on Apr. 20, 2004, U.S. Pat. No. 8,388,291 to Rogers, entitled "Mat Lock Pin" and issued on Mar. 5, 2013, U.S. Pat. No. 9,068,584 to McDowell et al., entitled and "Apparatus & Methods for Connecting Mats" and issued on Jun. 30, 2015, U.S. patent application Ser. No. 14/752,067 entitled "Adjustable Mat Locking Pin and Methods of Use Thereof" and filed on Jun. 26, 2015, and U.S. patent application Ser. No. 15/259,407 entitled "Apparatus and Methods for Connecting Components of a Support Surface" and filed on Sep. 8, 2016, as well as all related patents issuing from each of the applications mentioned above, each of which has a common Assignee as the present patent and the entire contents of which are hereby incorporated by reference herein in its entirety. In some embodiments, the locking pins 34 may form a fluid-tight seal around, or in, the locking pin holes 32 within which they are engaged, such as the exemplary locking pin 34 illustrated and described in U.S. Pat. No. 9,068,584 and U.S. patent application Ser. No. 15/259,407 and Ser. No. 14/752,067.

Still referring to FIG. 3, in the illustrated example, the locking pin holes 32 of the mats 26 have an oval-shape to accept an oval-shaped enlarged head 36 (e.g. FIGS. 4 & 5) of the illustrated locking pins 34. However, the locking pin holes 32 may have a different shape (e.g. circular, rectangular, hexagonal, square, octagonal, etc.). Further, the present disclosure is not limited by the nature of the locking pin holes 32 within which the locking pins 34 are insertable, and any type of orifices, openings, cut-outs, holes or cavities having any desired shape, location, configuration, orientation and form and within which the locking pins 34 is insertable or engageable may be used. Moreover, that the present disclosure is not limited to use with the above-described or referenced types and configurations of load-supporting surfaces 16, mats 26 and locking pins 34, or to the disclosures of the above-referenced patents and patent applications. Any suitable load-supporting surfaces 16 and mats 26, with or without any suitable locking pins 34 and locking pin holes 32, may be used.

Now referring to FIG. 4, in some embodiments, a gap 22 may be formed between adjacent edges 44 of adjacent mats 26 in the load-supporting surface 16 and one or more seal members 10 may be included therein. For example, the seal member(s) 10 may provide a fluid-tight seal in the gap 22 between adjacent mats 26 to prevent liquid introduced onto the load-supporting surface 16 from seeping or flowing between and below the load-supporting surface 16. Some embodiments of seal members 10 that may be used in the gaps 22 are disclosed in U.S. Pat. No. 9,212,746 to McDowell, issued on Dec. 15, 2015 and entitled "Apparatus and Methods for Sealing Between Adjacent Components of a Load-Supporting Surface", U.S. Pat. No. 9,499,946 issued on Nov. 22, 2016 and entitled "Method of Sealing Between Adjacent Components of a Load-Supporting Surface With at Least One Closed-Cell Compressible Rubber Seal", U.S. Pat. No. 9,637,871 issued on May 2, 2017 and entitled "Load-Supporting Surface with Actively Connected Gap Seals and Related Apparatus and Methods" and U.S. Pat. No. 9,404,227 issued on Aug. 2, 2016 and entitled "Load-Supporting Surface with Interfacing Gap Seal Members and Related Apparatus and Methods", as well as all related patents, all of which have a common Assignee as the present patent and the entire contents of which are hereby incorporated by reference herein in their entireties. However, sealing members 10 may not be used.

The load-supporting surface 16 may include or be associated with other components, and the seal member(s) 10 may also or instead be used between any combination of mats 26 and other components associated with the support surface 16. Some examples of such additional components that may be useful in connection with support surfaces 16, such as berm members, spacers, drive-over barriers, liquid drain assemblies, etc., are shown and disclosed in U.S. Pat. No. 9,039,325 and U.S. patent application Ser. No. 13/790,916, and borehole edge seal systems such as shown and described in U.S. patent application Ser. No. 14/497,429, entitled "Apparatus and Methods for Sealing Around the Opening to an Underground Borehole" and filed on Sep. 26, 2014 and U.S. patent application Ser. No. 14/666,584 entitled "Apparatus and Methods for Mechanically Coupling a Sealing System Around the Opening to an Underground Borehole" and filed on Mar. 24, 2015, as well as all related patents issuing from each of the applications mentioned above, all of which have a common Assignee as the present patent and the entire contents of which are hereby incorporated by reference herein in their entireties.

Referring back to FIG. 1, in accordance with the present disclosure, the electrically-conductive cover 110 may have any suitable form, configuration and operation so that it can be used to allow the load-supporting surface 16 to be effectively and successfully grounded to the earth or other suitable structure. In the present embodiment, the electrically-conductive cover 110 includes an outer frame 120 (see also FIGS. 6A-C) and an inner mesh portion 126. The frame 120 and mesh portion 126 may be constructed of any suitable material and have any suitable configuration that allows the load-supporting surface 16 to be effectively and successfully grounded to the earth or other suitable structure. For example, the frame 120 and mesh portion 126 may be constructed at least partially of aluminum, stainless steel or other electrically-conductive material or a combination thereof. The illustrated frame 120 is a welded rectangular steel frame providing rigidity for the cover 110 and preserving its integrity during use, such as when the EPZ mat 112 is driven over by vehicles and machinery. In this embodiment, the illustrated frame 120 is shown extending around substantially the entire mesh portion 126, but in other embodiments may not extend around the entire mesh portion 126. The mesh portion 126 may be constructed of any suitable at least partially metallic mesh or grating, such as an aluminum mesh configuration that is sufficiently electrically conductive and sufficiently strong and durable to withstand use as part of a load-supporting surface 16. However, in other embodiments, the electrically-conductive cover 110 may be a solid metallic sheet, or member, 111 (e.g. FIG. 50) or entirely mesh, include no mesh, include any other desired pattern of openings, or any other configuration.

In this example, the frame 120 and mesh portion 126 are welded together. For example, as shown in FIG. 5, the perimeter edges 128 of the mesh portion 126 may be welded to the top 122 of the frame 120. However, the frame 120 and mesh portion 126 may be coupled together or interconnected in any other suitable manner.

Referring again to FIG. 1, the illustrated cover 110 also includes at least one conductive interface 138 useful to electrically connect the EPZ mat 112 with one or more adjacent EPZ mats 112, other components or the earth. The conductive interface(s) 138 may have any suitable form, configuration and operation. In this embodiment, the cover 110 has an interface 138 extending on each side 28, 30, 37 and 38 of the mat 26 to electrically connect the mat 26 with a corresponding respective adjacent interconnected mats 26 (see e.g. FIGS. 2, 7-9) or other component. For example, the frame 120 may be used to form an interface 138 on each side 28, 30, 37 and 38 of the mat 26 that will abut, and thus electrically contact, an interface 138 on a respective adjacent interconnected mat 26. In the present embodiment, on each side 28, 37 of the mat 26 having upper lips 46, the frame 120 extends at least partially around the edge 44 thereof to form an underside face 156 (FIG. 9) which serves as the conductive interface 138 along that respective side of the mat 26 (See also FIGS. 8 & 9). On each side 30, 38 of the mat 26 having lower lips 54, the exemplary frame 120 extends at least partially across the top 142 of the lower lip 54 to form an upward face 160 that serves as the conductive interface 138 along that respective side of the mat 26. As shown in FIGS. 8 & 9, the respective interfaces 138 of adjacent interconnected EPZ mats 112 of this embodiment contact one another to form an electrically-conductive path therebetween. However, the present disclosure is not limited to the above type and arrangement of interfaces 138. For example, there may be interfaces on less than all sides 28, 30, 37 and 38 of the mat 26. For another example, the interface(s) 138 may be disposed at specific locations on one or more sides of 28, 30, 37 and 38 of the mat 26 and/or at entirely different locations on the cover 110.

Referring to FIG. 5, if desired, a conductive booster 188 may be used in connection with one or more interfaces 138 of each mat 112, such as to assist in ensuring a good electrical connection between adjacent interconnected mats 112. The conductive booster 188 may have any suitable form, configuration and operation. In the illustrated embodiment, the booster 188 is a metallic braided band 190 inserted between the corresponding underside face 156 (see e.g. FIG. 9) and upward face 160 of the frames 120 on a pair of adjacent interconnected EPZ mats 112. The band 190 may, for example, have copper, aluminum or steel braiding and extend between a portion or all of the entire length of the adjacent faces 156, 160. In this embodiment, the band 190 is a copper braided band coupled, such as with rivets 198, screws or other connectors, to each upward face 160 of the frame 120 along its length. In other embodiments, multiple or few shorter sections of metallic braided band 190 may be used.

Referring to FIGS. 12A-B, if desired, the mesh portion 126 may include a cut-out 178 formed therein over each locking pin hole 32. For example, the cut-out 178 may be useful to electrically isolate a locking pin 34 (e.g. FIGS. 4 & 5) placed in the locking pin hole 32 and prevent electrical conductivity between the cover 110 and the locking pin 34. The cut-out 178 may have any suitable form, configuration and operation. In this example, each cut-out 178 is spaced away from its corresponding locking pin hole 32 to ensure sufficient electrical isolation. A cut-out frame 180 (see also FIGS. 6 & 8) constructed of any suitable material, such as one or more compatible electrically-conductive, metallic materials (e.g. aluminum, steel, etc.), is shown connected to, such as by weld, and covering the edges of the mesh portion 126 that form the cut-out 178. The cut-out frame 180 may, for example, provide stability around the cut-out 178 and/or protect the exposed mesh portion 126 on the edges of the cut-out 178. However, the cut-out frame 180, if included, may be constructed of any other suitable material and connected with the mesh portion 126 or mat 26 in any other suitable manner.

At least one interconnected EPZ mat 112 of the exemplary load supporting surface 16 may be grounded to the earth or other structure in any suitable manner. Referring back to FIG. 1, for example, a metal plate 166 may be electrically connected, such as by weld, to the cover 110. In this embodiment, the plate 166 is welded atop the mesh portion 126 and frame 120 in one corner of the cover 110. A grounding cable 170 is shown electrically connected between the plate 166 and a grounding rod 174 that may be driven into the earth for electrically grounding the entire load-supporting surface 16. For example, any suitable commercially available grounding cable 170 and rod 174 and related components may be used, such as the grounding rod currently having Catalog No. 4370, stringing rod currently having Catalog No. 9738 and hanger studs currently having Catalog Nos. 13190-1 and 13210 currently sold by Hastings Hot Line Tools and Equipment.

In accordance with an embodiment of a method of assembly and use, the exemplary EPZ mat 112 may be assembled in any suitable manner. For example, referring to FIG. 1, the illustrated frame 120 and mesh portion 126 are connected, such as by weld. If desired, the frame 120 and mesh portion 126 may be painted with galvanized paint, such as to enhance their electrical conductivity and reduce or prevent corrosion. The exemplary cover 110 is positioned on the generally planar top face, or surface, 132 of the mat 26. (Note, the top surface 132 of the exemplary mat 26, as referenced herein, does not include its lower lips 54 because the lower lips 54 are in a substantially different plane. Similarly, the generally planar bottom face, or surface, 134 of the exemplary mat 26 (e.g. FIGS. 31, 42B), as referenced herein, does not include its lower lips 54 because the lower lips 54 are in a substantially different plane.)

In this embodiment, the edges 148, 150 of the illustrated frame 120 that are aligned with the respective sides 28, 37 of the mat 26 may be at least partially bent around the edges 44 thereof. The edges 152, 154 of the illustrated frame 120 that align with the respective sides 30, 38 of the mat 26 may be at least partially bent down and out over part of the top 142 of the respective lower lip 54 (see also FIGS. 10A-B). In other embodiments, one or more of the edges 148, 150, 152, 154 of the frame 120 may be at least partially preformed or bent into its desired shape (see also FIGS. 10A-B) before placement of the cover 110 onto the mat 26.

It should be noted that in other embodiments, the cover 110 may also or instead extend at least partially across the generally planar bottom face, or surface, 134 (e.g. FIGS. 31, 42B) of the mat 26, or may extend across only part of the top surface 132 of the mat 26. Likewise, the frame 120 may extend across a different portion, or all, of the lower lip 54 of the sides 30, 38 of the mat 26 and may, if desired, extend around the edges 44 thereof. Thus, the present disclosure is not limited to a cover 110 having a mesh portion 126 that extends over the entire top surface 132 of the mat 26 and a frame 120 that extends at least partially around the edges 44 of the sides 28, 37 and across at least a portion of the lower lip 54 of the sides 30, 38 of the mat 26. Any other suitable configuration may be used.

If desired, the frame 120 and/or mesh portion 126 may be further coupled to the mat 26, such as with one or more connectors, in any suitable manner. For example, referring to FIG. 11, the mesh portion 126 (e.g. FIG. 1) may be connected, such as by tack weld, to multiple of the bolt heads 70 accessible at the top surface 132 of a "bolted" mat 26. Bolted mats 26 may be formed, for example, by bolting two mat sections 21a, 21b together with bolts 69 extended through aligned holes 29 formed in the sections 21a, 21b and secured with nuts 71, such as shown and described in U.S. Pat. No. 6,511,257 (e.g. FIG. 6 therein).

Referring again to FIG. 1, the booster(s) 188 and metal grounding plate 166, if included on this particular mat 112, may be coupled to the cover 110, such as described above, in advance or at any desired time after the cover 110 is coupled to the mat 26. If the load-supporting surface 16 includes multiple of the exemplary EPZ mats 112 (e.g. FIGS. 2, 7), the overlapping lips 46, 54 of adjacent mats 26 are interconnected using locking pins 34 (e.g. FIGS. 4 & 5) as described above and in one or more of the patents and patent applications previously incorporated herein by reference. In the referenced embodiments, the exemplary locking pins 34 should typically accurately position the adjacent mats 26 relative to one another and firmly interconnect them, avoiding unnecessary rises and falls and helping form a strong electrical connection therebetween.

As shown in FIGS. 7-9, upon interconnection of the illustrated mats 112, the interfaces 138 of adjacent mats 112 will contact one another to electrically connect them together. Grounding of at least one mat 112 will electrically ground the series of interconnected mats 112 in the load-supporting surface 16. A low resistivity path is formed between each mat 112, allowing the flow of electrical charge and limiting the rise of earth potential over the load-supporting surface 16. Electrical tests for the exemplary load-supporting surface 16 have demonstrated that they successful pass electrical current from one mat 112 to the next without substantial losses of electrical current or build-up of substantial heat.

After use, the illustrated EPZ mats 112 of a multi-mat load-supporting surface 16 may be disconnected from one another. In the present embodiment, the exemplary cover 110 of each EPZ mat 112 may be removed from its corresponding mat 26 and replaced onto the same or another mat 26. For example, if the cover 110 suffers extensive damage during use, it can be removed, repaired and/or replaced. The exemplary mat 26 may be reused with or without the cover 110.

Figure 13:
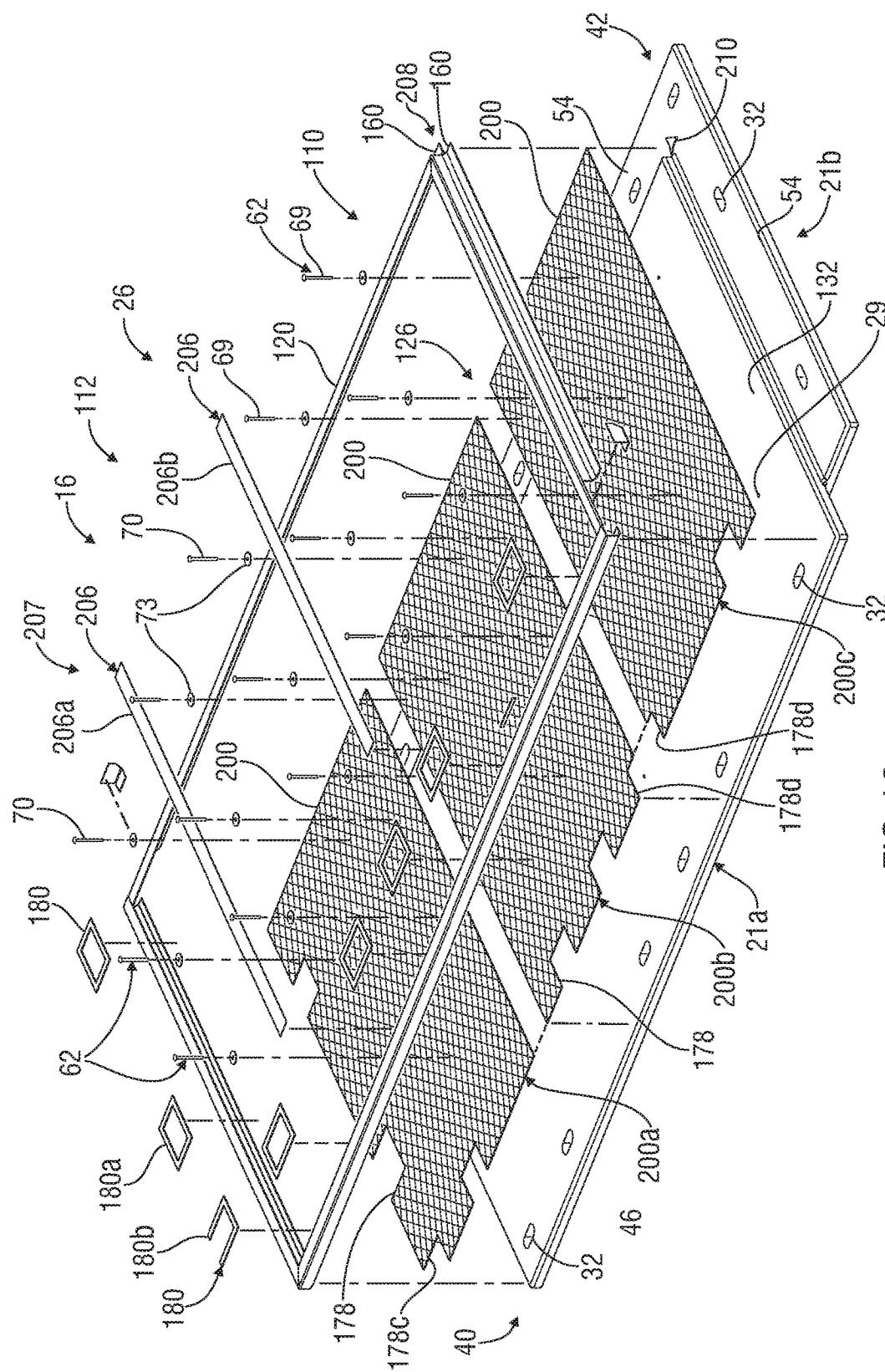
FIG. 13 is an exploded assembly view of an exemplary EPZ mat in accordance with another embodiment of the present disclosure.

Referring now to FIG. 13, in another independent aspect of the present disclosure, the mesh portion 126 of the electrically-conductive cover 110 may include multiple grate panels 200 for any desired purpose, such as to provide ease of manufacture, handling, assembly, disassembly and/or maintenance, assist in preserving the integrity of the cover 110 during use or a combination thereof. The grate panels 200 may have any suitable form, configuration, construction and components. Further, any desired number of grate panels 200 may be used to form a mesh portion 126. In the illustrated example, three grate panels 200a, 200b, 200c are interconnected to form the mesh portion 126 (See also FIGS. 14-15). In other embodiments, only two, four, five or more grate panels 200 may be used.

The grate panels 200 may be constructed of any suitable material sufficiently electrically conductive and strong and durable to withstand use as part of a load-supporting surface 16. For example, the grate panels 200 may be at least partially metallic mesh or grating, such as an aluminum mesh configuration.

Figure 16:
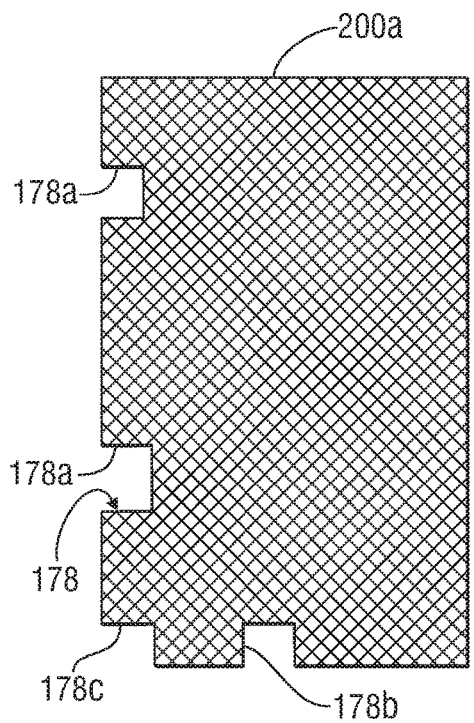
FIG. 16 is a top view of a first exemplary grate panel useful as part of an embodiment of an electrically-conductive cover in accordance with the present disclosure.
Figure 17:
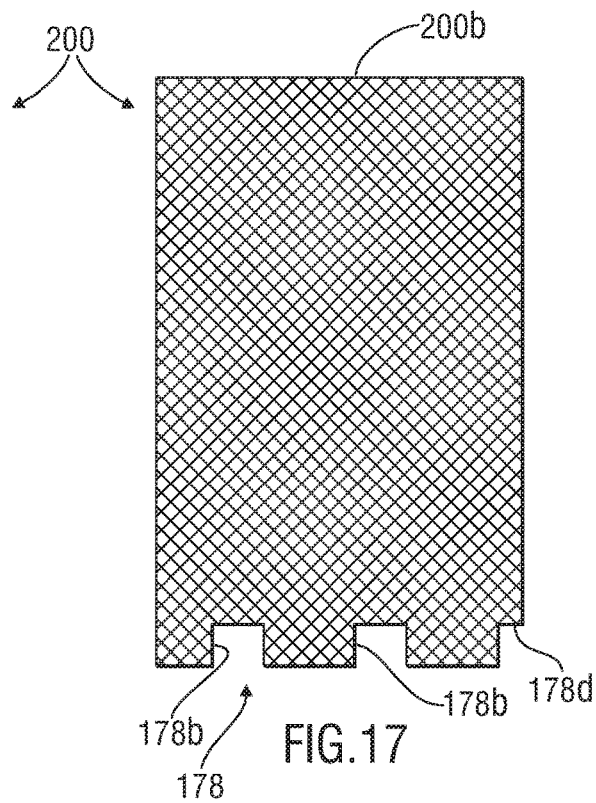
FIG. 17 is a top view of a second exemplary grate panel useful as part of an embodiment of an electrically-conductive cover in accordance with the present disclosure.
Figure 18:
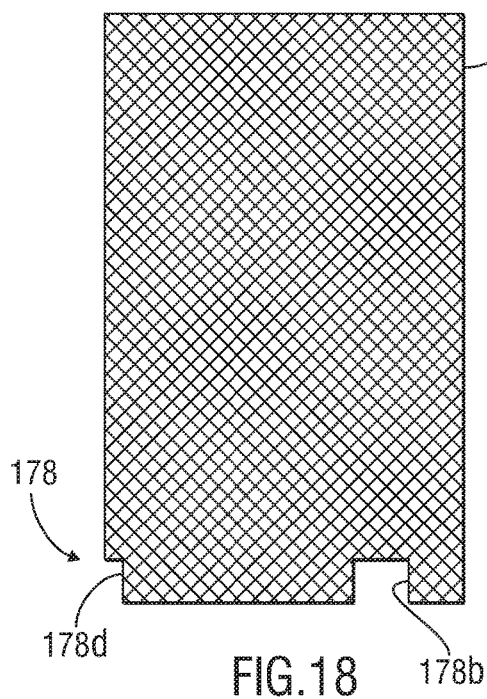
FIG. 18 is a top view of a third exemplary grate panel useful as part of an embodiment of an electrically-conductive cover in accordance with the present disclosure.

Still referring to the embodiment of FIG. 13, if desired, the grate panels 200 may be formed with cut-outs 178. For example, the grate panels 200 may have cut-outs 178 extending to their edges and configured to at least partially surround the locking pin holes 32 formed in the upper lips 46 of the associated mat 26 (See e.g. FIGS. 14-15). In this embodiment, as shown in FIG. 16, the first grate panel 200a includes two short side cut-outs 178a, one long side cut-out 178b and one full corner cut-out 178c. The second exemplary grate panel 200b (e.g. FIG. 17) includes two long side cut-outs 178b and one partial corner cut-out 178d. The third illustrated grate panel 200c (e.g. FIG. 18) includes one long side cut-out 178b and one partial corner cut-out 178d.

Figure 14:
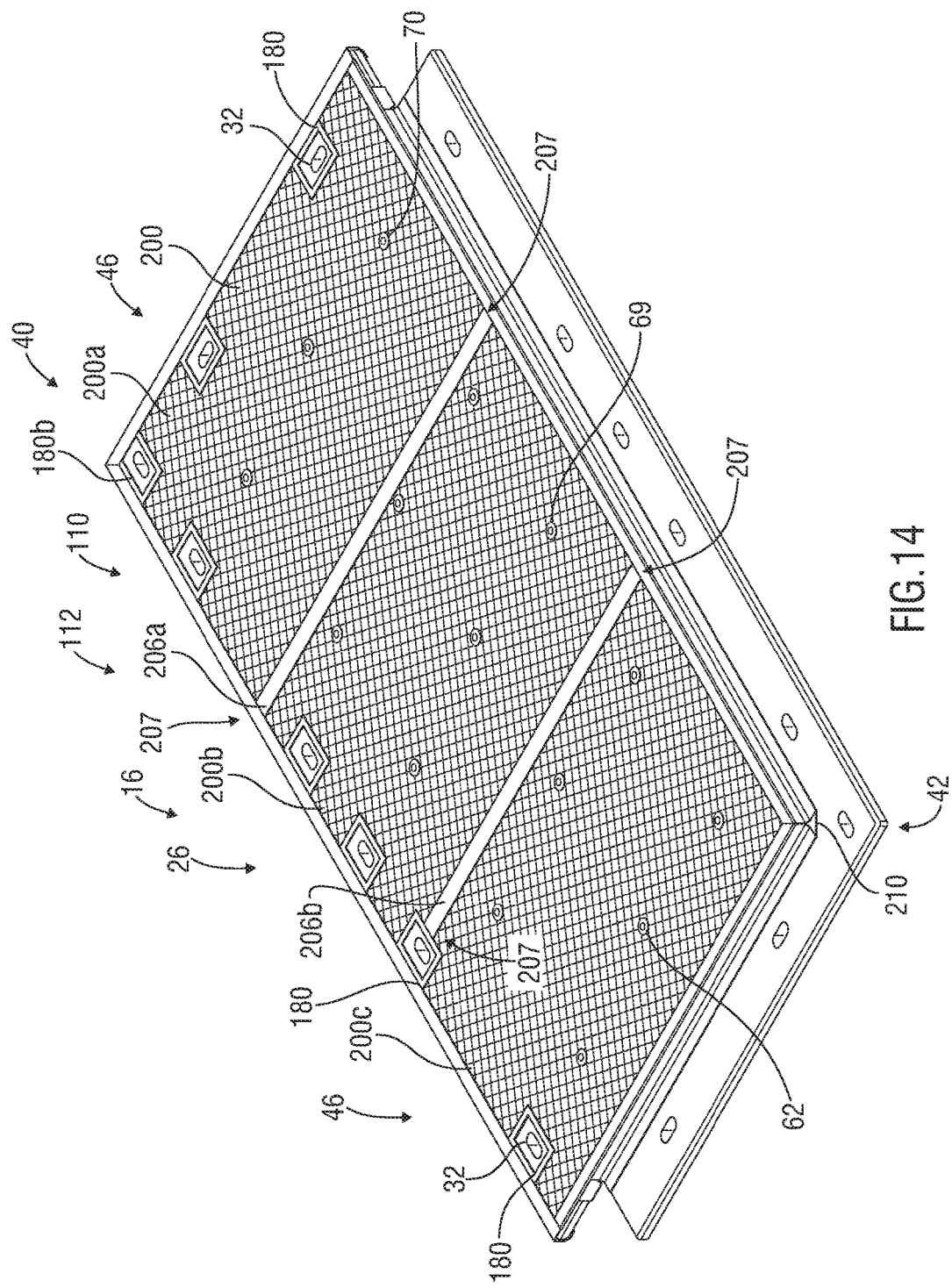
FIG. 14 is a perspective view of the exemplary EPZ mat of FIG. 13.
Figure 15:
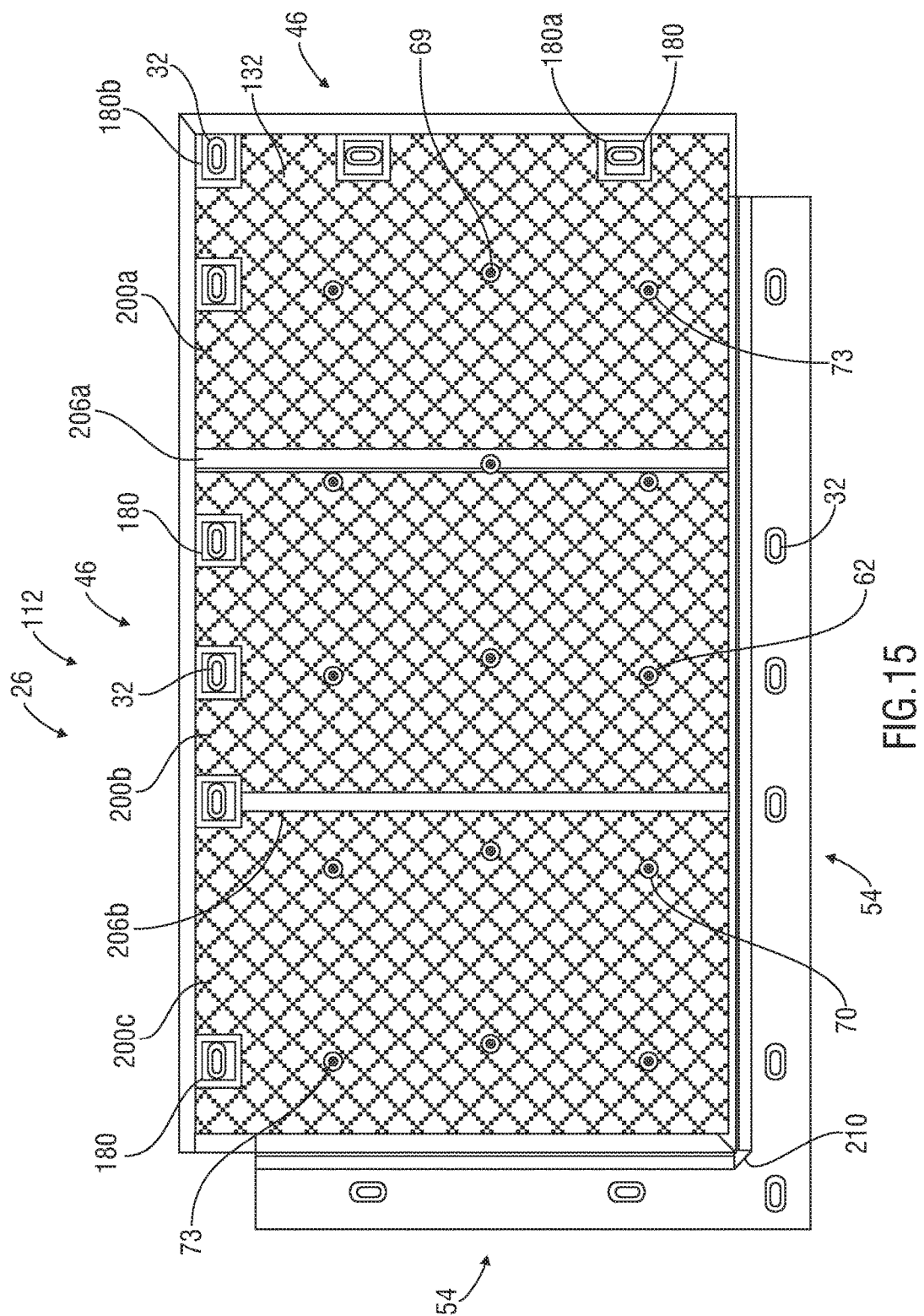
FIG. 15 is a top view of the exemplary EPZ mat of FIG. 13.

Referring FIGS. 13-15, one or more cut-out frames 180 may be used with the exemplary grate panels 200. For example, cut-out frames 180 may be coupled to and cover the edges of the grate panels 200 that form the cut-outs 178. In this example, rectangular-shaped cut-out frames 180a are shown welded to the grate panels 200 over all of the illustrated cut-outs 178, except the full corner cut-out 178c of the first grate panel 200a (at the first corner 40 of the mat 26) is shown having a U-shaped cut-out frame 180b (See also FIGS. 14-15).

In some embodiments, the grate panels 200 may be interconnected, and in other embodiments may not be interconnected. When interconnected, the grate panels 200 may be interconnected in any suitable manner. For example, the grate panels 200 may be welded together at their adjacent edges, clamped together or coupled using any other suitable coupling mechanism(s). In the illustrated embodiment, the cover 110 includes one or more internal frame members 206 for interconnecting adjacent grate panels 200. For example, a first illustrated internal frame member 206a may be welded atop adjacent edges of the first and second grate panel 200a, 200b, and a second internal frame member 206 welded atop adjacent edges of the second and third grate panel 200b, 200c (See also FIGS. 14-15). In other embodiments, the internal frame members 206 may be welded underneath the adjacent panels 200, or connected to the panels 200 in any other suitable manner. If desired, the internal frame members 206 may have additional purposes, such as to add strength and/or stiffness to the cover 110 and/or assist in preserving its integrity during use.

Still referring to FIGS. 13-15, the internal frame members 206 may have any suitable form, configuration and components. In this example, the internal frame members 206 are elongated. As used herein, the terms "elongated" and variations thereof mean an item having an overall length that is greater than its average width. The illustrated first internal frame member 206a is longer than the exemplary second internal frame member 206b, which intersects the illustrated adjacent partial corner cut-outs 178d of the grate panels 200b, 200c.

The illustrated internal frame members 206 may have any suitable construction. For example, the internal frame members 206 may be constructed at least partially of aluminum, steel, stainless steel or other sufficiently electrically-conductive material or a combination thereof, to provide the desired strength, durability, rigidity and flexibility for the cover 110 and preserve its integrity during use, such as when the EPZ mat 112 is driven over by vehicles and machinery or other suitable purpose.

If desired, one or more of the ends 207 of the internal frame members 206 may be interconnected with the outer frame 120 or one or more cut-out frames 180, such as by weld, clamp or other mechanism. In the embodiment of FIG. 14, both ends 207 of the internal frame members 206a are welded to the adjacent portions of the outer frame 120, while one end of the internal frame member 206b is welded to the adjacent outer frame 120 and its other end welded to the adjacent cut-out frame 180.

Referring still to FIGS. 13-15, in another independent aspect of the present disclosure, the mesh portion 126 (e.g. grate panels 200), and thus the covers 110, may be connected to the mats 26 with one or more couplers 62. The couplers 62 may have any suitable form, configuration, constructions, components and operation. In this embodiment, for example, the couplers 62 include bolts 69 extending into, but not through, the mat 26 and not welded to the exemplary mesh portion 126. A washer 73 may be sandwiched between each exemplary bolt head 70 and the upper surface of the exemplary mesh portion 126. In the embodiment of FIG. 44-B, for example, each bolt 69 threadably engages a threaded receiver 72 (e.g. oversized flange nut receiver) secured within the aperture 300 extending partially into the mat 26 from the upper surface 132 thereof. In this example, the aperture 300 is shown extending into an interior (e.g. honeycomb) cavity 75 of the (e.g. thermoplastic) mat 26 and the receiver 72 is coupled to the mat 26 with screws 74 or other couplers. This sort of arrangement may sometimes be referred to as a "top-side fastener" arrangement. However, any other suitable configuration and arrangement may be used.

In other embodiments, the couplers 62 may extend through the mat 26 and may be releasably secured to the mat 26, such as with one or more nuts 302 (e.g. FIG. 42C) or other connector(s). Any desired number of couplers 62 may be included. In the embodiment of FIGS. 13-15, for example, fifteen bolts 69 are shown extending into the mat 26 at predetermined locations; however, more or less couplers 62 may be used.

Figure 19:
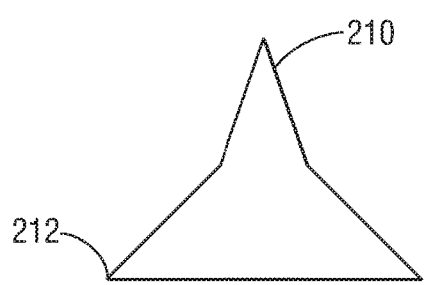
FIG. 19 is a top view of an exemplary corner insert useful as part of an embodiment of an electrically-conductive cover in accordance with the present disclosure.

Referring to FIG. 13, in some embodiments, a space 208 is formed between the adjacent upper faces 160 of the frame 120 proximate to the second corner 42 of the mat 26. In such instances, if desired, a corner insert 210 may be affixed to the frame 120 and/or mat 26 in the space 208. The corner insert 210 may have any suitable form, shape, configuration and operation. In this example, the corner insert 210 is triangular, or star-shaped (e.g. FIG. 19), and fills in the space 208. If desired, the corner insert 210 may engage the frame 120 and/or mat 26, such as to assist in securing the frame 120 to the mat 26. In this example, the corner insert 120 may be welded to the adjacent edges of the frame 120, such as to assist in preserving the integrity of the frame 120 at that location. Also, if desired, a point 212 of the corner insert 210 may be configured to stab into the mat 26 to assist in securing the frame 120 to the mat 26.

Referring now to FIG. 20, in another independent aspect of the present disclosure, in some situations, it may be desirable to have substantially all upwardly facing surfaces of the EPZ mats 112 in the load-supporting surface 16 covered with electrically-conductive material. This may be desirable, for example, when the user of the load-supporting surface 16 having EPZ mats 112 desires to minimize exposed surfaces of mats 26 (e.g. exposed thermoplastic or other material) in the load-supporting surface 16. In the illustrated embodiment, one or more electrically-conductive lip covers 220 are used on one or more of the lower lips 54 of one or more of the mats 26. For example, the mats 112 with lower lips 54 disposed on the perimeter 18 of the load supporting surface 16 may be equipped with lip covers 220. In other embodiments, for example, the electrically-conductive cover 110 itself may extend across the lower lips 54 of the associated mat to fully cover the mat 112.

The lip cover 220 may have any suitable form, configuration, construction, components, location and operation. For example, referring to FIG. 22, the lip cover 220 may include a lip cover frame 224 and at least one lip cover mesh portion 230. The lip cover frame 224 may have any or all of the features, characteristics and details of the outer frame 120 as described above and shown in the appended figures, and the lip cover mesh portion(s) 230 may have any or all of the features, characteristics and details of the mesh portion 126 as described above and shown in the appended figures. For example, the lip cover frame 224 and lip cover mesh portion 230 may be constructed at least partially of aluminum, steel, stainless steel or other sufficiently electrically-conductive material or a combination thereof that allows the associated lower lip 54 to be effectively grounded to the earth or other suitable structure, provide sufficient strength, durability, rigidity and flexibility and preserve the integrity of the lip cover 220 during use as part of a load-supporting surface 16, or for any other suitable purpose. In some embodiments, the lip cover mesh portion 230 may be constructed at least partially of metallic mesh or grating, such as an aluminum mesh configuration, and the lip cover frame 224 may be a welded rectangular steel frame.

Figure 22:
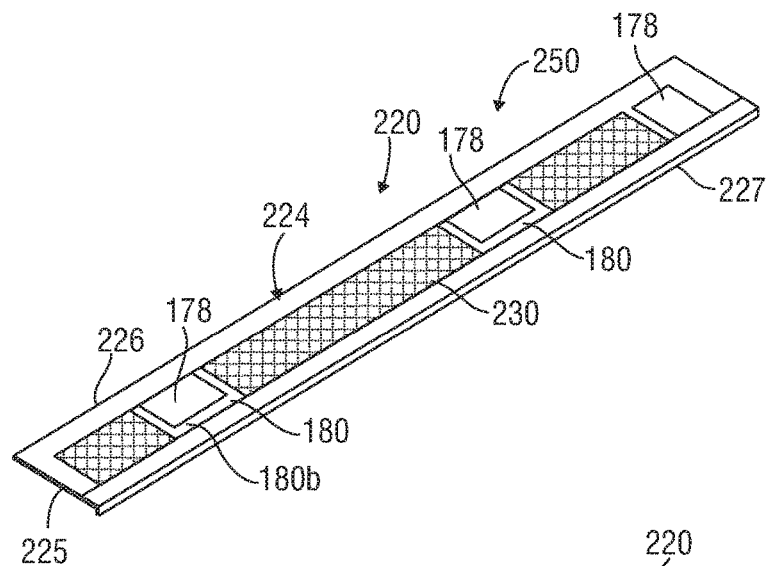
FIG. 22 is a perspective view of an exemplary short lip cover in accordance with an embodiment of the present disclosure.

Still referring to FIG. 22, in this embodiment, the lip cover frame 224 includes (i) a generally flat, elongated, inner frame member, or portion, 226, (ii) a generally flat end frame member, or portion, 225 on each end of the lip cover 220 and (iii) an elongated, L-shaped, outer frame member, or portion, 227, all rigidly coupled together. The outer portion 227 of the illustrated lip cover frame 224 is designed to extend at least partially over the respective edge 234 of the lower lip 54 of the corresponding mat 112 (e.g. FIG. 21) when the lip cover 220 is coupled to the mat 112.

In some embodiments, the lip cover frame 224 may be coupled to the lip cover mesh portion(s) 230 and in other embodiments may not. When coupled together, any suitable coupling mechanism(s) or technique may be used. In the illustrated example, the lip cover frame 224 and lip cover mesh portion 230 are welded together. For example, the lip cover frame 224 may be welded atop the edges of the lip cover mesh portion 230. In other embodiments, the lip cover mesh portion 230 may be welded atop the lip cover frame 224 or coupled in any other suitable manner.

Referring now to FIG. 21, if desired, the lip cover 220 may include at least one lip cover conductive interface 238 useful to electrically connect the lip cover 220 to one or more other components, such as the cover 110 of the same mat 26, the cover 110 of one or more other mats 26, another one or more lip covers 220 of the same mat 26 and/or one or more other mats 26, any other desired component(s) or a combination thereof. The lip cover conductive interface(s) 238 may have any suitable form, configuration and operation. For example, the lip cover conductive interface 238 may include a connector for electrically coupling the lip cover 220 to another component. In this embodiment, at least one lip cover conductive interface 238 is configured to electrically connect the lip cover 220 to the cover 110 of the same mat 26. The illustrated lip cover conductive interface 238 extends at least partially along the inner portion 226 of the lip cover frame 224 and contacts the cover 110 to allow electrical conductivity therebetween. For example, the bottom surface 228 of the inner portion 226 of the illustrated lip cover frame 224 overlays and contacts the upward face 160 (and conductive interface 138) of the frame 120 to form an electrically-conductive path therebetween. However, the lip cover conductive interface 238 may have any other desired form.

Figure 23:
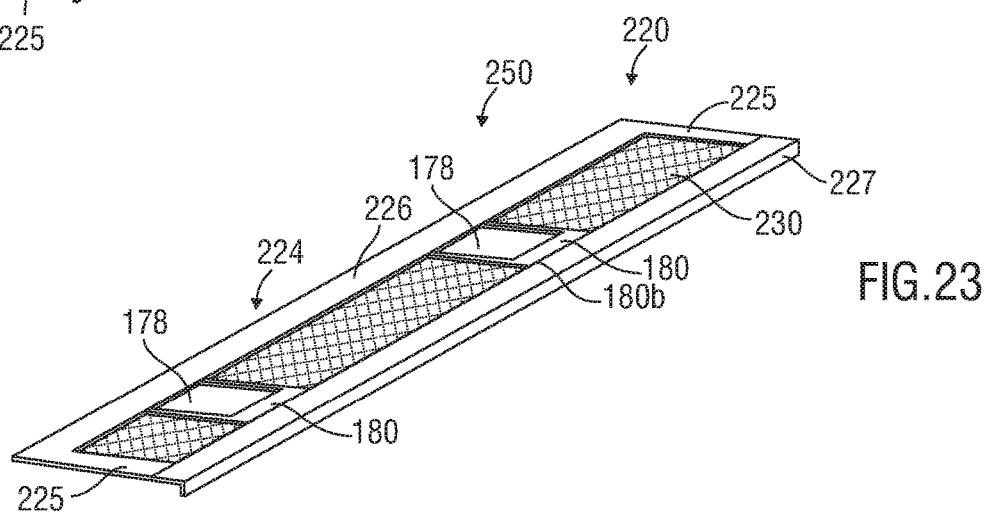
FIG. 23 is a perspective view of another exemplary short lip cover in accordance with an embodiment of the present disclosure.
Figure 24:
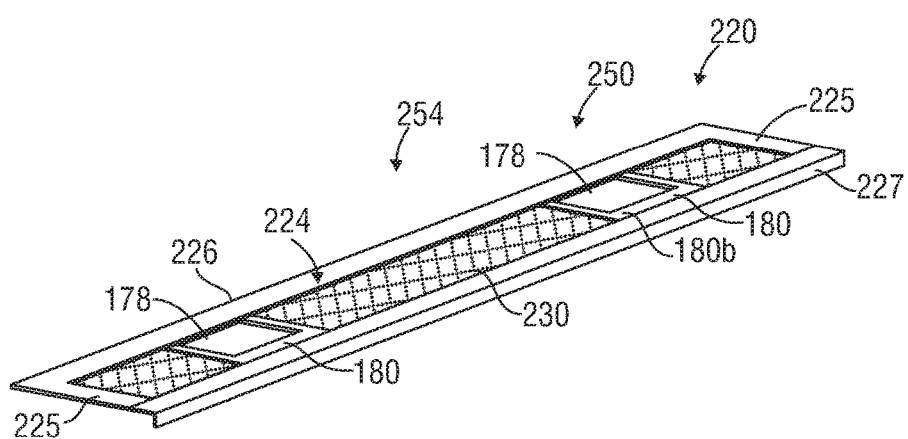
FIG. 24 is a perspective view of an exemplary corner short lip cover in accordance with an embodiment of the present disclosure.

Referring back to FIG. 20, in the illustrated embodiment, a distinct lip cover 220 is positionable on the each lower lip 54 of the mat 26. For example, a short lip cover 250 may be configured to extend across substantially the length of the lower lip 54 at the second short side 30 of the mat 26, and a long lip cover 260 may be configured to extend across substantially the length of the lower lip 54 extending from the second long side 38 of the mat 26. For any exemplary mat 26 having its corner 42 (formed between adjacent lower lips 54) exposed, either the short lip cover 250 or the long lip cover 260 may be shorter than the other respective covers 250, 260. In this embodiment, the corner short lip cover 254 (e.g. FIG. 24) is shorter than the other short lip cover(s) 250 (e.g. FIGS. 22-23).

If desired, the lip covers 220 may be formed with one or more cut-outs 178, such as to allow access to one or more locking pin holes 32 on the lower lip 54 of the mat 26, electrically isolate a locking pin 34 placed in the locking pin hole 32, or for any other purpose. Also if desired, one or more cut-out frames 180 may be used with the lip covers 220. For example, the cut-out frames 180 may be coupled to and cover the edges of the lip covers 220 that form the cut-outs 178.

Figure 25:
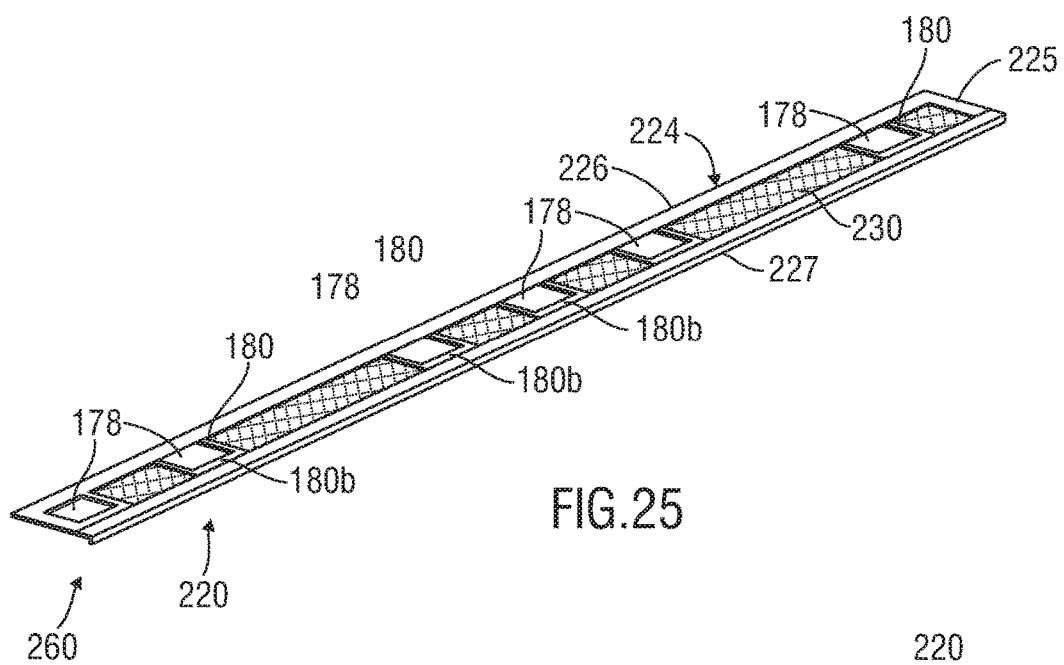
FIG. 25 is a perspective view of an exemplary long lip cover in accordance with an embodiment of the present disclosure.
Figure 26:
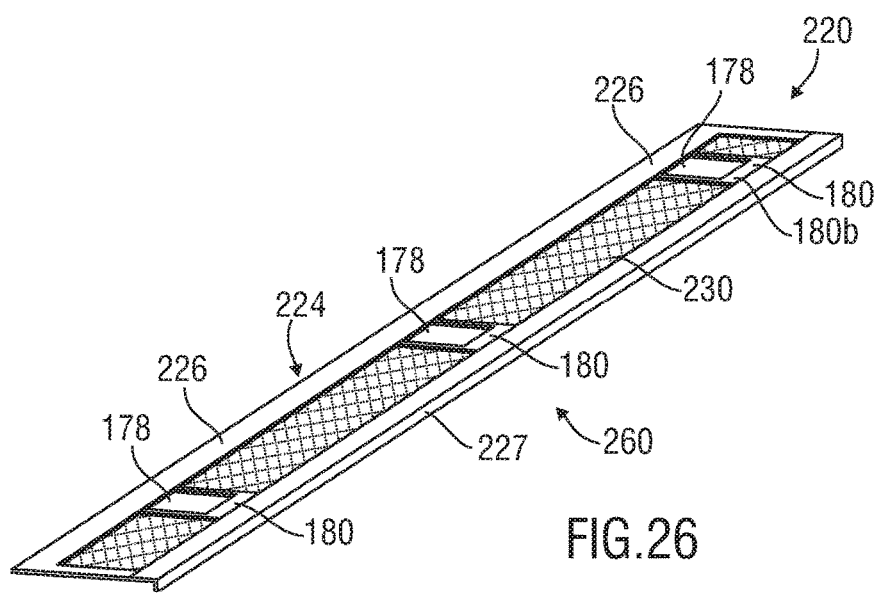
FIG. 26 is a perspective view of another exemplary long lip cover in accordance with an embodiment of the present disclosure.

Any desired number of cut-outs 178 and cut-out frames 180 may be included. In the present embodiment, since the exemplary mats 26 (e.g. FIG. 3) each have three locking pin holes 32 on the lower lip 54 at the second short side 30 of the mat 26, the short lip cover 250 (e.g. FIG. 22) may be configured to include three cut-outs 178 to allow access to all of the locking pin holes 32. For another example, in FIG. 23, the short lip cover 250 includes only two cut-outs 178 to allow access to two of the locking pin holes 32 (See also FIG. 20). Similarly, since the exemplary mats 26 (e.g. FIG. 3) each have six locking pin holes 32 on the lower lip 54 at the second long side 38 of the mat 26, the long lip cover 260 (e.g. FIG. 25) may be configured to include six cut-outs 178 to allow access to all of the locking pin holes 32. For another example, in FIG. 26, the long lip cover 260 includes only three cut-outs 178 to allow access to three of the locking pin holes 32 (See also FIG. 20).

Other embodiments may include fewer cut-outs 178 on the lip covers 220. It may be necessary or desirable to allow access to only some of the locking pin holes 32 in the respective lower lips 54 through the lip covers 220 depending upon the expected use of the locking pin holes 32. For example, when all the locking pin holes 32 of the lower lips 54 are not needed, fewer cut-outs 178 may be desirable, such as to preserve the integrity, strength and rigidity of the lip covers 220. For another example, in embodiments where the lip covers 220 are secured to the mats 26 via one or more locking pin holes 32, only those locking pin holes 32 needed to adequately secure the lip covers 220 to the mats 26 may be made accessible though the cut-outs 178. For another example, in some embodiments, such as load-supporting surfaces 16 having mats 26 without locking pin holes 32, the lip covers 220 may not include any cut-outs 178.

Figure 27:
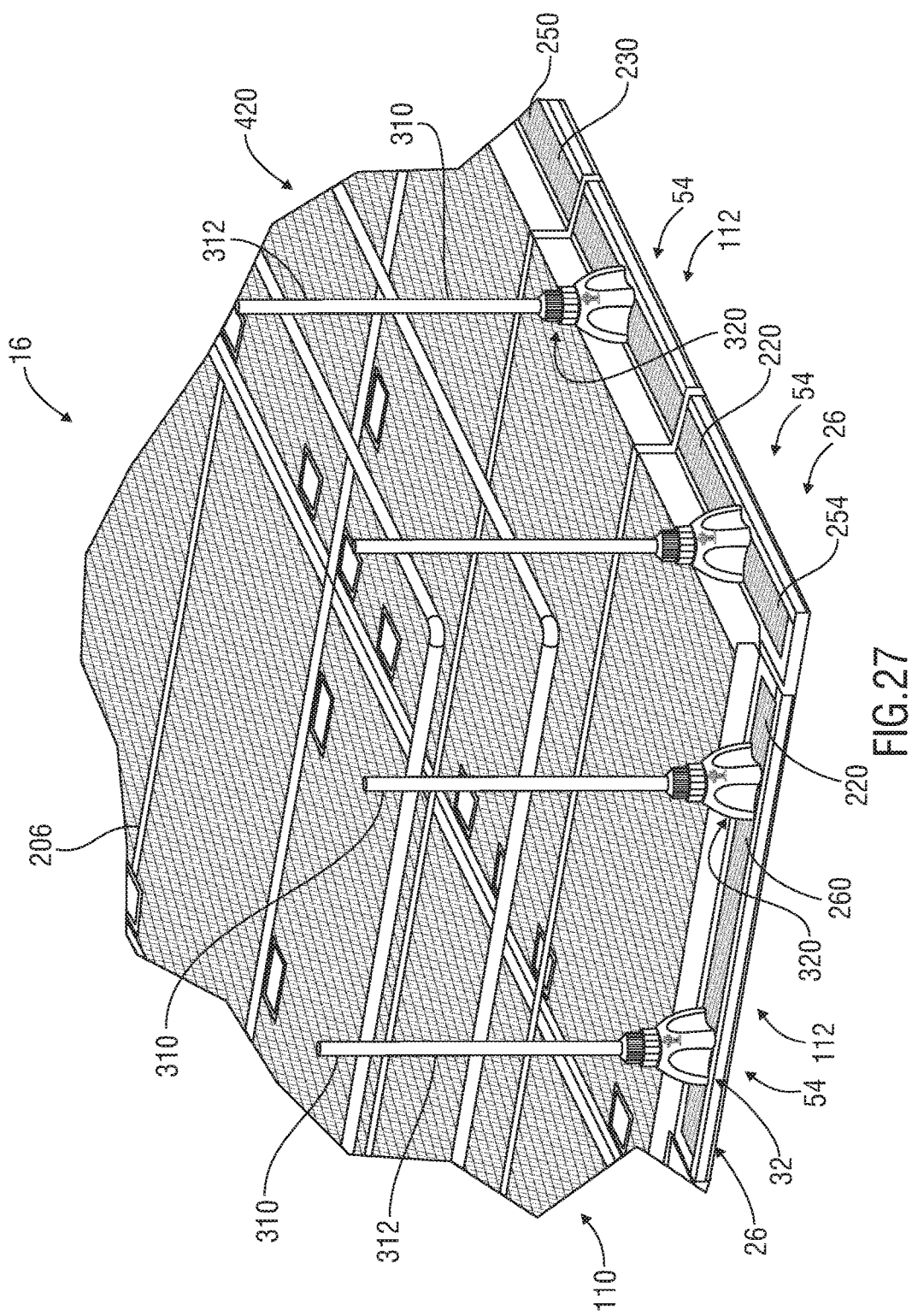
FIG. 27 is a perspective view of an exemplary load-supporting surface with exemplary EPZ mats having exemplary lip covers and an exemplary safety barrier system in accordance with an embodiment of the present disclosure.

Referring now to FIG. 27, the lip covers 220 may be coupled to the mat 26 in any suitable manner. For example, the lip cover mesh portions 230 may be secured with couplers 62, such as bolts 69, similarly as described above with respect to mesh portions 126 and mesh grate panels 200. For another example, the lip cover frame 224 may engage or wrap around one or more edges of the associated lower lip 54. For still a further example, the lip cover 220 may be coupled to the cover 110 disposed on the same mat 26. In the present embodiment, the lip covers 220 are shown coupled to the illustrated mats 26 by one or more upright members 310, each releasably engaging a locking pin hole 32 in one of the respective lower lips 54 of the associated mats 26. The upright member 310 may have any desired components, configuration, operation and use. For example, the upright member 310 may be, or include, a bar, post, frame or the like. In this embodiment, the upright member 310 is a pole 312 useful to support one or more signs, fences or safety barriers, and may be constructed of any suitable material, such as aluminum, steel or fiberglass. The upright member 310 may be releasably engaged with the locking pin hole 32 in any suitable manner. For example, an upright member support system 320, such as the system disclosed in U.S. patent application Ser. No. 15/132,410 may be used. In the illustrated embodiment, multiple upright member support systems 320 are shown supporting multiple poles 312 as part of a safety barrier system 420.

Now referring to FIG. 28, in another independent aspect of the present disclosure, an electrical connection bar 270 may be used with one or more EPZ mats 112 in the load-supporting surface 16. The electrical connection bar 270 may be used for any suitable purpose, such as grounding the EPZ mat 112 or load-supporting surface 16, electrically connecting the EPZ mat 112 or load-supporting surface 16 to testing monitoring, measuring or other equipment, electrically interconnecting multiple EPZ mats 112 or a combination thereof. In the illustrated embodiment, a grounding rod 174 for grounding the load-supporting surface 16 is shown releasably, electrically coupled to the electrical connection bar 270 via a grounding cable 170 and an electrical connector 288. In some embodiments, the electrical connection bar 270 may serve as part of the conductive interface(s) 138 useful to releasably, electrically connect the EPZ mat 112 with one or more other EPZ mats 112 or other components, such as with the use of an electrical connector 288 or other electrically-conductive wire, cable, bar or other electrical connection component(s).

The electrical connection bar 270 may be releasably coupled to one or more electrical connection components (e.g. electrical connector(s) 288, wires, cables, pins, testing, monitoring, measuring or other equipment, etc.) in any suitable manner. For example, the electrical connection bar 270 may include one or more connection ports 278. The connection port 278 may have any suitable form and configuration. In this embodiment, the connection port 278 is an orifice 280 formed into the bar 270. The illustrated connection ports 278 face generally horizontally on the connector bar 270, such as to allow ease of electrical connection therewith, maintain a low profile of the electrical connection components (e.g. electrical connector(s) 288, grounding cables 170, etc.) above the top surface 132 of the mat 112, minimize the risk of undesired or accidental decoupling of electrical connection components or other desired purpose. If desired, multiple connection ports 278 (e.g. FIG. 29) may be included, such to allow flexibility and multiple options in the position(s) and quantity of electrical connections that can be made to the EPZ mat 112 or other desired purpose.

Referring to FIGS. 28-29, the electrical connection bar 270 may be constructed of any suitable material, such as aluminum, steel, stainless steel, other electrically-conductive material or a combination thereof, and have any suitable form, configuration and operation. In this embodiment, the electrical connection bar 270 is a section of rigid angle-iron 271 sufficiently strong and durable to withstand use as part of a load-supporting surface 16. The exemplary bar 270 is elongated, such as to provide space for multiple connection ports 278, maintain a low profile above the top surface 132 of the mat 112, be sufficiently securable to the mat 112 to preserve its electrical contact therewith during use of the load-supporting surface 16 or other desired purpose. For still a further example, the electrical connection bar 270 may be configured and positioned to allow cables (e.g. the grounding cable 170), wire and the like to be coupled to the EPZ mat 112 or load-supporting surface 16 without substantial risk of undesirable coiling or being undesirably draped over or across a substantial portion of one or more electrically-conductive covers 110 in the load-supporting surface 16.

Referring now to FIGS. 30-32, the electrical connection bar 270 may be connected to the EPZ mat 112 in any suitable manner. For example, the bar 270 may be welded to the frame 120, mesh portion 126, one or more cut-out frames 180 of the exemplary cover 110 or a combination thereof. For another example, the electrical connection bar 270 may be releasably coupled to one or more locking pin holes 32 of the mat 26, such as to allow desired positioning of the electrical connection components, or electrical connection with an adjacent mat 112 or other component(s), at a side or corner of the mat 26 or load-supporting surface 16. In the illustrated embodiment, the electrical connection bar 270 is configured to be releasably connected and electrically coupled to the EPZ mat 112 proximate to its first corner 40, such as to allow desired positioning of the electrical connection components, or electrical connection with an adjacent mat 112 or other component(s), at a side or corner of the mat 26 or load-supporting surface 16. The exemplary electrical connection bar 270 is configured so that when it is coupled to the EPZ mat 112, one leg of the angle-iron 271 is substantially vertically oriented and the connection ports 278 formed therein are oriented generally horizontally. The other illustrated leg of the angle-iron 271 is substantially horizontally oriented to abut and make electrical contact with the electrically-conductive cover 110 and align at least one anchor hole 272 formed therein (e.g. FIG. 31) over a locking pin hole 32 of the mat 26.

In the illustrated embodiment, the electrical connection bar 270 is shown releasably coupled to two locking pin holes 32 of the EPZ mat 112. For example, as shown in FIG. 31, at each such locking pin hole 32, a bolt 282 (or other connector, such as a pin, screw etc.) may extend through an anchor hole 272 in the connector bar 270 then through the locking pin hole 32. The exemplary bolt 282 (or other connector) may, for example, be releasably secured below the mat 112 to a threaded anchor base 284 placed below the locking pin hole 32. If desired, the bolt 282 may threadably engage a nut 286 welded to, or otherwise extending from, the upper surface of the anchor base 284. As shown in FIG. 32, under the mat 26, the exemplary anchor base 284 releasably secures the electrical connection bar 270 to the mat 26 at least partially around the locking pin hole 32. However, any other method and mechanism for coupling the bar 270 to one or more mats 26 may be used.

Figure 34:
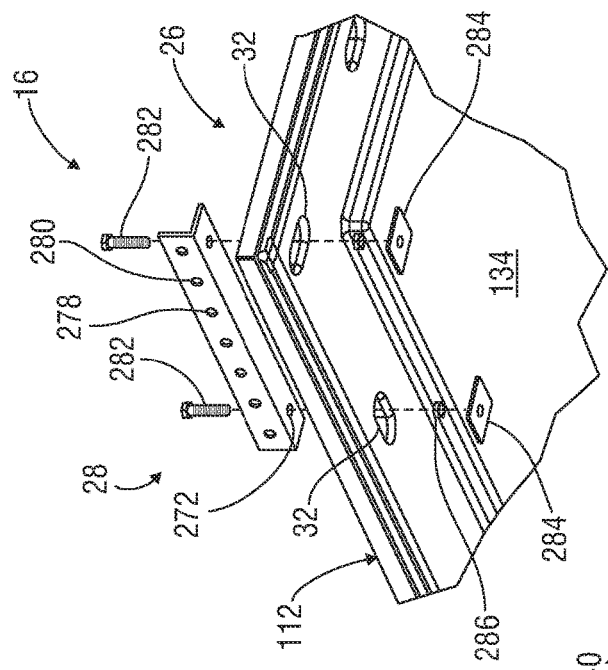
FIG. 34 is an exploded assembly view of the exemplary electrical connection bar and EPZ mat of FIG. 30.
Figure 35:
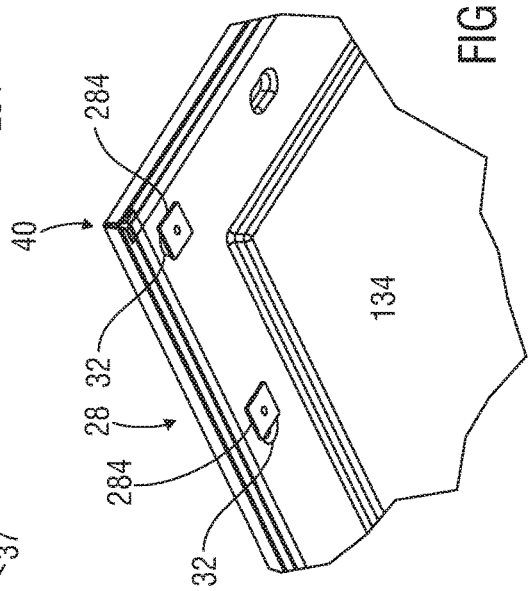
FIG. 35 is a perspective view from below of the exemplary electrical connection bar and EPZ mat of FIG. 30.
Figure 33:
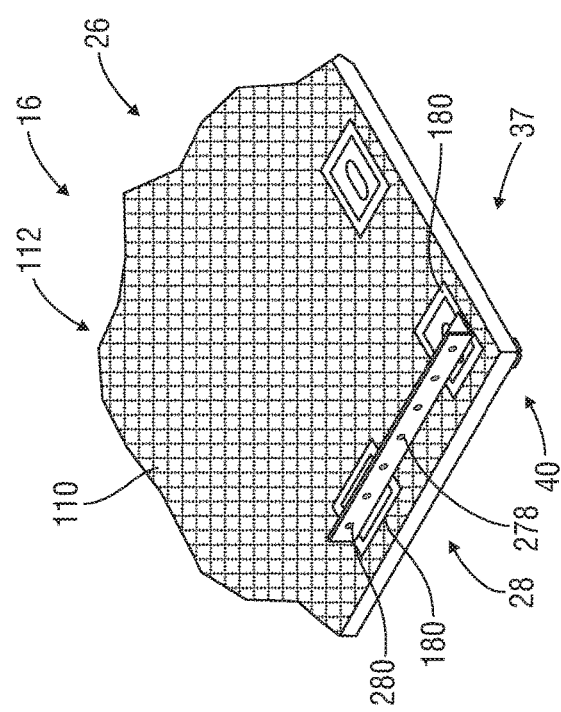
FIG. 33 is a perspective view from above of the exemplary electrical connection bar of FIG. 29 shown used at a second location on the exemplary EPZ mat shown in FIG. 30 in accordance with the present disclosure.

If desired, the electrical connection bar 270 may be useful at different locations on the mat 112 to provide flexibility in the location of electrical connection components or other desired purpose. In this example, the electrical connection bar 270 may be coupled to the two locking pin holes 32 closest to the first corner 40 of the mat 26 on either the first long side 37 (FIGS. 30-32) or the first short side 28 (FIGS. 33-35) of the mat 26. However, in other embodiments, the electrical connection bar 270 may be coupled to different locking pin holes 32 or any other desired portion or component of the mat 112 or load supporting surface 16.

Referring back to FIG. 28, the electrical connection bar 270 may be electrically coupled to the EPZ mat 112 in any desired manner. In this example, the bar 270 abuts and electrically contacts the electrically-conductive cut-out frames 180 of the cover 110. The bar 270 may also, or instead, abut and electrically contact the mesh portion 126 and/or frame 120 of the cover 110. In other embodiments, the bar 270 may be electrically coupled to a different part or component of the mat 112 or load-supporting surface 16.

When included, the electrical connector(s) 288 useful for electrically coupling the electrical connection bar 270 (or other component(s) of the mat 112) to one or more other component or mat 112 may have any suitable form, configuration and construction. In this embodiment, the electrical connector 288 is a rigid bolt 289 coupled to the bar 270. If desired, the electrical connector 288 may be flexible, such as to allow relative movement between the respective mat 112 (or cover 110) and other component without disconnecting therefrom. Other examples of electrical connectors 288 may include one or more pin, flexible member, copper wires, jumper cables 292 (e.g. FIG. 37), braided steel strips 269 (e.g. FIG. 43C) and the like. If desired, the electrical connector 288 may be coupled with slack (e.g. FIG. 37), such as to allow relative movement between the mat 112 (or cover 110) and other component without disconnecting therefrom. In some embodiments, the electrical connector 288 may serve as part of the conductive interface(s) 138 between mats 112.

Now referring to FIGS. 36-37, in another independent aspect of the present disclosure, an electrically-conductive corner plate 290 may be used with one or more EPZ mats 112 in the load-supporting surface 16. The corner plate 290 may be used for any suitable purpose, such as to releasably, electrically interconnect multiple EPZ mats 112, ground the EPZ mat 112 or load-supporting surface 16, electrically connect the EPZ mat 112 or load-supporting surface 16 to testing, monitoring, measuring or other equipment, or a combination thereof. For example, the corner plate 290 may be useful to electrically connect the EPZ mat 112 to one or more other EPZ mats 112, serving as part of the conductive interface(s) 138 (e.g. FIG. 37). In some embodiments, the corner plate 290 may also or instead be used in addition to one or more other engaged conductive interfaces 138 (e.g. FIG. 9) of two or more electrically coupled mats 112 to ensure effective electrical interconnection and/or grounding of the mats 112 and/or other components in the load-supporting system 16. For another example, in FIG. 39, the corner plates 290 on adjacent mats 112 are shown releasably electrically coupled to a testing unit 294, such as a 4-wire kelvin-resistance measuring device.

The corner plate 290 may be constructed of any suitable material, such as aluminum, steel, stainless steel, other material or a combination thereof that is sufficiently electrically-conductive and, if desired, strong and durable enough to be useful in the load-supporting surface 16.

Referring now to FIGS. 39-40, the corner plate 290 may have any suitable form, configuration and operation. For example, the corner plate 290 may be configured to allow ease of electrical connection therewith, maintain a low profile of the electrical connection components (e.g. electrical connector(s) 288, cables, etc.) above the top surface 132 of the mat 112, minimize the risk of undesired or accidental decoupling of electrical connection components or other desired purpose. In this embodiment, the corner plate 290 is generally flat, L-shaped and configured to be physically and electrically coupled, such as by weld, to a corner of the EPZ mat 112, such as to allow desired positioning of the electrical connection components or electrical connection with an adjacent mat 112 or other component(s) at a side or corner of the mat 26 or load-supporting surface 16. For example, as shown in FIGS. 38A-B, the corner plate 290 may be welded to the corner of the frame 120 of the electrically-conductive cover 110. If desired, a distinct corner plate 290 may be coupled to each corner of the frame 120. In other embodiments, a corner plate 290 may be coupled to only select corners of the frame 120 or to any other desired location on the frame 120, mesh portion 126, one or more cut-out frames 180 or other component of the cover 110 or EPZ mat 112, or a combination thereof, such as by weld, electrically-conductive mechanical connector (e.g. pin, bolt, screw) or other method.

Referring back to FIGS. 36-37, the exemplary corner plate 290 may be releasably coupled to one or more electrical connection components (e.g. electrical connector(s) 188, wires, cables, grounding, testing, monitoring, measuring or other equipment, etc.) in any suitable manner. For example, the corner plate 290 may include one or more connection ports 278. The connection port 278 may have any suitable form and configuration. In this embodiment, the connection port 278 is a threaded orifice 280 formed in the corner plate 170 and configured to receive any suitable electrical connector 288 or other connection component, such as a bolt, pin, screw, strip, wire, etc. In FIG. 39, for example, a testing unit 294 is releasably secured in electrical contact with the corner plates 290 of adjacent mats 112 by electrical connectors 288 (e.g. bolts 296) threadably engaged with orifices 280 of the respective plates 170.

If desired, multiple connection ports 278 may be included, such to allow flexibility and multiple options in the position(s) and quantity of electrical connections that can be made to the EPZ mat 112 or other desired purpose. In this embodiment, the corner plate 290 includes four connection ports 278, but other embodiments may include less (one, two or three) or more (five, six, etc.) connection ports 278.

As mentioned above, if desired, one or more electrical connectors 288 may be used to secure the exemplary corner plate 290 to another component. In FIG. 37, for example, the electrical connectors 288 include a jumper cable 292 and two bolts 296 releasably electrically coupled to orifices 280 of the respective corner plates 290 of adjacent mats 112 to electrically couple the mats 112 together. In this example, the electrical connectors 288 serve as part of the conductive interface(s) 138 between the mats 112. If desired, the jumper cable 292 or other electrical connector 288 may be coupled to the corner plate 290 with slack, such as to allow relative movement between the respective mats 112 (or covers 110) without disconnecting the therefrom or other desired purpose.

Figure 41:
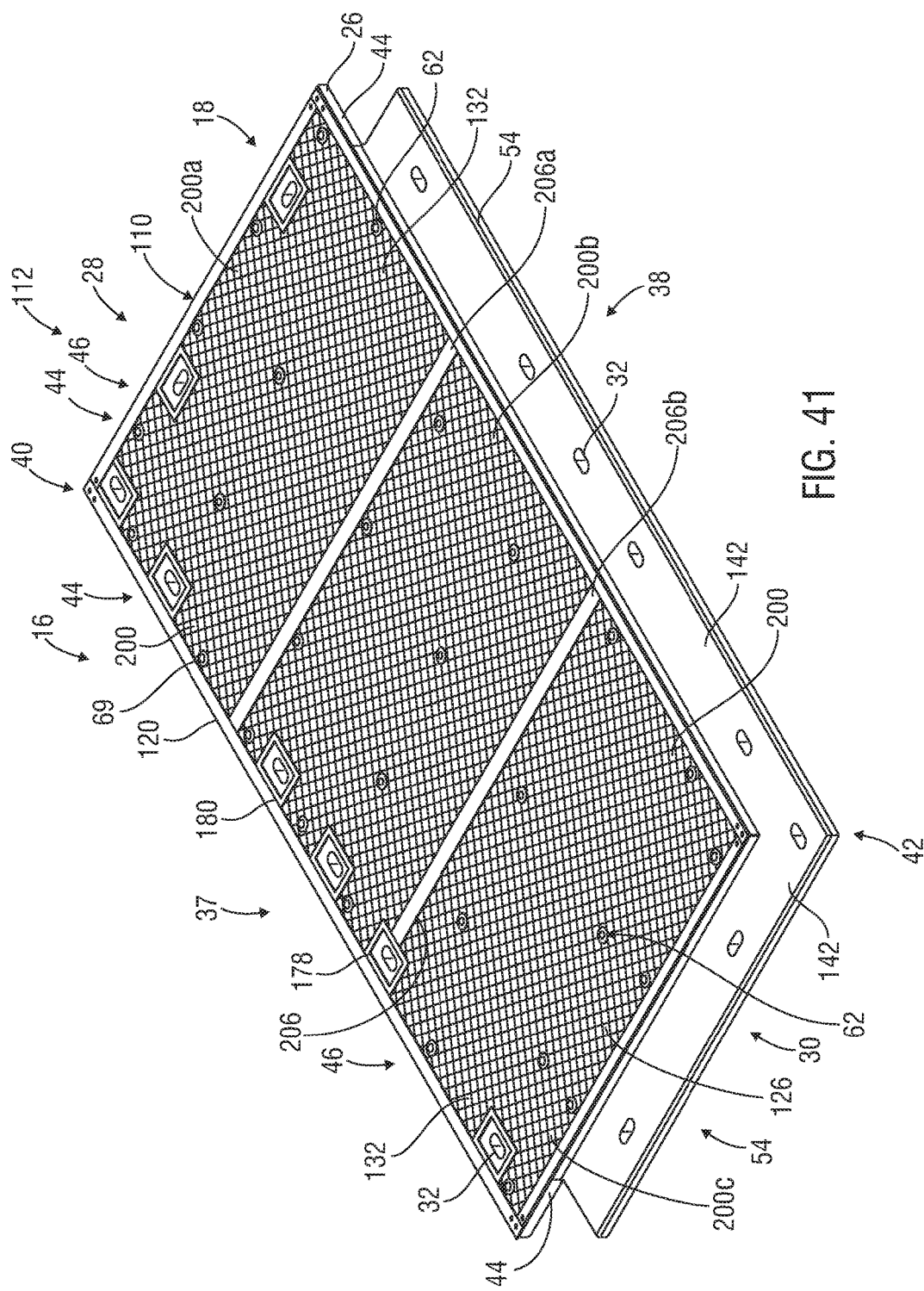
FIG. 41 is a perspective view of another embodiment of an electrically-conductive cover shown coupled to an exemplary mat to form an exemplary EPZ mats in accordance with another embodiment of the present disclosure.

Now referring to FIG. 41, in another independent aspect of the present disclosure, the exemplary EPZ mat 112 may be configured and arranged to allow acceptable relative movement between the mat 26 and the cover 110, while at least substantially preserving the integrity and desired functioning of the mat 26 (e.g. assist in protecting and/or preserving underlying terrain, withstanding and spreading applied loads onto underlying terrain, providing stable work platform, etc.) and cover 110 (e.g. withstanding applied loads, providing electric current flow path and grounding function as described above, required by regulation, industry standard or otherwise as desired). The terms "acceptable relative movement" and variations thereof as used herein with respect to the cover 110 (or any components thereof) and mat 26 (or any components thereof) means movement of either or both the cover 110 and mat 26 (or the referenced component(s) thereof) relative to the other (e.g. due to one or more environmental factors (e.g. changing temperatures), movement of personnel, vehicles and/or equipment across the load-supporting surface 16 or other factors during normal, typical or expected use conditions of the load-supporting surface 16) without undesirably damaging or deforming either the cover 110 or mat 26 or substantially diminishing the desired functioning of the EPZ mat 112 in the load-supporting surface 16 (e.g. as described above).

The illustrated EPZ mat 112 may be configured to allow acceptable relative movement between the cover 110 and mat 26 in any suitable manner. For example, the cover 110 may be constructed and configured to be rigid enough to perform as part of the EPZ mat 112 and load-supporting surface 16 (e.g. as described above) and flexible enough to bend, flex, expand, contract or a combination thereof relative to the mat 26 (e.g. due to one or more environmental factors (e.g. changing temperatures), movement of personnel, vehicles and/or equipment across the load-supporting surface 16 or other factors during normal, typical or expected use conditions of the load-supporting surface 16) without undesirably damaging or deforming either of them or substantially diminishing the desired functioning of the EPZ mat 112 in the load-supporting surface 16 (e.g. as described above). The terms "flexibly constructed" and variations thereof as used herein with respect to the cover 110 or any component thereof means the cover 110 (or component(s) thereof) is constructed and configured to be rigid enough to perform as part of the EPZ mat 112 and load-supporting surface 16 (e.g. as described above) and flexible enough to bend, flex, expand, contract or a combination thereof relative to the mat 26 (e.g. due to one or more environmental factors (e.g. changing temperatures), movement of personnel, vehicles and/or equipment across the load-supporting surface 16 or other factors during normal, typical or expected use conditions of the load-supporting surface 16) without undesirably damaging or deforming either of them or substantially diminishing the desired functioning of the EPZ mat 112 in the load-supporting surface 16 (e.g. as described above).

For another example, the exemplary cover 110 may be coupled to the mat 26 sufficiently rigidly to perform as part of the EPZ mat 112 and load-supporting surface 16 (e.g. as described above) and also sufficiently flexibly to allow acceptable relative movement between the mat 26 and cover 110 without decoupling the cover 110 and mat 26. The terms "flexibly coupled" and variations thereof as used herein with respect to the cover 110 or any component thereof means the cover 110 (or component(s) thereof) is coupled to the mat 26 sufficiently rigidly to perform as part of the EPZ mat 112 and load-supporting surface 16 (e.g. as described above) and sufficiently flexibly to allow acceptable relative movement between the mat 26 and cover 110 without decoupling the cover 110 and mat 26.

The exemplary cover 110 may be flexibly coupled to the mat 26 in any suitable manner. For example, the cover 110 may not extend around any edges 44 of the mat 26 (See also FIGS. 42A-B, FIGS. 45, 49, 51). In the embodiments, the cover 110 is generally planar and extends at least partially over only the top surface 132 of the mat 26. Unlike the exemplary frame 120 shown in FIGS. 8-9, the frames 120 in these embodiments do not extend around the edges 44 of the exemplary mat 26 on each side 28, 37 having upper lips 46 or across any part of the top 142 of the lower lips 54 of the exemplary mat 26. Also, the frames 110 of these embodiments do not have any underside faces 156 (e.g. FIG. 9) or upward faces 160 that serve as conductive interfaces 138 in the manner described with respect to the embodiment of FIGS. 8-9.

For another example, referring to FIGS. 42A-C, the cover 110 may be flexibly coupled to the mat 26 with the use of a plurality of couplers 62 secured between the cover 110 to the mat 26. The illustrated couplers 62 include bolts 69, but may include any other form of couplers (e.g. clips, pins, rods, screws, etc.). Referring to FIG. 42C, at least some of the exemplary couplers 62 (i) extend over and through the cover 110 (e.g. over the frame 120 and/or mesh portion 126), (ii) include an elongated body that extends through an aperture 300 formed in the mat 26 and (iii) are releasably secured to the bottom surface 134 (or other portion, see e.g. FIGS. 44A-B) of the mat 26, such as with at least one nut 302 or other suitable anchor. In some embodiments, the couplers 62 may be the only interconnection of the cover 110 and the associated mat 26.

To allow for some acceptable relative movement, at least some of the exemplary couplers 62 may be loosely engaged between, and not rigidly coupled (e.g. by weld) to the cover 110 and/or mat 26. As shown in FIG. 42C, for example, the inner diameter 304 of the illustrated aperture 300 may be greater than the outer diameter 306 of the elongated body of the coupler 62, allowing some side-to-side relative movement between the mat 26, the coupler 62 and the cover 110.

Figure 44B:
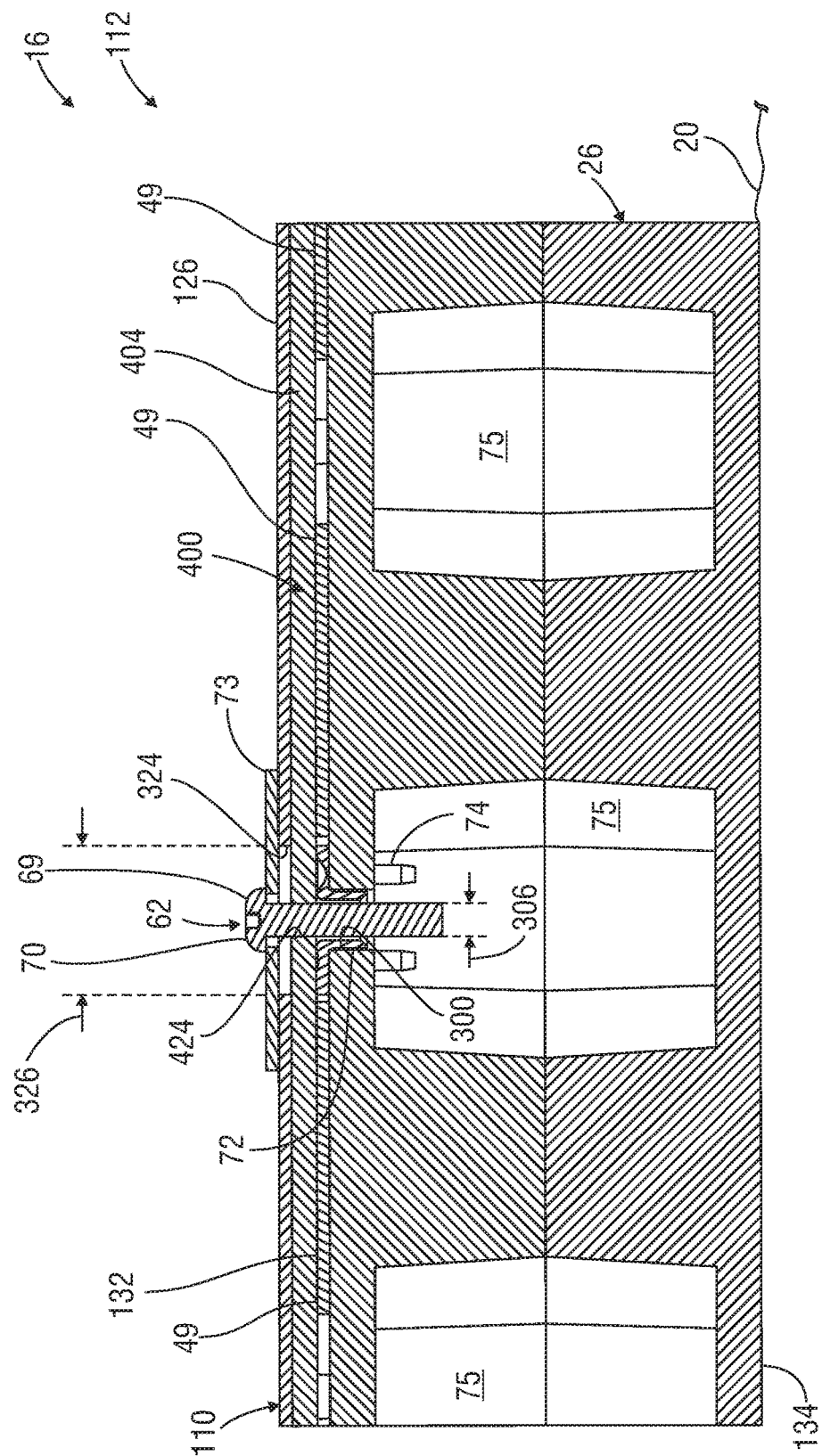
FIG. 44B is a cross-sectional view of part of the exemplary EPZ mat of FIG. 44A once assembled.

In another example, in FIGS. 44A-B, the diameter 326 of the bolt hole 324 in the cover 110 (e.g. mesh portion 126) is greater than the diameter 306 of the body of the coupler 62. In this embodiment, the electrically-conductive cover 110 is thus moveable sideways relative to the coupler 62, washer 73 and mat 26, and vise versa. For example, the bolt hole 324 may be substantially circular and have an inner diameter 326 of at least approximately two inches (2.0"), diamond-shaped with a maximum inner diameter of approximately two inches (2.0"), or any other shape and size to allow a desired range of relative sideways movement between the mat 26 and cover 110. However, any other configuration may be used to provide any desired range of sideways movement (e.g. 1", 1,25", 1.50", 2,25", 3.00" or more or less). In this embodiment, the illustrated washer 73 is oversized to ride on the upper surface of the cover 110 (e.g. mesh portion 126) adjacent to the bolt hole 324 throughout relative movement of the mat 26 and cover 110.

For yet another example, the couplers 62 may be releasable and/or adjustable and not fully tightened to the mat 26 and frame 110 to allow acceptable relative movement up and down between the mat 26 and the cover 110. However, the cover 110 and/or mat 26 may be configured to allow for acceptable relative movement therebetween in any other suitable manner.

In some embodiments, the exemplary frame 110 may extend around one or more edges 44 of the mat 26 and/or include underside faces 156 or upward faces 160 and still be flexibly coupled to the mat 26 or otherwise provide acceptable relative movement between the mat 26 and cover 110. For example, the frame 110 may extend around less than all edges 44 of the mat 26, or loosely extend around one or more edges 44 of the mat 26 (e.g. with a gap therebetween) and still be flexibly coupled.

In various embodiments, the exemplary electrically-conductive cover 110 may not be coupled to the mat 26, but associated therewith or secured relative thereto sufficiently to perform as part of the EPZ mat 112 and load-supporting surface 16 (e.g. as described above) and allow acceptable relative movement between the mat 26 and cover 110. For example, the cover 110 may be secured to the ground or one or more other structures (e.g. one or more other cover 110) while allowing acceptable relative movement between the cover 110 and mat 26. In some embodiments, the electrical coupling of multiple adjacent covers 110, grounding of one or more interconnected covers 110, mechanical interconnection of adjacent mats 26 under the covers 110, or a combination thereof may allow acceptable relative movement between each cover 110 and its associated mat 26.

Now referring to FIGS. 43A-C, in another independent aspect of the present disclosure, the electrically-conductive cover 110 may be formed with one or more connection ports 278 to releasably, electrically interconnect multiple EPZ mats 112, ground the EPZ mat 112 or load-supporting surface 16, electrically connect the EPZ mat 112 or load-supporting surface 16 to testing, monitoring, measuring or other equipment, other desired purpose or a combination thereof. For example, in this embodiment, as shown in FIG. 43C, the illustrated connection ports 278 formed in adjacent EPZ mats 112 are used to electrically couple adjacent mats 112 and thus serve as part of the conductive interfaces 138 of the mats 112. In other embodiments, one or more connection bars 270 (e.g. FIG. 28), corner plates 290 (e.g. FIG. 36), other forms of conductive interfaces 138 or a combination thereof may be used.

Still referring to FIGS. 43A-C, the exemplary connection ports 278 formed in the cover 110 may have any suitable form, configuration, construction and operation. For example, the connection ports 278 may be configured to allow ease of electrical connection therewith, maintain a low profile of the electrical connection components (e.g. braided steel strips 298) above the top surface 132 of the mat 112, minimize the risk of undesired or accidental decoupling of electrical connection components or other desired purpose. In this embodiment, the connection port 278 is a threaded orifice 280 formed in a corner of the EPZ mat 112, such as to allow desired positioning of the electrical connection components, or electrical connection with an adjacent mat 112 or other component(s), at a side or corner of the mat 26 or load-supporting surface 16. For example, the connection port 278 may be formed in the corner of the frame 120 of the electrically-conductive cover 110. If desired, connection ports 278 may be formed in each corner of the frame 120. In other embodiments, one or more connection ports 278 may be formed in only select corners of the frame 120 or at any other desired location on the frame 120, mesh portion 126, one or more cut-out frames 180 or other component of the EPZ mat 112, or a combination thereof.

Still referring to FIGS. 43A-C, the exemplary connection port 278 may receive any desired electrical connection components (e.g. electrical connectors 288, grounding, testing, monitoring or other equipment, wires, cables, connector pins, etc.). If desired, multiple connection ports 278 may be included at each location, such as to allow flexibility and multiple options in the position(s) and quantity of electrical connections that can be made to the EPZ mat 112, or other desired purpose. In this embodiment, three connection ports 278 are shown at each location, but other embodiments may include less (one or two) or more (four, five, six, etc.) connection ports 278.

In some embodiments, one or more electrical connectors 288 may be coupled to one or more of the connection ports 278 of the exemplary mat 112. In FIG. 43C, for example, electrical connectors 288 are shown releasably electrically coupled to connection ports 278 on each of four adjacent mats 112 to electrically couple the mats 112 together. The illustrated electrical connectors 288 and connection ports 278 thus serve as the conductive interfaces 138 between the mats 112. In this embodiment, the electrical connectors 288 include flexible, braided steel strips 269 and threaded bolts 296. If desired, similarly as mentioned above, the electrical connectors 288 (e.g. strips 269) may be flexible and/or coupled to one or more of the connection ports 278 with slack, such as to allow relative movement between the respective mats 112 (covers 110, connected electrical components, etc.) without disconnecting therefrom.

It should be noted that the corner plates 290, electrical connection bars 270 and connection ports 278 formed in mats 112 may be used alone, in combination with one another or another one or more conductive interfaces 138 of one or more mats 112 to achieve the desired objective.

Now referring to FIGS. 44A-52, in another independent aspect, the exemplary EPZ mat 112 may be thermally insulated, such as between the mat 26 and the associated electrically-conductive cover(s) 110. For example, the EPZ mat 112 may be thermally insulated between the mat 26 and associated electrically-conductive cover(s) 110 to insulate, shield, or isolate the mat 26 from heat generated by electric current flowing through the electrically-conductive cover 110 during use thereof (e.g. at least sufficient to prevent the mat 26 from combusting and/or melting), assist in preventing electrical current from travelling from the electrically-conductive cover 110 through the mat 26 (e.g. through spaces, cracks, holes, seams, fasteners (e.g. locking pins 34) or other hardware in the mat 26) to the ground below the EPZ mat 112, any other desired purpose or a combination thereof. Excessive heating of the mat 26 can lead to degradation of the mat 26 and may compromise its integrity and desired functionality (e.g. protecting the underling terrain, spreading load, providing a stable support surface, etc.). Sufficient insulation of the mat 26 can be useful, for example, to create a thermal, or heat transfer, barrier and maintain the mat 26 at or below a desired temperature when the electrically-conductive cover 110 is heated to a high temperature.

The EPZ mat 112 may be insulated between the mat 26 and its associated electrically-conductive cover(s) 110 in any suitable manner. For example, one or more heat shields 400 may be disposed at least partially between the mat 26 and the associated electrically-conductive cover(s) 110. As used herein and in the appended claims and understood by persons of ordinary skill in the art, the term "heat shield" is the name for and refers to one or more layers of thermally resistant, shielding, or insulating material.

In the illustrated embodiments, the heat shield 400 is configured to isolate, shield, or insulate the mat 26 from heat generated by electric current flowing through the electrically-conductive cover 110 at least sufficiently enough to prevent the mat 26 from melting or combusting. In the embodiment of FIGS. 45-49, the mat 26 is similar to the exemplary mats 26 of FIGS. 1-44 and constructed of thermoplastic material. The illustrated heat shield 400 is configured to at least prevent the mat 26 from melting. For example, the heat shield 400 may prevent heat generated by electric current flowing through the electrically-conductive cover 110 from heating the mat 26 to two hundred and fifty degrees Fahrenheit (250° F.) or more. In a preferred embodiment, the heat shield 400 may assist in maintaining the mat 26 at a desired temperature of under one hundred and fifty degrees Fahrenheit (150° F.) by preventing heat generated by electric current flowing through the electrically-conductive cover 110 from heating the mat 26 to 150° F. or more. In the embodiment of FIGS. 50-52, the illustrated mat 26 is at least partially constructed of wood (e.g. three-ply wood mat 408, timber mat, plank mat, etc.), and the exemplary heat shield 400 is configured to prevent the mat 26 from combusting. For example, the heat shield 400 may prevent heat generated by electric current flowing through the electrically-conductive cover 110 from heating the mat 26 to three hundred and seventy five degrees Fahrenheit (375° F.) or more. In a preferred embodiment, the heat shield 400 may assist in maintaining the mat 26 at a desired temperature of under 150° F. by preventing heat generated by electric current flowing through the electrically-conductive cover 110 from heating the mat 26 to 150° F. or more. However, the heat shield 400 and load-supporting surface 16 may be configured to achieve any other desired temperature of the mat 26.

When included, the heat shield 400 may have any desired form, configuration and operation. In the illustrated embodiments, the heat shield 400 includes one or more sheets 404 of thermal insulation. For example, the sheet(s) 404 may have a total thickness of ¼ inch or less. In other embodiments, the sheet(s) 404 may have a smaller or larger total thickness (e.g. under or over ¼ inch, ½ inch, ⅔ inch, ¾ inch, etc.). In FIGS. 44A-52, the illustrated heat shield 400 includes a single sheet 404 of substantially continuous, ¼-inch thick, thermal insulation. In other embodiments, the heat shield 400 may include multiple contiguous adjacent, or fully or partially overlapping sheets 404, or other portions, of thermal insulation. For example, the heat shield 400 may include two or three stacked layers of sheets 404 of thermal insulation constructed of the same or different materials. If desired, the top and/or bottom surface, or any interior layers, of the exemplary heat shield 400 may be textured or have a mesh-like configuration, the exemplary sheets 404 (or any portion thereof) may be milli-sized or micro-sized, or a combination thereof. In some embodiments, the exemplary heat shield 400 may include one or more internal spaces, or interstices, of any suitable size and configuration and which are configured to contain gas and/or foam (e.g. polyurethane foam) or other substance(s), such as to provide or enhance thermal insulation or for any other purpose. In various embodiments, the heat shield 400 may have a labyrinth, honeycomb or other type of internal configuration.

Figure 47:
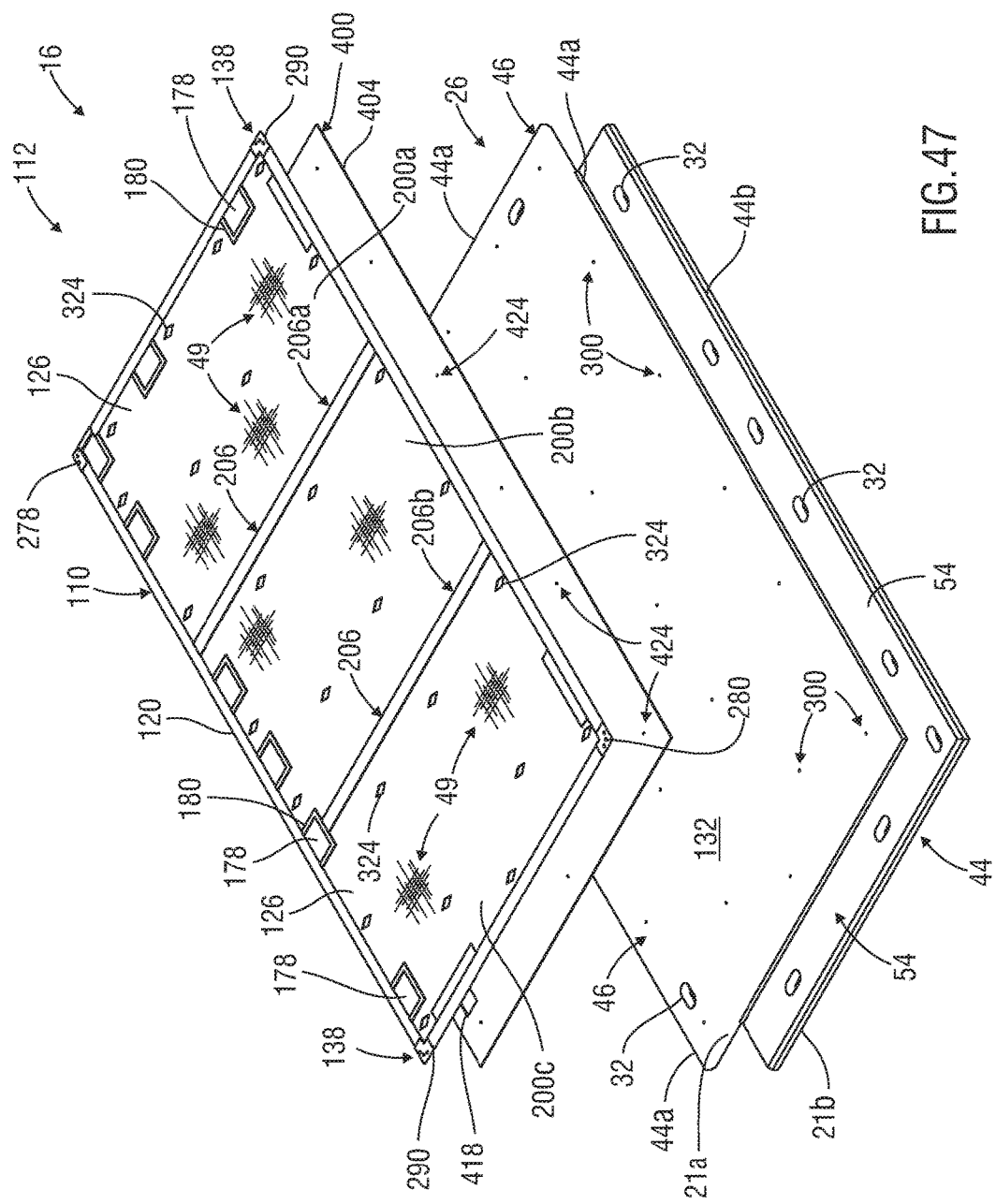
FIG. 47 is an assembly view of the exemplary insulated EPZ mat of FIG. 45.
Figure 48:
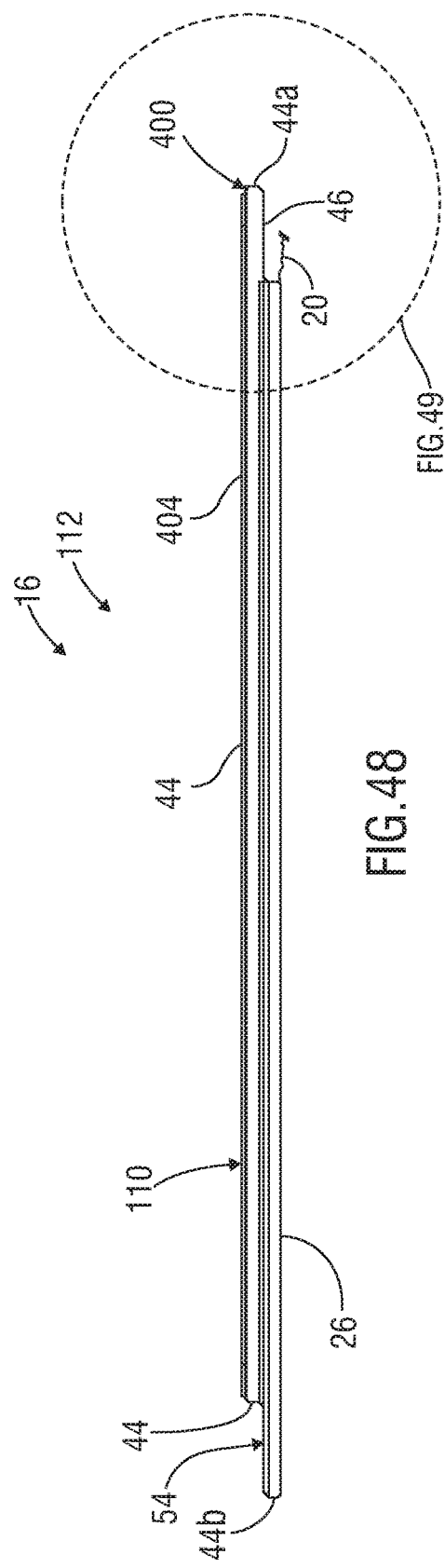
FIG. 48 is a side view of the exemplary insulated EPZ mat of FIG. 45.

Referring to FIGS. 45-47, when the exemplary heat shield 400 is used with mats 26 having holes (e.g. for connecting to electrically-conductive cover(s) 110, other mats 26 or other components, or useful for any other purpose), the exemplary heat shield 400 may be formed with corresponding passageways. For example, since the illustrated mat 26 includes locking pin holes 32 and the electrically-conductive cover 110 includes corresponding cut-outs 178 to allow for the passage of locking pins 34 therethrough without contacting the cover 110, the exemplary heat shield 400 may include corresponding through-holes 418 (e.g. FIG. 47) alignable therebetween. For another example, since the illustrated mat 26 also includes apertures 300 alignable with bolt holes 325 in the electrically-conductive cover 110 for the insertion of couplers 62, the exemplary heat shield 400 may include corresponding aligned through-holes 424 formed therein.

Referring again to FIGS. 44A-52, the heat shield 400 may be constructed of any suitable material or combination of materials. For example, the heat shield 400 may include rubber (e.g. rubber composites used in utility-sector work boot soles), heat and/or fire-resistant fabrics (e.g. fabric used in auto racing clothing), other fire-resistant material (e.g. intumescent materials), material with low thermal conductivity, layered materials used in utility-sector work gloves, foil (e.g. reflective metallized foil), any other sufficiently heat-resistant materials or a combination thereof. In the exemplary embodiment, the heat shield 400 is constructed of durable, water-resistant, all-weather material (e.g. capable of withstanding typical or expected use conditions, such as loads and forces placed upon the EPZ mat 112, movement, warping, deformation, expansion and/or contraction of the mat 26 and/or cover 110, temperature fluctuations, severe hot and cold temperatures, etc.). If desired, the heat shield 400 may be affixed to the corresponding mat 26 with one or more adhesives or other compatible materials.

Figure 49:
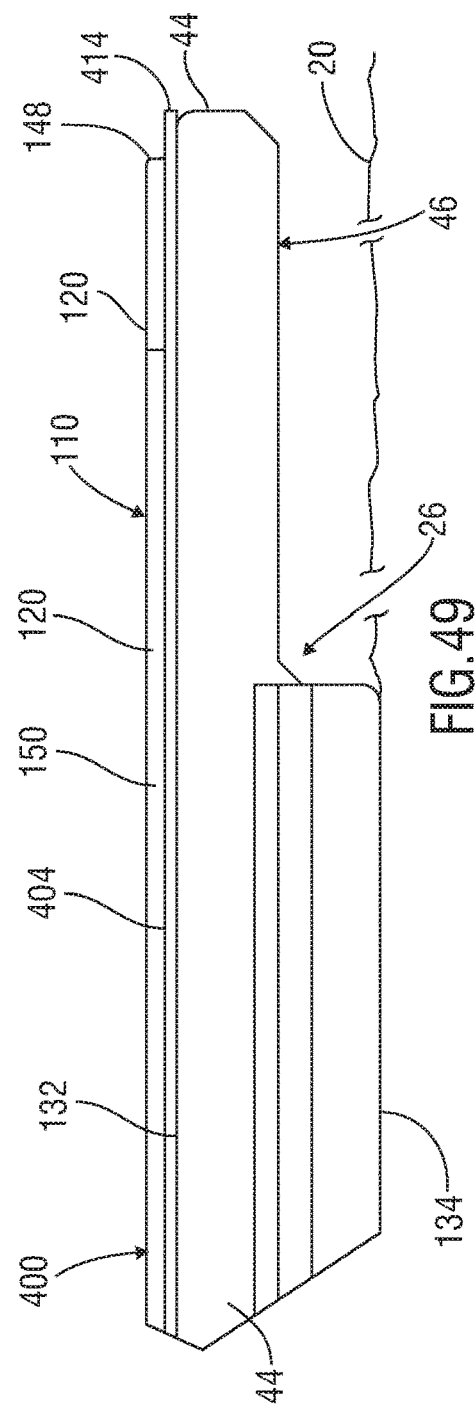
FIG. 49 is an exploded view of part of the exemplary insulated EPZ mat of FIG. 48.

Still referring again to FIGS. 44A-52, the heat shield 400 may be configured to ensure there is minimal, or no, contact between the electrically-conductive cover 110 and mat 26. For example, the heat shield 400 may extends across the entire upper face 132 of the mat 26. In the exemplary embodiments, such as shown in FIGS. 45-49, the sheet 404 extends to the outer edge 44 on each side of the upper face 132 of the mat 26 to ensure there is no contact between the electrically-conductive cover 110 and mat 26 at or proximate to the edges 44, or other desired purpose. As shown in FIGS. 45 & 49, the outer edges 414 of the illustrated sheet 404 extend beyond the outer edges of the electrically-conductive cover 110 (e.g. edges 148, 150, 152, 154 of the frame 120). In other embodiments, the heat shield 400 may extend down at least partially over, or wrap around, one or more edges 44 of the mat 26, such as to prevent potential contact between the mat 26 and any conductive interface 138, electrical-interconnection or grounding hardware associated with the corresponding, or adjacent, electrically-conductive cover(s) 110, or other purpose.

For another example, passageways formed in the heat shield 400 (e.g. through-holes 418, 424) may be sized as desired to minimize the potential for contact between the electrically-conductive cover 110 and mat 26 at those locations. In the present embodiment, as shown in FIG. 44B, the through-holes 424 formed in the illustrated heat shield 400 are appropriately sized to fit the diameter 306 of the elongated body of the coupler 62 extending therethrough. Depending upon the coefficient of thermal expansion of the material in the heat shield 400 and/or other factors, the desired diameter of the exemplary through-holes 424 may range from the same as, or slightly larger, than the diameter 306 of the elongated body of the coupler 62 to a larger diameter (e.g. to avoid the couplers 62 undesirably binding-up with the heat shield 400 during expansion and contraction of the mat 26 or relative movement of the mat 26 and electrically-conductive cover 110).

Referring now to the embodiment of FIG. 47, when the heat shield 400 includes through-holes 418 alignable between the locking pin holes 32 of the mat 26 and cut-outs 178 of the associated electrically-conductive cover(s) 110, the through-holes 418 may be smaller than the cut-outs 178 in the cover(s) 110, such as to help prevent contact between the cover 110 and mat 26 at that location. If desired, the exemplary heat shield 400 may be formed with one or more lips extending upwardly at least partially around one or more of the through-holes 418 and into the corresponding cut-outs 178 of the cover 110, such as to help prevent contact between the electrically-conductive cover 110 and the mat 26 and/or inserted locking pins 34 at that location, or other purpose.

Referring again to FIGS. 44A-52, the EPZ mat 112 may be configured to assist in preventing electrical current or charges from travelling from the electrically-conductive cover 110 through the mat 26 (e.g. through spaces, cracks, holes, seams, fasteners (e.g. locking pins 34) or other hardware in the mat 26) to the ground 20 below the EPZ mat 112, such as to prevent the potential for creation of fire or electric shocks, ensure only designated grounding paths from the load-supporting surface 16 are used, or other purpose. For example, the heat shield 400 may be at least substantially solid, thus blocking the passage of electric current or charges from the electrically-conductive cover 110 through openings in the mat 26 (below the heat shield 400). In the illustrated embodiments, the heat shield 400 is a single sheet 404 of substantially continuous thermal insulation, substantially blocking the passage of electric current or charges from the electrically-conductive cover 110 through openings in the mat 26 below the heat shield 400. In FIGS. 50-53, the exemplary heat shield 400 is a completely continuous, or solid, sheet 404, which will assist in blocking the flow of electric current or charges from the electrically-conductive cover 110 to the ground 20 through openings, or cracks, 430 in the mat 26 below the heat shield 400.

For another example, openings in the mat 26 not being used at a particular site may be plugged, such as to help prevent the flow of electric current or charges from the electrically-conductive cover 110 therethrough and to the ground 20, help prevent objects from falling into the opening(s) and becoming an undesirable path for electrical current, or other purpose. In the embodiment of FIG. 45, pin hole plugs 440 are placed in various empty locking pin holes 32 (e.g. not currently being used to hold locking pins 34 or for another purpose) to assist in blocking the flow of electric current or charges from the electrically-conductive cover 110 to the ground 20 therethrough. In locking pin holes 32 that will receive a locking pin 34, an exemplary cap 444 may be placed atop the locking pin 34 to assist in blocking the flow of electric current or charges from the electrically-conductive cover 110 through the locking pin 34 to the ground 20. The pin hole plugs 440 and caps 444 may have any suitable form, construction and configuration. For example, the plugs 440 and caps 444 may be constructed of plastic, rubber or any of the materials that may be used in the construction of the heat shield 400.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods described above or claimed herein and any other methods which may fall within the scope of the appended claims can be performed in any desired or suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of any appended claims, and may be made and used by one of ordinary skill in the art without departing from the spirit or teachings of the invention and scope of this disclosure and any appended claims. Thus, all matter herein set forth or shown in the accompanying drawings should be interpreted as illustrative, and the scope of the disclosure and any appended claims should not be limited to the embodiments described and shown herein.

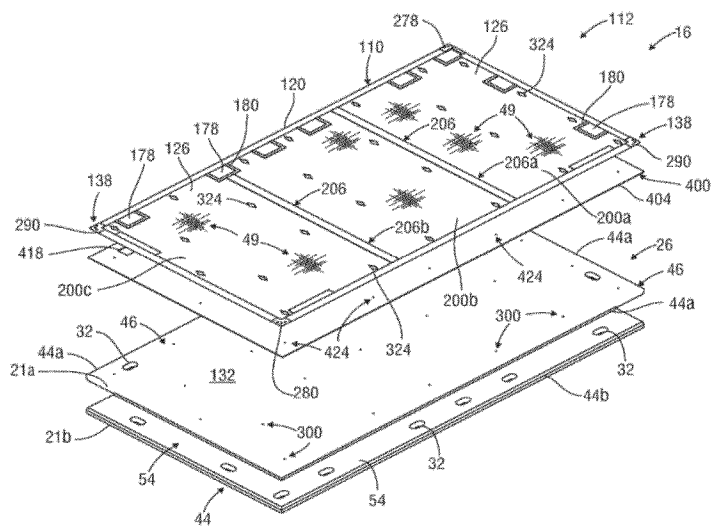

The invention claimed is:

1. An insulated, electrically groundable, support surface for use in an equipotential zone proximate to the earth's surface, the support surface comprising:
    a mat constructed of non-conductive material and having top and bottom faces, the mat being configured to be deployed on or near the earth's surface in the equipotential zone;
    at least one electrically-conductive cover being configured to be associated with the mat and extend at least partially across the top face of the mat, each electrically-conductive cover being constructed at least partially of electrically-conductive material and configured to capture electrical current in the equipotential zone and ground it to the earth; and
    at least one heat shield configured to be disposed between the mat and the electrically-conductive cover(s), the heat shield(s) being configured to insulate the mat from heat generated by electric current flowing through the electrically-conductive cover(s) sufficient to prevent the mat from combusting and/or melting due to such heat.

2. The supports surface of claim 1 wherein each heat shield includes at least one layer of thermal insulating material.

3. Apparatus for insulating an electrically-groundable ground cover, the ground cover having top and bottom faces and being configured to be deployed on or near the earth's surface, the apparatus comprising:
    at least one electrically-conductive cover configured to be associated with the ground cover and extend at least partially across the top face of the ground cover, each electrically-conductive cover being constructed at least partially of electrically-conductive material and configured to capture electrical current and ground at least some of the captured electrical current to the earth; and
    at least one heat shield configured to be disposed at least partially between the ground cover and the at least one electrically-conductive cover, the at least one heat shield being configured to insulate the ground cover from heat generated by electric current flowing through the at least one electrically-conductive cover sufficient to at least prevent the ground cover from combusting and/or melting due to such heat.

4. The apparatus of claim 3 further including at least one electrically-conductive interface configured to facilitate electrical connection of the at least one electrically-conductive cover to another electrically-conductive component.

5. The apparatus of claim 3 wherein each heat shield is constructed of durable, water-resistant, all-weather material.

6. The apparatus of claim 3 wherein each heat shield is configured to withstand loads and forces placed upon the ground cover and the at least one electrically-conductive cover, and movement, deformation, expansion and contraction of the ground cover and the at least one electrically-conductive cover during use thereof.

7. The apparatus of claim 3 wherein at least one heat shield is affixed to the ground cover with one or more adhesives.

8. The apparatus of claim 3 wherein the at least one heat shield is configured to prevent contact between the at least one electrically-conductive cover and the ground cover.

9. The apparatus of claim 8 wherein the at least one heat shield is configured to extend across the entire top face of the ground cover.

10. The apparatus of claim 3 wherein the ground cover includes first, second, third and fourth sides and at least one edge extending along each respective side, wherein the at least one heat shield extends to each edge of the ground cover.

11. The apparatus of claim 3 wherein the ground cover includes first, second, third and fourth sides and at least one edge extending along each respective side, wherein the at least one heat shield extends at least partially over or around at least one of the edges of the ground cover.

12. The apparatus of claim 3 wherein the at least one electrically-conductive cover includes first, second, third and fourth sides and at least one edge extending along each respective side and the at least one head shield includes first, second, third and fourth sides and at least one edge extending along each respective side, wherein the edges of the at least one heat shield extend beyond the edges of the at least one electrically-conductive cover relative to the ground cover.

13. The apparatus of claim 3 further including at least one fastener extendable through the at least one electrically-conductive cover and the at least one heat shield and configured to couple the at least one electrically-conductive cover, the at least one heat shield and the ground cover together.

14. The apparatus of claim 13 further including a plurality of fasteners, wherein the at least one heat shield includes a plurality of through-holes each configured to allow the passage of one of the fasteners therethrough.

15. The apparatus of claim 14 wherein the width of each through-hole is greater than the width of each fastener to prevent the fasteners from binding-up with the at least one heat shield during expansion or contraction of the ground cover or relative movement between the ground cover and the at least one electrically-conductive cover.

16. The apparatus of claim 3 wherein the ground cover includes at least one locking pin hole configured to accept a locking pin therein for mechanically interconnecting the ground cover to another component, further wherein the at least one electrically-conductive cover and the at least one heat shield each include at least one passageway extending therethrough and alignable over one of the respective locking pin holes of the ground cover to allow the insertion of a locking pin into the locking pin hole.

17. The apparatus of claim 16 wherein the width of each passageway formed in the at least one heat shield is smaller than the width of each passageway formed in the at least one electrically-conductive cover to assist in preventing contact between the at least one electrically-conductive cover and the ground cover.

18. The apparatus of claim 16 wherein the at least one heat shield is formed with at least one upwardly-extending lip at least partially around each passageway formed therein and configured to extend into one of the passageways formed in the at least one electrically-conductive cover to assist in preventing contact between the at least one electrically-conductive cover and the ground cover or a locking pin disposed within the corresponding locking pin hole of the ground cover.

19. The apparatus of claim 16 further including a plurality of pin hole plugs, each pin hole plug being constructed at least partially of non-conductive material and configured to be releasably, at least partially seated within a locking pin hole of the ground cover when a locking pin is not used in the locking pin hole and assist in preventing the flow of electric current from the electrically-conductive cover, through the locking pin hole to the earth.

20. The apparatus of claim 16 further including a plurality of pin hole plugs, each pin hole plug being constructed at least partially of non-conductive material and configured to be releasably, at least partially seated within a locking pin hole of the ground cover when a locking pin is not used in the locking pin hole and assist in preventing objects from falling into the locking pin hole and becoming a path for electrical current to pass from the electrically-conductive cover to the earth.

21. The apparatus of claim 3 further including a plurality of caps, each cap being constructed at least partially of non-conductive material and configured to be releasably, at least partially seated in one of the locking pin holes of the ground cover over the locking pin therein when a locking pin is used in the locking pin hole and assist in preventing the flow of electric current from the electrically-conductive cover, through the locking pin to the earth.

22. The apparatus of claim 3 wherein each heat shield includes at least one layer of thermal insulating material.

23. The apparatus of claim 3 wherein each heat shield has a total thickness of no greater than ¼ inch.

24. The apparatus of claim 3 wherein each heat shield includes multiple adjacent sheets of thermal insulation.

25. The apparatus of claim 3 wherein each heat shield includes multiple at least partially overlapping sheets of thermal insulation.

26. The apparatus of claim 3 wherein each heat shield includes a top surface and a bottom surface, wherein at least one among the top and bottom surface of at least some of the heat shields is textured.

27. The apparatus of claim 3 wherein each heat shield possesses a mesh-like configuration.

28. The apparatus of claim 3 wherein each heat shield includes one or more internal spaces configured to contain gas and/or foam.

29. The apparatus of claim 3 wherein each heat shield possesses a honeycomb-like internal configuration.

30. The apparatus of claim 3 wherein each heat shield is solid and configured to block the passage of electric current from the at least one electrically-conductive cover through openings in the ground cover below the heat shield.

31. Apparatus for electrically grounding and insulating a ground cover that is electrically connectable to at least one other electrically-conductive component, the ground cover having a top and a bottom and configured to be deployed on or near the surface of the earth, the apparatus comprising:
  an upper layer constructed at least partially of electrically-conductive material and configured to be coupled to the ground cover, extend at least partially across the top of the ground cover, capture electrical current and be electrically grounded to the earth;
  at least one intermediate layer configured to be disposed at least partially between the ground cover and the upper layer, the at least one intermediate layer being configured to at least partially insulate the ground cover from heat generated by electric current flowing through the upper layer; and at least one electrically-conductive interface configured to facilitate electrical connection of the upper layer to another electrically-conductive component.

32. The apparatus of claim 31 further including at least one fastener extendable through the upper layer and the at least one intermediate layer for coupling together the upper layer, the at least one intermediate layer and the ground cover.

33. The apparatus of claim 31 wherein the upper layer includes metallic grating configured to extend at least partially across the top of the ground cover and an outer frame coupled to the metallic grating and extending around or proximate to the perimeter of the top of the ground cover.

34. The apparatus of claim 33 wherein each electrically-conductive interface is provided on the outer frame.

35. Apparatus for insulating an electrically-groundable support surface configured to support the weight of personnel, vehicles and equipment thereon at or near the surface of the earth, the support surface including a ground cover having a top and a bottom and at least one electrically-conductive cover constructed at least partially of electrically-conductive material, extending at least partially across the top the ground cover and being electrically groundable to the earth, the apparatus comprising:

at least one heat shield including at least one layer of thermal insulating material and being positioned between the at least one electrically-conductive cover and the ground cover, the at least one heat shield being configured to insulate the ground cover from heat generated by electric current flowing through the at least one electrically-conductive cover sufficient to prevent the ground cover from combusting and/or melting due to such heat and withstand loads and forces placed upon the ground cover and the at least one electrically-conductive cover and the movement, deformation, expansion and contraction of the ground cover and at least one electrically-conductive cover during use thereof.

36. The apparatus of claim 35 wherein the at least one heat shield extends across the entire top of the ground cover.

37. The apparatus of claim 35 further including at least one fastener extendable through the at least one electrically-conductive cover and the at least one heat shield and into the ground cover to couple the at least one electrically-conductive cover, the at least one heat shield and the ground cover together.

38. The apparatus of claim 35 wherein the at least one electrically-conductive cover, the at least one heat shield and the ground cover are planar.

39. The apparatus of claim 35 wherein each heat shield is constructed of durable, water-resistant, all-weather material.

40. The apparatus of claim 35 wherein at least one heat shield is affixed to the ground cover with one or more adhesives.

41. An insulated, electrically-groundable support surface for use on or near the earth's surface, the support surface comprising:

a mat having top and bottom surfaces, the mat being configured to be deployed on or near the surface of the earth;

an electrically-conductive cover constructed at least partially of electrically-conductive material, associated with the mat and having at least one inner panel configured to extend at least partially across the top surface of the mat and be electrically grounded to the earth; and at least one heat shield configured to be disposed at least partially between the mat and the electrically-conductive cover, the at least one heat shield being configured to insulate the ground cover from heat generated by electric current flowing through the electrically-conductive cover sufficient to at least prevent the mat from combusting and/or melting due to such heat.

42. The support surface of claim 41 further including at least one electrically-conductive interface configured to facilitate electrical connection of the electrically-conductive cover to another electrically-conductive component.

43. The support surface of claim 41 wherein the mat, electrically-conductive cover and at least one heat shield are planar, further including at least one fastener for coupling the electrically-conductive cover and at least one heat shield to the mat.

44. A method of electrically insulating an electrically-conductive support surface having a ground cover configured to be deployed on or near the surface of the earth, the method comprising:

positioning an electrically-conductive cover at least partially across a top surface of the ground cover;

positioning at least one heat shield at least partially between the electrically-conductive cover and the ground cover;

the electrically-conductive cover capturing electrical current; and the at least one heat shield insulating the ground cover from heat generated by electric current flowing through the electrically-conductive cover.

45. The method of claim 44 further including grounding the electrically-conductive cover to the earth.

46. A method of assembling and grounding an insulated support surface configured to be deployed on or near the surface of the earth, the method comprising:

positioning at least one heat shield at least partially across the top of the support surface;

attaching at least one electrically-conductive cover to the support surface over the at least one heat shield, the at least one electrically-conductive cover being configured to capture electrical in the vicinity of the support surface, the at least one heat shield being configured to insulate the support surface from heat generated by electric current flowing through the at least one electrically-conductive cover sufficient to at least partially prevent the ground cover from combusting and/or melting due to such heat; and grounding the at least one electrically-conductive cover to the earth.

47. The method of claim 46 further including attaching the at least one heat shield to the support surface.

48. A method of insulating and electrically connecting at least two mats arranged in a reusable load-supporting surface deployed on or near the earth's surface, the mats having top and bottom surfaces, the method comprising:

positioning at least one among a plurality of electrically-conductive covers at least partially across the top surface of each mat, each electrically-conductive cover being configured to capture electrical current in the vicinity of the mat associated therewith;

positioning at least one heat shield at least partially between each mat and the mat's associated electrically-conductive cover(s), the at least one heat shield being configured to insulate its associated mat from heat generated by electric current flowing through the associated electrically-conductive cover(s) sufficient to prevent the mat from combusting and/or melting due to such heat; and electrically coupling at least one conductive interface associated with at least one electrically-conductive cover of each mat to at least one conductive interface associated with at least one electrically-conductive cover of another mat to electrically couple the mats together.

49. The method of claim 48 further including coupling each electrically-conductive cover to its associated mat.

50. The method of claim 49 further including grounding at least one electrically-conductive cover to the earth.

* * * * *

UNITED STATES PATENT AND TRADEMARK OFFICE
CERTIFICATE OF CORRECTION

PATENT NO. : 9,972,942 B1
APPLICATION NO. : 15/730631
DATED : May 15, 2018
INVENTOR(S) : Bordelon et al.

Page 1 of 2

It is certified that error appears in the above-identified patent and that said Letters Patent is hereby corrected as shown below:

On the Title Page

Please replace the image of Figure 13 with the image of Figure 47.

In the Specification

At Column 8, Line 18, please replace -of another a portion- with the words "of another portion".

At Column 16, Line 17, please replace -interconnected mats- with the words "interconnected mat".

At Column 25, Line 27, please replace -269- with "298".

At Column 30, Line 6, please replace -269- with "298".

At Column 30, Line 8, please replace -269- with "298".

In the Claims

In Claim 2, Column 34, Line 36, please replace -supports- with the word "support".

Signed and Sealed this
Sixteenth Day of June, 2020

Andrei Iancu
*Director of the United States Patent and Trademark Office*

CERTIFICATE OF CORRECTION (continued)

(12) United States Patent
Bordelon et al.

(10) Patent No.: US 9,972,942 B1
(45) Date of Patent: May 15, 2018

(54) APPARATUS AND METHODS FOR INSULATING AN ELECTRICALLY-GROUNDABLE SUPPORT SURFACE

(71) Applicant: NEWPARK MATS & INTEGRATED SERVICES LLC, The Woodlands, TX (US)

(72) Inventors: Randy Paul Bordelon, Opelousas, LA (US); Mathew Stephen James Lanigan, The Woodlands, TX (US); Kenneth Edward Durio, Arnaudville, LA (US); James Kerwin McDowell, Lafayette, LA (US)

(73) Assignee: Newpark Mats & Integrated Services LLC, The Woodlands, TX (US)

( * ) Notice: Subject to any disclaimer, the term of this patent is extended or adjusted under 35 U.S.C. 154(b) by 0 days. days.

(21) Appl. No.: 15/730,631

(22) Filed: Oct. 11, 2017

Related U.S. Application Data

(63) Continuation-in-part of application No. 15/673,676, filed on Aug. 10, 2017, which is a continuation of
(Continued)

(51) Int. Cl.
*H01R 13/648* (2006.01)
*H01R 43/26* (2006.01)
(Continued)

(52) U.S. Cl.
CPC .......... *H01R 13/648* (2013.01); *E01C 5/005* (2013.01); *E01C 5/22* (2013.01); *E01C 9/08* (2013.01);
(Continued)

(58) Field of Classification Search
CPC ........ H01R 13/648; H01R 43/26; H01R 4/64; H01R 13/65802; E01C 9/086; E01C 9/083; E01C 5/00; E01C 9/00; E01C 5/005
See application file for complete search history.

(56) References Cited

U.S. PATENT DOCUMENTS 2,121,179 A   6/1938   Sweetland
4,967,057 A   10/1990  Bayless
(Continued)

FOREIGN PATENT DOCUMENTS

CH   688966 A5   6/1998
CN   8721262 U   7/1988
(Continued)

OTHER PUBLICATIONS

Hastings Grounding and Jumper Equipment, Grounding Mat, Jan. 2011, 1 pp.
(Continued)

*Primary Examiner* — Gary Paumen
(74) *Attorney, Agent, or Firm* — E. Randall Smith; E. Randall Smith, P.C.

(57) ABSTRACT

An insulated, electrically groundable, support surface includes at least one heat shield configured to be disposed between a ground cover and an electrically-conductive cover(s) of the support surface to insulate the ground cover from heat generated by electric current flowing through the electrically-conductive cover(s).

50 Claims, 30 Drawing Sheets